US008885730B2

(12) United States Patent
Narroschke et al.

(10) Patent No.: US 8,885,730 B2
(45) Date of Patent: Nov. 11, 2014

(54) IMAGE CODING METHOD, IMAGE DECODING METHOD, AND APPARATUSES THEREFOR

(75) Inventors: Matthias Narroschke, Rodgau-Dudenhofen (DE); Steffen Wittmann, Moerfelden-Walldorf (DE)

(73) Assignee: Panasonic Corporation, Osaka (JP)

(*) Notice: Subject to any disclaimer, the term of this patent is extended or adjusted under 35 U.S.C. 154(b) by 542 days.

(21) Appl. No.: 13/377,160

(22) PCT Filed: Jun. 10, 2010

(86) PCT No.: PCT/JP2010/003856
§ 371 (c)(1),
(2), (4) Date: Dec. 9, 2011

(87) PCT Pub. No.: WO2010/143427
PCT Pub. Date: Dec. 16, 2010

(65) Prior Publication Data
US 2012/0082242 A1      Apr. 5, 2012

(30) Foreign Application Priority Data
Jun. 10, 2009   (EP) .................................. 09162456

(51) Int. Cl.
| H04N 7/26 | (2006.01) |
| H04N 19/86 | (2014.01) |
| H04N 19/70 | (2014.01) |
| H04N 19/61 | (2014.01) |
| H04N 19/46 | (2014.01) |
| H04N 19/174 | (2014.01) |
| H04N 19/176 | (2014.01) |
| H04N 19/50 | (2014.01) |
| H04N 19/117 | (2014.01) |
| H04N 19/94 | (2014.01) |

(52) U.S. Cl.
CPC ... *H04N 19/00963* (2013.01); *H04N 19/00909* (2013.01); *H04N 19/00884* (2013.01); *H04N 19/00781* (2013.01); *H04N 19/00545* (2013.01); *H04N 19/00272* (2013.01); *H04N 19/00278* (2013.01); *H04N 19/00569* (2013.01); *H04N 19/00066* (2013.01)
USPC .................................................. 375/240.25

(58) Field of Classification Search
CPC .................................................. H04N 19/00066
USPC .................................................. 375/240.25
See application file for complete search history.

(56) References Cited

U.S. PATENT DOCUMENTS

| 2004/0161035 A1 | 8/2004 | Wedi |
| 2009/0022220 A1 | 1/2009 | Vatis et al. |

(Continued)

FOREIGN PATENT DOCUMENTS

| EP | 0 930 787 | 7/1999 |
| EP | 1 435 740 | 7/2004 |

(Continued)

OTHER PUBLICATIONS

International Search Report issued Sep. 14, 2010 in International (PCT) Application No. PCT/JP2010/003856.

(Continued)

*Primary Examiner* — Dave Czekaj
*Assistant Examiner* — Jonathan Messmore
(74) *Attorney, Agent, or Firm* — Wenderoth, Lind & Ponack, LLP.

(57) ABSTRACT

The image coding method for improving the filtering quality and suppressing increase in the transmission bandwidth includes: selecting filter data elements of the first and second component filters from a filter memory (1330), and obtaining indexes stored in association with the selected filter data elements in the filter memory (1330) (S10, S11); coding a macroblock using the two filter data elements (S12); adding the two indexes to a coded video signal (S13); calculating the filter data elements of the first and second component filters based on a slice, and assigning indexes to the filter data elements (S20, S21); storing, in the filter memory (1330), a corresponding one of the calculated filter data elements and the index in association with each other for each of the component filters (S22); and adding the two calculated filter data elements to the coded video signal (S23).

20 Claims, 42 Drawing Sheets

(56) References Cited

U.S. PATENT DOCUMENTS

| | | |
|---|---|---|
| 2009/0274216 A1 | 11/2009 | Kato et al. |
| 2010/0220788 A1 | 9/2010 | Wittmann et al. |

FOREIGN PATENT DOCUMENTS

| | | |
|---|---|---|
| EP | 1 845 729 | 10/2007 |
| JP | 2005-501442 | 1/2005 |
| JP | 2008-536414 | 9/2008 |
| WO | 02/089063 | 11/2002 |
| WO | 2006/108654 | 10/2006 |
| WO | 2007/084301 | 7/2007 |
| WO | 2008/069073 | 6/2008 |
| WO | 2008/085109 | 7/2008 |
| WO | 2009/047917 | 4/2009 |

OTHER PUBLICATIONS

European Search Report issued on Nov. 10. 2010 in counterpart European Application No. 09162456.9.

K. Zhang et al., "Single-Pass Encoding Using Multiple Adaptive Interpolation Filters", ITU-Telecommunications Standardization Sector STUDY GROUP 16, Question 6 Video Coding Experts Group(VCEG) 37th Meeting: Yokohama, Japan, Apr. 15-18, 2009.

S. Haykin, "Adaptive Filter Theory", 4th edition, Prentice Hall Information and System Sciences series, Prentice Hall, 2002, pp. 95, 102-104.

T. Wedi, "Advanced motion compensated prediction methods" ITU-T Video Coding Experts Group (ITU-T SG16 Q.6), Oct. 2003, pp. 1-8, XP002454495.

"Section 3 Dictionary Methods" In: SALOMON D: "Data Compression: The Complete Reference", 1998. Springer, New York. US, XP002150106.

P. List et al., "Adaptive deblocking filter", IEEE transactions on circuits and systems for video technology, vol. 13, No. 7, Jul. 2003, XP011221094, pp. 614-619.

FIG. 9

| Index | Filter data element | | | | | |
|---|---|---|---|---|---|---|
| | c1 | c2 | c3 | c4 | c5 | c6 |
| 0 | 0.02 | -0.15 | 0.63 | 0.63 | -0.15 | 0.02 |
| 1 | -0.07 | 0.45 | 0.28 | 0.27 | -0.02 | -0.05 |
| ... | ... | ... | ... | ... | ... | ... |
| N | -0.11 | 0.23 | -0.47 | 0.72 | 0.42 | 0.21 |

| slice_header() { |
|---|
| ... |
|    if(apply_SAIF) |
|    { |
|       Coefficient_table_size_minus1 |
|    } |
| ... |
| } |

| macroblock_layer() { |
|---|
| ... |
|    if(Coefficient_table_size_minus1 > 0) |
|    { |
|       most_probable_filter_component1 |
|       if(most_probable_filter_component1!=1) |
|       { |
|          filter_index_1 |
|       } |
|       most_probable_filter_component2 |
|       if(most_probable_filter_component2!=1) |
|       { |
|          filter_index_2 |
|       } |
|    } |
| ... |
| } |

FIG. 13

```
slice_header( )
{
...
    if(apply_SAIF)
    {
        Coefficient_table_size_minus1
    }
...
}
```

```
macroblock_layer() {
...
    if(Coefficient_table_size_minus1 > 0)
    {
        most_probable_filter_combination
        if(most_probable_filter_combination!=1)
        {
            filter_combination
        }
    }
...
}
```

IMAGE CODING METHOD, IMAGE DECODING METHOD, AND APPARATUSES THEREFOR

TECHNICAL FIELD

The present invention relates to video coding and decoding, and in particular, to an image coding method and an image decoding method with filtering.

BACKGROUND ART

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. Typically, a macroblock (usually denoting a block of 16×16 pixels) is the basic image element, for which the coding is performed. However, various particular coding steps may be performed for smaller image elements, denoted sub-macroblocks or simply blocks and having the size of, for instance, 8×8, 4×4, 16×8, etc.

Typically, the coding steps of a hybrid video coding include a spatial and/or a temporal prediction. Accordingly, each block to be coded is first predicted using either the blocks in its spatial neighborhood or blocks from its temporal neighborhood, i.e. from previously coded video frames. A block of a difference between the block to be coded and a result of the prediction, also called block of prediction residuals, is then calculated. Another coding step is a transformation of a block of residuals from the spatial (pixel) domain into a frequency domain. The transformation aims at reducing the redundancy of the input block. Further coding step is quantization of the transform coefficients. In this step, the actual lossy (irreversible) compression takes place. Usually, the compressed transform coefficient values are further compacted (losslessly compressed) by means of an entropy coding. In addition, side information necessary for reconstruction of the coded video signal is coded and provided together with the coded video signal. This is for example information about the spatial and/or temporal prediction, amount of quantization, etc.

FIG. 1 is a block diagram illustrating an example of a typical H.264/MPEG-4 AVC standard compliant image coding apparatus (encoder) 100. The H.264/MPEG-4 AVC standard combines all above-mentioned coding steps. A subtractor 105 first determines differences between a current block to be coded of an input video image (input signal) and a corresponding prediction block (prediction signal), which are used for the prediction of the current block to be coded. In H.264/MPEG-4 AVC, the prediction signal is obtained either by a temporal or by a spatial prediction. The type of prediction can be varied on a per frame basis or on a per macroblock basis. Macroblocks predicted using temporal prediction (inter prediction) are called inter-coded macroblocks, and macroblocks predicted using spatial prediction (intra prediction) are called intra-coded macroblocks. The type of prediction for a video frame can be set by the user or selected by the video encoder so as to achieve a possibly high compression gain. In accordance with the selected type of prediction, an intra/inter switch 175 provides corresponding prediction signal to the subtractor 105.

The prediction signal using temporal prediction is derived from the previously coded images which are stored in a memory 140. The prediction signal obtained by an intra prediction unit 170 using spatial prediction is derived from the values of boundary pixels in the neighboring blocks, which have been previously coded, decoded, and stored in the memory 140. The memory 140 thus operates as a delay unit that allows a comparison between current signal values to be coded and the prediction signal values generated from previous signal values. The memory 140 can store a plurality of previously coded video frames. A transform quantization unit 110 transforms a difference (prediction error signal) between the input signal and the prediction signal, denoted prediction error or residual, resulting in coefficients of frequency components. An entropy coding unit 190 entropy-codes the quantized coefficients in order to further reduce the amount of data in a lossless way. This is mainly achieved by applying a code with code words of variable length wherein the length of a code word is chosen based on the probability of occurrence thereof.

Intra-coded images (called also I-pictures, I-type images or I-frames) consist solely of macroblocks that are intra-coded. In other words, intra-coded images can be decoded without reference to any other previously decoded image. The intra-coded images provide error resilience for the coded video sequence since they refresh the video sequence from errors possibly propagated from frame to frame due to temporal prediction. Moreover, I-frames enable a random access within the sequence of coded video images. Intra-frame prediction uses a predefined set of intra-prediction modes, which basically predict the current block using the boundary pixels of the neighboring blocks already coded. The different modes of spatial intra-prediction refer to different directions of the applied two-dimensional prediction. This allows efficient spatial intra-prediction in the case of various edge directions. The prediction signal obtained by such an intra-prediction is then subtracted from the input signal by the subtractor 105 as described above. In addition, spatial intra-prediction mode information is entropy coded and provided together with the coded video signal.

Within the image coding apparatus 100, a decoding unit is incorporated for obtaining a decoded video signal. In compliance with the coding steps, the image coding apparatus 100 includes an inverse quantization/inverse transformation unit 120 that performs the decoding steps. The inverse quantization/inverse transformation unit 120 inverse-quantizes and inverse-transforms quantized coefficients to generate a quantized prediction error signal. The decoded prediction error signal differs from the original prediction error signal due to the quantization error, called also quantization noise. An adder 125 adds the quantized prediction error signal to the prediction signal to generate a reconstructed signal. In order to maintain the compatibility between the encoder (image coding apparatus 100) side and the decoder (image decoding apparatus) side, the prediction signal is obtained based on the coded and subsequently decoded video signal, which is known at both sides of the encoder and the decoder. Due to the quantization, quantization noise is superposed to the reconstructed video signal. Due to the block-wise coding, the superposed noise often has blocking characteristics, which result, in particular for strong quantization, in visible block boundaries in the decoded image that are indicated by the reconstructed signal. Such blocking artifacts (blocking artifacts) have a negative effect upon human visual perception.

In order to reduce these artifacts, a deblocking filter unit 130 applies a deblocking filter to every decoded image block indicated by a reconstructed signal. The deblocking filter is applied to the reconstructed signal, which is the sum of the prediction signal and the quantized prediction error signal. The reconstructed signal after deblocking is the decoded signal, which is generally displayed at the decoder side (if no post filtering is applied). The deblocking filter of H.264/MPEG-4 AVC has the capability of local adaptation. In the case of a high degree of blocking noise, a strong (narrow-band) low pass filter is applied, whereas for a low degree of blocking noise, a weaker (broad-band) low pass filter is applied. The strength of the low pass filter is determined by the prediction signal and by the quantized prediction error signal. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

Intra-coded macroblocks are filtered before displaying, but intra prediction is carried out using the unfiltered macroblocks indicated by the decoded signal.

In order to be decoded, inter-coded images require also the previously coded and subsequently decoded image(s). Temporal prediction may be performed uni-directionally, i.e., using only video frames ordered in time before the current frame to be coded, or bi-directionally, i.e., using also video frames preceding and following the current frame. Uni-directional temporal prediction results in inter-coded images called P-frames (P-pictures); bi-directional temporal prediction results in inter-coded images called B-frames (B-pictures). In general, an inter-coded image may comprise any of P-, B-, or even I-type macroblocks.

A motion compensated prediction unit 160 predicts an inter-coded macroblock (P- or B-macroblock). First, a motion estimation unit 165 estimates a best-matching block for the current block within the previously coded and decoded video frames. The best-matching block then becomes a prediction signal, and the relative displacement (motion) between the current block and the best-matching block is then signalized as motion data in the form of three-dimensional motion vectors within the side information provided together with the coded video signal. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. The spatial interpolation is achieved by an interpolation filter unit 150. According to the H.264/MPEG-4 AVC standard, a six-tap Wiener interpolation filter with fixed filter coefficients and a bilinear filter are applied in order to obtain pixel values for sub-pixel positions in vertical and horizontal directions separately.

For both, the intra- and the inter-coding modes, the transform quantization unit 110 transforms and quantizes the differences between the current input signal and the prediction signal, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality than high frequency components so that more bits can be spent for coding the low frequency components than the high frequency components. The entropy coding unit 190 converts the two-dimensional matrix of quantized coefficients into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the image corresponding to the lower frequencies, the zig-zag scanning results in an array where usually the last values are zero. This allows for efficient coding using run-length codes as a part of/before the actual entropy coding.

H.264/MPEG-4 AVC employs scalar quantization, which can be controlled by a quantization parameter (QP) and a customizable quantization matrix (QM). One of 52 quantizers is selected for each macroblock by the quantization parameter. In addition, quantization matrix is specifically designed to keep certain frequencies in the source to avoid losing image quality. Quantization matrix in H.264/MPEG-4 AVC can be adapted to the video sequence and signalized together with the coded video signal.

The H.264/MPEG-4 AVC includes two functional layers, a Video Coding Layer (VCL) and a Network Abstraction Layer (NAL). The VCL provides the coding functionality as briefly described above. The NAL encapsulates the coded prediction error signal together with the side information necessary for the decoding of video into standardized units called NAL units according to their further application such as transmission over a channel or storing in storage. There are VCL NAL units containing the compressed video data and the related information, as well as non-VCL units encapsulating additional data such as parameter set relating to an entire video sequence, or recently added Supplemental Enhancement Information (SEI) providing additional information that can be use to improve the decoding performance.

In order to improve the image quality, a so-called post filter unit 280 (see FIG. 2) may be applied at the decoder (image decoding apparatus 200). The H.264/MPEG-4 AVC standard allows the sending of post filter information for such a post filter via the Supplemental Enhancement Information (SEI) message. The post filter information (a so-called post filter hint) is determined at the encoder side by means of a post filter design unit 180, which compares the locally decoded signal and original input signal. In general, the post filter information is information allowing a decoder to set up an appropriate filter. The post filter information may include, for instance, directly the filter coefficients. However, it may also include another information enabling setting up the filter, such as cross-correlation information related to the uncompressed signal, such as cross-correlation information between the original input image and the decoded image or between the decoded image and the quantization noise. This cross-correlation information can be used to calculate the filter coefficients. The post filter information, which is output by the post filter design unit 180 is also fed to the entropy coding unit 190 in order to be coded and inserted into the coded video signal. At the decoder, the post filter unit 280 may use the post filter information which is applied to the decoded signal before displaying.

FIG. 2 is a block diagram illustrating the example image decoding apparatus (decoder) 200 compliant with the H.264/MPEG-4 AVC video coding standard. The coded video signal (input signal to the decoder) first passes to an entropy decoding unit 290, which decodes the quantized coefficients, the information elements necessary for decoding such as motion data, mode of prediction etc., and the post filter information. The quantized coefficients are inversely scanned in order to obtain a two-dimensional matrix, which is then fed to an inverse quantization and inverse transformation unit 220. After inverse quantization and inverse transformation, a decoded (quantized) prediction error signal is obtained, which corresponds to the differences obtained by subtracting the prediction signal from the signal input to the encoder in the case no quantization noise is introduced.

The prediction signal is obtained from either a motion compensated prediction unit 260 or an intra prediction unit 270. An intra/inter switch 275 switches between the prediction signals output to the adder 225 in accordance with a received information element applied at the encoder. The decoded information elements further include the information necessary for the prediction such as prediction type in the case of intra-prediction and motion data in the case of motion compensated prediction. Depending on the current value of the motion vector, interpolation of pixel values may be needed in order to perform the motion compensated prediction. This interpolation is performed by an interpolation filter unit 250.

The quantized prediction error signal in the spatial domain is then added by means of the adder 225 to the prediction signal obtained either from the motion compensated prediction unit 260 or the intra prediction unit 270. The resulting reconstructed signal may be passed through a deblocking filter 230, and the resulting decoded signal obtained by the deblocking filter 230 is stored in the memory 240 to be applied for temporal or spatial prediction of the following blocks.

The post filter information is fed to the post filter unit 280 which sets up a post filter accordingly. The post filter unit 280 applies a post filter to the decoded signal in order to further improve the image quality. Thus, the post filter unit 280 is capable of adapting to the properties of the video signal entering the encoder.

In summary, there are three types of filters used in the latest standard H.264/MPEG-4 AVC: an interpolation filter, a deblocking filter, and a post filter. In general, the suitability of a filter depends on the image to be filtered. Therefore, a filter design capable of adapting the image characteristics is advantageous. The coefficients of such a filter may be designed as Wiener filter coefficients.

FIG. 3 illustrates a signal flow using a Wiener filter 300 for noise reduction. Noise n is added to an input signal s, resulting in a noisy signal s' to be filtered. With the goal of reducing the noise n, a Wiener filter is applied to the signal s', resulting in the filtered signal s''. The Wiener filter 300 is designed to minimize the mean squared error between the input signal s, which is the desired signal, and the filtered signal s''. This means that Wiener filter coefficients w correspond to the solution of the optimization problem $\arg_w \min E[(s-s'')^2]$ which can be formulated as a system of linear equations called Wiener-Hopf equations, operator $E[x]$ indicating the expected value of x. The solution is given by $w=R^{-1} \cdot p$.

Here, w is an M×1 vector containing the optimal coefficients of Wiener filter having order M, M being a positive integer. $R^{-1}$ denotes the inverse of an M×M autocorrelation matrix R of the noisy signal s' to be filtered, and p denotes an M×1 cross correlation vector between the noisy signal s' to be filtered and the original signal s. See NPL 1 for further details on adaptive filter design.

Thus, one of the advantages of the Wiener filter 300 is that the filter coefficients can be determined from the autocorrelation of the corrupted (noisy) signal and the cross correlation of the corrupted signal and the desired signal. In video coding, quantization noise is superposed to the original (input) video signal in the quantization step. Wiener filtering in the context of video coding aims at the reduction of the superposed quantization noise in order to minimize the mean squared error between the filtered decoded signal and the original video signal.

In general, a two dimensional filter may be separable or non-separable. A filter is said to be separable if it can be separated into two one-dimensional component filters: a vertical component filter and a horizontal component filter. A significant reduction in computational complexity can be obtained for filtering if the filter can be applied as the convolution of one one-dimensional filter in the horizontal direction and one one-dimensional filter in the vertical direction instead of performing the two-dimensional convolution with the corresponding two-dimensional filter.

Filter data (filter information) that is transmitted from the encoder to the decoder can either be directly the calculated filter coefficients or the cross correlation p which is necessary for calculating the Wiener filter and which cannot be determined at the decoder. Transmitting such side information may improve the quality of filtering, but, on the other hand, requires additional bandwidth. Similarly, further improving the filter (for instance, by increasing its order, or by its separate determining and/or application to parts of the video signal) may even more improve the video quality.

CITATION LIST

Non Patent Literature

[NPL 1] S. Haykin, "Adaptive Filter Theory", 4th edition, Prentice Hall Information and System Sciences series, Prentice Hall, 2002

SUMMARY OF INVENTION

Technical Problem

However, since a coded video signal includes all the filter information in the conventional image coding method and image decoding method, there are problems that the data amount of such a coded video signal increases and the wide bandwidth for transmitting the coded video signal is necessary.

In other words, the problem underlying the present invention is based on the observation that further improving the quality of video filtering is typically connected with increasing requirements of bandwidth for providing the filter information with the coded video data.

Accordingly, the present invention has an object of providing an image coding method and an image decoding method, etc. that suppress increase in the transmission bandwidth as well as improve the quality of video filtering.

Solution to Problem

In order to achieve the object, the image coding method according to an aspect of the present invention is an image coding method of coding a video signal to generate a coded video signal that is a bitstream, and the method includes: selecting, from at least one filter data element stored in a memory, respective filter data elements of one-dimensional component filters of two types that compose a two-dimensional separable filter as two application filter data elements, the one-dimensional component filters being to be applied to a filter-application image area indicated by the video signal; obtaining an index stored in the memory in association with a corresponding one of the selected two application filter data elements, as an application index, for each of the one-dimensional component filters; coding the filter-application image area by applying, to the filter-application image area, the one-dimensional component filters of two types using the two application filter data elements selected in the selecting; adding the two application indexes obtained in the obtaining to the coded filter-application image area in the coded video signal; identifying filter data elements of the one-dimensional component filters as two designed filter data elements, based on a filter-design image area including the filter-application image area and indicated by the video signal; assigning an index for identifying a corresponding one of the designed filter data elements to the corresponding one of the designed filter data elements as a designed index for each of the one-dimensional component filters; storing, in the memory, the designed filter data element and the designed index in association with each other, for each of the one-dimensional component filters, the designed index being assigned to the designed filter data element; and adding the two designed filter data elements identified in the identifying of filter data elements, to the coded filter-design image area in the coded video signal.

Accordingly, since application filter data elements to be applied to a filter-application image area (for example, macroblock, block, etc.) are selected, and the filter-application image area is filtered using the application filter data elements and is coded, as long as a video signal includes filter-application image areas, the filter-application image areas can be appropriately and separately filtered. As a result, the quality of video filtering can be improved, and the quality can be further improved as the data amount of such application filter data elements increases. Furthermore, even when the data amount of filter data elements stored in the memory is large, the data amount of indexes stored in the memory in association with the filter data elements can be reduced in the image coding method according to the aspect of the present invention. Thus, since the application indexes for identifying the selected application filter data elements are added to the coded video signal instead of the application filter data elements in the image coding method, increase in the transmission bandwidth for transmitting the coded video signal can be suppressed.

Furthermore, designed filter data elements are identified based on the filter-design image area including the filter-application image area (for example, slice or frame), and the designed filter data elements and the indexes for identifying the designed filter data elements are stored in a memory in association with each other, in the image coding method according to the aspect of the present invention. Thus, when the application filter data elements are selected for a filter-application image area, the designed filter data elements identified for the filter-design image area including the filter-application image area can be selected as the application filter data elements. Furthermore, the designed filter data elements identified for a filter-design image area that is different from the filter-design image area and has been processed in the past can be selected as the application filter data elements. As a result, each time the filter-design image area is processed, the number of candidate application filter data elements to be selected can be increased, appropriate application filter data elements can be selected for the filter-application image area, and the quality of filtering can be further improved.

Furthermore, in the image coding method according to the aspect of the present invention, designed indexes are assigned to the identified designed filter data elements, the designed indexes and the designed filter data elements are stored in a memory in association with each other, and the designed filter data elements are added to a coded video signal (for example, slice header). Thus, the image decoding apparatus can obtain the designed filter data elements from the coded video signal. Furthermore, the image decoding apparatus can manage the content of the memory included therein in consistency with the content of the memory included in the image coding apparatus as long as the designed indexes are assigned to the obtained designed filter data elements and the designed filter data elements and the designed indexes are stored in the memory, in accordance with a rule identical to the rule of assigning designed indexes in the image coding apparatus. As a result, the image decoding apparatus can select appropriate application filter data elements corresponding to the application indexes added to the coded video signal, from the memory, and the filter-application image area can be appropriately filtered using the application filter data elements. Consequently, the quality of filtering can be improved, and the coded video signal can be appropriately decoded.

Furthermore, in the image coding method according to the aspect of the present invention, selecting of an application filter data element, obtaining of an application index, identifying of a designed filter data element, assigning of a designed index, and associating of the filter data element with the index are performed for each of one-dimensional component filters of two types (for example, vertical and horizontal component filters) that compose a two-dimensional separable filter. Thus, an appropriate application filter data element can be selected for the filter-application image area, for each of the one-dimensional component filters, and the quality of filtering can be improved. Here, when a filter data element of a two-dimensional filter is identified for each filter-design image area, that is, when two designed filter data elements of the one-dimensional component filters of two types are collectively identified, a pair of the two designed filter data elements and the indexes are stored in a memory for each pair of two designed filter data elements, and the amount of data to be stored in the memory increases according to the number of the pairs. However, since a designed filter data element and a designed index are stored in the memory in association with each other for each one-dimensional component filter (for example, vertical and horizontal component filters) in the image coding method, the amount of data to be stored in the memory can be suppressed regardless of any pair of the designed filter data element and the designed index.

Furthermore, in the selecting, after the two designed filter data elements are stored in the memory in the storing, the two application filter data elements may be selected from among the filter data elements including the two designed filter data elements.

Accordingly, the number of candidate application filter data elements to be selected can be increased, and appropriate application filter data elements can be selected.

Furthermore, in the selecting, before the two designed filter data elements are stored in the memory in the storing, the two application filter data elements may be selected from the at least one filter data element excluding the two designed filter data elements.

Accordingly, the application filter data elements for the filter-application image area can be selected prior to identifying of the designed filter data elements. When the processing order influences the processing load in image coding, the load can be reduced. Furthermore, the designed filter data elements to be stored in the memory may be candidates for application filter data elements to be selected for other filter-application image areas within the filter-design image area to be processed next to the current filter-design image area.

Furthermore, the image coding method may further include identifying other two filter data elements of the one-dimensional component filters of two types, based on an other filter-design image area that precedes the filter-design image area in coding order, the other filter-design image area being indicated by the video signal, wherein in the selecting, the two application filter data elements may be selected from among the filter data elements including the two filter data elements identified in the identifying of other two filter data elements.

Accordingly, when the filter-design image areas are successively processed, since the filter data elements identified for the filter-design image area that has been processed in the past (the other filter-design image area) are included in the candidate application filter data elements to be selected, the number of candidates can be increased and appropriate application filter data elements can be selected.

Furthermore, the image coding method may further include predicting one of the two application indexes of the one-dimensional component filters of two types, wherein when a prediction index obtained in the predicting is identical to the one of the two application indexes, in the adding of the two application indexes, prediction information indicating that the one of the two application indexes is identical to an index indicating a result of the prediction may be added to the coded video signal, instead of the one of the two application indexes.

Accordingly, when the prediction index is identical to one of the application indexes, since the prediction information (prediction flag=1) is added to the coded video signal instead of the one of the application indexes, the amount of data to be added can be suppressed, and increase in the transmission bandwidth can be suppressed.

Furthermore, in the predicting, the one of the two application indexes may be predicted by selecting any one of indexes of the one-dimensional component filters of two types as the prediction index, the indexes including two indexes obtained from each of surrounding filter-application image areas that surround the filter-application image area and that are included in the filter-design image area.

Since the surrounding filter-application image areas surround the filter-application image area, the image characteristics between the surrounding filter-application image areas and the application filter image area are similar. Thus, the application index of one of the filter-application image areas can be appropriately predicted by selecting any one of indexes of the surrounding filter-application image areas.

Furthermore, the image coding method may further include estimating a motion vector for each of the filter-application image area and the surrounding filter-application image areas, wherein in the predicting, a surrounding filter-application image area from which a motion vector most similar to the motion vector estimated for the filter-application image area is estimated may be identified from among the surrounding filter-application image areas, and one of the two indexes of the one-dimensional component filters of two types may be selected as the prediction index, the one of the two application indexes being obtained for the identified surrounding filter-application image area.

Thus, the motion vector is used as the image characteristics. In other words, since the surrounding filter-application image area having a motion vector that is the most similar to the motion vector of the filter-application image area is identified from among the surrounding filter-application image areas, and the index of the identified surrounding filter-application image area is selected as the prediction index, the application index of one of the filter-application image areas can be more appropriately predicted. Furthermore, when the filter-application image area and the surrounding filter-application image areas are coded using the motion vectors, the appropriate prediction can be simply performed using the motion vectors.

Furthermore, in the predicting, an index of a one-dimensional component filter of a type identical to a type of the one of the two application indexes for the one-dimensional component filters may be selected as the prediction index from among the two indexes of the one-dimensional component filters of two types.

For example, when the one-dimensional component filter of one of the application indexes is a horizontal component filter, the index of the horizontal component filter for the identified surrounding filter-application image area is selected as a prediction index. Accordingly, since the prediction is performed for each type of the one-dimensional component filters, more appropriate prediction can be performed.

Furthermore, in the predicting, the one of the two application indexes may be predicted using the other of the two application indexes of the one-dimensional component filters of two types, the other of the two application indexes being obtained for the filter-application image area.

Accordingly, for example, even when an image area that surrounds a filter-application image area cannot be used, the appropriate prediction can be performed.

Furthermore, in the image coding method, when the video signal indicates filter-design image areas including the filter-design image area, the identifying of filter data elements, the assigning, and the storing may be repeated for each of the filter-design image areas, and in the assigning, the two designed indexes may be assigned to each of the filter-design image areas so that values indicated by the two designed indexes for each of the filter-design image areas monotonically increase or decrease, according to an order of storing the two designed indexes for each of the filter-design image areas in the memory in the storing or an order of displaying the filter-design image areas.

Accordingly, it is possible to easily determine whether the filter data element associated with the index is old, new, or necessary using the value indicated by the index (designed index) stored in the memory, and to appropriately manage the data in the memory.

Furthermore, the one-dimensional component filters of two types may be vertical and horizontal component filters, and in the identifying of filter data elements, the two designed filter data elements may be identified so that an information amount of the designed filter data element of the horizontal component filter is larger than an information amount of the designed filter data element of the vertical component filter.

For example, a video camera that generates a video signal by capturing images often moves horizontally rather than vertically during when the images are captured. Thus, the video indicated by the video signal has an amount of horizontal motion larger than an amount of vertical motion. Thus, since the information amount of the designed filter data element of the horizontal component filter is larger than that of the designed filter data element of the vertical component filter, the horizontal motion can be appropriately filtered and the filtering quality can be improved.

In order to achieve the object, the image decoding method according to an aspect of the present invention is an image decoding method of decoding a coded video signal that is a bitstream, and the method includes: extracting two indexes of one-dimensional component filters of two types that compose a two-dimensional separable filter from a filter-application image area indicated by the coded video signal, as two application indexes; obtaining respective filter data elements of the one-dimensional component filters of two types from at least one filter data element stored in a memory as two application filter data elements, the respective filter data elements being stored in association with the two application indexes extracted in the extracting of two indexes; decoding the filter-application image area by applying, to the filter-application image area, the one-dimensional component filters of two types using the two application filter data elements obtained in the obtaining; extracting filter data elements of the one-dimensional component filters as designed filter data elements, from a filter-design image area including the filter-application image area and indicated by the video signal; assigning an index for identifying a corresponding one of the designed filter data elements to the corresponding one of the designed filter data elements as a designed index, for each of the one-dimensional component filters; and storing the designed filter data element and the designed index in association with each other, in the memory for each of the one-dimensional component filters, the designed index being assigned to the designed filter data element.

Thus, since application indexes are extracted from a filter-application image area, application filter data elements stored in association with the application indexes in a memory are obtained, and the filter-application image area is filtered using the application filter data elements and is decoded, as long as a coded video signal includes filter-application image areas, the filter-application image areas can be appropriately and separately filtered. As a result, the quality of video filtering can be improved, and the quality can be further improved as the data amount of such application filter data elements increases.

Here, designed filter data elements are extracted from the filter-design image area, and the designed filter data elements and the designed indexes for identifying the designed filter data elements are stored in a memory in association with each other, in the image decoding method according to an aspect of the present invention. Thus, when application filter data elements are obtained for a filter-application image area, the designed filter data elements extracted from the filter-design image area including the filter-application image area can be obtained as the application filter data elements. Furthermore, the designed filter data elements extracted from a filter-design image area that is different from the filter-design image area and has been processed in the past can be obtained as the application filter data elements. As a result, each time the filter-design image area is processed, the number of candidate application filter data elements to be obtained can be increased, appropriate application filter data elements can be obtained for the filter-application image area, and the quality of filtering can be further improved.

Furthermore, in the image decoding method according to the aspect of the present invention, designed indexes are assigned to the extracted designed filter data elements, and the designed indexes and the designed filter data elements are stored in a memory in association with each other. Thus, the image decoding apparatus can manage the content of the memory included therein in consistency with the content of the memory included in the image coding apparatus as long as the designed indexes are assigned to the extracted designed filter data elements and the designed filter data elements and the designed indexes are stored in the memory, in accordance with a rule identical to the rule of assigning designed indexes in the image coding apparatus. As a result, the image decoding apparatus can select appropriate application filter data elements corresponding to the application indexes added to the coded video signal, from the memory, and the filter-application image area can be appropriately filtered using the appropriate application filter data elements. Consequently, the quality of filtering can be improved, and the coded video signal can be appropriately decoded.

Furthermore, in the image decoding method according to the aspect of the present invention, extracting of an application index, obtaining of an application filter data element, assigning of a designed index, and associating of the filter data element with the index are performed for each of one-dimensional component filters of two types (for example, vertical and horizontal component filters) that compose a two-dimensional separable filter. Thus, an appropriate application filter data element can be obtained for the filter-application image area, for each of the one-dimensional component filters, and the quality of filtering can be improved. Here, when a filter data element of a two-dimensional filter is extracted for each filter-design image area, that is, when two designed filter data elements of the one-dimensional component filters of two types are collectively extracted, a pair of the two designed filter data elements and the indexes are stored in a memory for each pair of two designed filter data elements, and the amount of data to be stored in the memory increases according to the number of the pairs. However, since a designed filter data element and a designed index are stored in the memory in association with each other for each one-dimensional component filter (for example, vertical and horizontal component filters) in the image decoding method according to the aspect of the present invention, the amount of data to be stored in the memory can be suppressed regardless of any pair of the designed filter data element and the designed index.

The method unique to the present invention includes holding, in each of an encoder and a decoder, a filter memory for assigning an index value to a filter data element on a one-dimensional component of a two-dimensional separable filter and storing the filter data element, or selecting filter data elements of the first and second component filters from the filter memory of the encoder, and providing these indexes of the two filter data elements to the decoder instead of the filter data elements.

According to the method, the video signal that allows the local adaptation using a means for signaling separate indexes can be effectively coded, and only the bandwidth smaller than for the entire filter data item is required. On the other hand, the selectable filter data element is updated. Although the component indexes are limited, they are selected from an accurate filter data element.

According to an aspect of the present invention, a video signal is coded, the coded video signal is provided as a bitstream together with the filter information to be used for filtering the video signal by the decoder. In this method, the filter data element can be identified for each of the first and second components of the two-dimensional separable filter, based on the filter-design image area in the video signal. The identified filter data elements are provided together with the bitstream of the coded video signal. The identified filter data elements (the first and second component filters) are associated with the index values, and stored together with the index values in the filter memory. In order to filter the filter-application image area in the video signal, the filter data elements of the first and second components of the two-dimensional separable filter are selected from the filter memory, and the first and second index values corresponding to the selected filter data elements of the first and second components are obtained. The obtained index values are assigned to the bitstream of the coded video signal.

According to another aspect of the present invention, a method of decoding a video signal coded as a bitstream together with filter data elements for filtering the video signal are provided. The filter data elements are extracted from the bitstream of the coded video signal, and the index values are assigned to the filter data elements. The filter data elements to which the index values are assigned are stored in the filter memory together with the index values. The first and second indexes are extracted from a coded stream. The filter data elements are retrieved from the filter memory based on the extracted first and second indexes. The two-dimensional separable filter is set based on the obtained filter data elements of the first and second components. Using these, the filter-application image area in the video signal is filtered.

According to another aspect of the present invention, an encoder is provided which codes a video signal and provides the video signal coded as a bitstream together with the filter data elements for filtering the video signal. The encoder includes a filter calculating unit that identifies filter data elements of the first and second component filters of the two-dimensional separable filter, based on the filter-design image area in the video signal. The identified filter data elements are provided to the decoder using the bitstream of the coded video signal. The encoder includes an index generating unit that assigns index values to the identified filter data elements, and a filter memory that stores the index values and the filter data elements in association with each other. The filter selecting unit selects the filter data elements of the first and second components of the two-dimensional separable filter for filtering a filter-application image area in the video signal, from the filter memory, and obtains the first and second index values that are associated with the filter data elements. The obtained index values are provided to the bitstream of the coded video signal.

According to another aspect of the present invention, a decoder is provided which decodes a video signal coded as a bitstream together with filter data elements for filtering the video signal. The decoder includes a first extracting unit that obtains the filter data elements from the bitstream of the coded video signal. The decoder includes an index generating unit that assigns index values to the extracted filter data elements, and a filter memory that stores the index values and the filter data elements in association with each other. The decoder further includes a second extracting unit that obtains the first and second indexes from the bitstream, and a filter selecting unit that retrieves, from the filter memory, the filter data element of the first component associated with the first index and the filter data element of the second component associated with the second index. The filter setting unit sets the two-dimensional separable filter based on the obtained filter data elements of the first and second components, and filters the filter-application image area in the video signal, using the set filter.

The preferable component filter data element to be selected is a component filter data element used in the past. In other words, the component filter data element is a past component filter data element already set (identified) for another filter-design image area that precedes the current filter-design image area in coding order, and is a component filter data element obtained from the filter memory and applied to the filter-application image area within the current filter-design image area. Accordingly, the present invention has an advantage that the filter-design image area has only to be coded once, and that the complexity can be reduced. However, the filter data element of the same filter-design image area may be stored in the filter memory, and the filter data element for filtering the filter-application image area included in the filter-design image area may be selected for use. Accordingly, the filtering quality and the coding efficiency can be improved.

Preferably, the filter data element includes filter coefficients, and the first and second index values that are provided in the bitstream for the current block are coded based on the first and second index values of the block adjacent to the current block. The predictive coding provides an effective means for using the correlation between filter data elements of adjacent blocks and reducing the bandwidth necessary for storing and transmitting indexes. The second index provided in the bitstream of the current block may be coded based on the prediction using the first index of the current block. The bit rate can be reduced by using the correlation between the components of the two-dimensional separable filter.

According to another aspect of the present invention, the filter-application image area is an image block, and the filter data elements are provided within a slice header for each slice.

Preferably, the index value in proportion to the time during which the identified filter data element is stored in a filter memory is assigned to the identified filter data element, when the index is generated. As such, the minimum and maximum indexes in a filter table to be stored in the filter memory always correspond to the latest filter data elements, and the index values increase or decrease with respect to the old filter data elements. In particular, the index values may be assigned in display order or coding order of the filter-design image areas for identifying component filter data elements. The display order and the coding order may be different, particularly for the B frames. In general, it is an advantage if the index value in the table is proportional to the value of correlation between the filter data element for the currently coded area and the stored filter data element. The image area temporally and spatially closer (that is, a filter data element appropriate for filtering) is assumed to have a higher correlation than an image area temporally and spatially distant. However, other orders may be used in the present invention, and even assignment of the indexes may be explicitly signalized. It is important for the encoder and the decoder to hold the same indexes assigned to the filter data elements. Some orders may be switched. The switching may be performed based on transmission information.

Preferably, a video signal is coded and/or decoded in accordance with the H.264/MPEG-4 AVC standard, and a filter data element is included in an SEI. However, the present invention is not limited to the H.264/MPEG-4 AVC standard, the enhanced-function standard, and the following standard, and may be used for any other video coding mechanism, standard, or patent.

According to another aspect of the present invention, a computer program product including a computer-readable medium having a computer-readable program code embodied thereon is provided, the program code being adapted to implement the present invention.

According to another aspect of the present invention, a system is provided which transfers a video signal from an encoder to a decoder, and which includes the encoder, a channel for storing or transmitting a coded video signal, and the decoder. According to another aspect of the present invention, the channel corresponds to a recording medium, for example, a volatile or non-volatile memory, an optical or magnetic recording medium, such as CD, DVD, and BD, and a hard disk, a flash memory, and other recording medium. According to another aspect of the present invention, the channel is a transmission means, and can be formed by resources of a wireless or a wired system, or any combination of both in accordance with any standardized or proprietary transmission technology/system such as Internet, WLAN, UMTS, ISDN, and xDSL.

Preferably, many more filter data elements for one of two components of a two-dimensional separable filter are provided from the encoder to the decoder. In particular, the two components are horizontal and vertical components such that many more filter data elements on the horizontal component than those on the vertical component are provided to the decoder. As such, the amount of data to be transmitted can be reduced, and the image quality of decoded image data can be improved.

The present invention can be implemented not only as such an image coding method and an image decoding method, but also as a method of transmitting a filter data element, an apparatus that codes or decodes an image using these methods, a program causing a computer to execute the operations using these methods, and a recording medium onto which the program is recorded.

Advantageous Effects of Invention

The image coding method and the image decoding method according to the present invention suppress increase in the transmission bandwidth as well as improve the quality of video filtering.

BRIEF DESCRIPTION OF DRAWINGS

FIG. 9 illustrates data to be stored in a filter memory according to Embodiment 1 of the present invention.

FIG. 12 is an example syntax of a bitstream for providing indexes according to Embodiment 1 of the present invention.

FIG. 13 is an example syntax for jointly coding two indexes I_cur1 and I_cur2 of the current block according to Embodiment 1 of the present invention.

DESCRIPTION OF EMBODIMENTS

Figure 1:
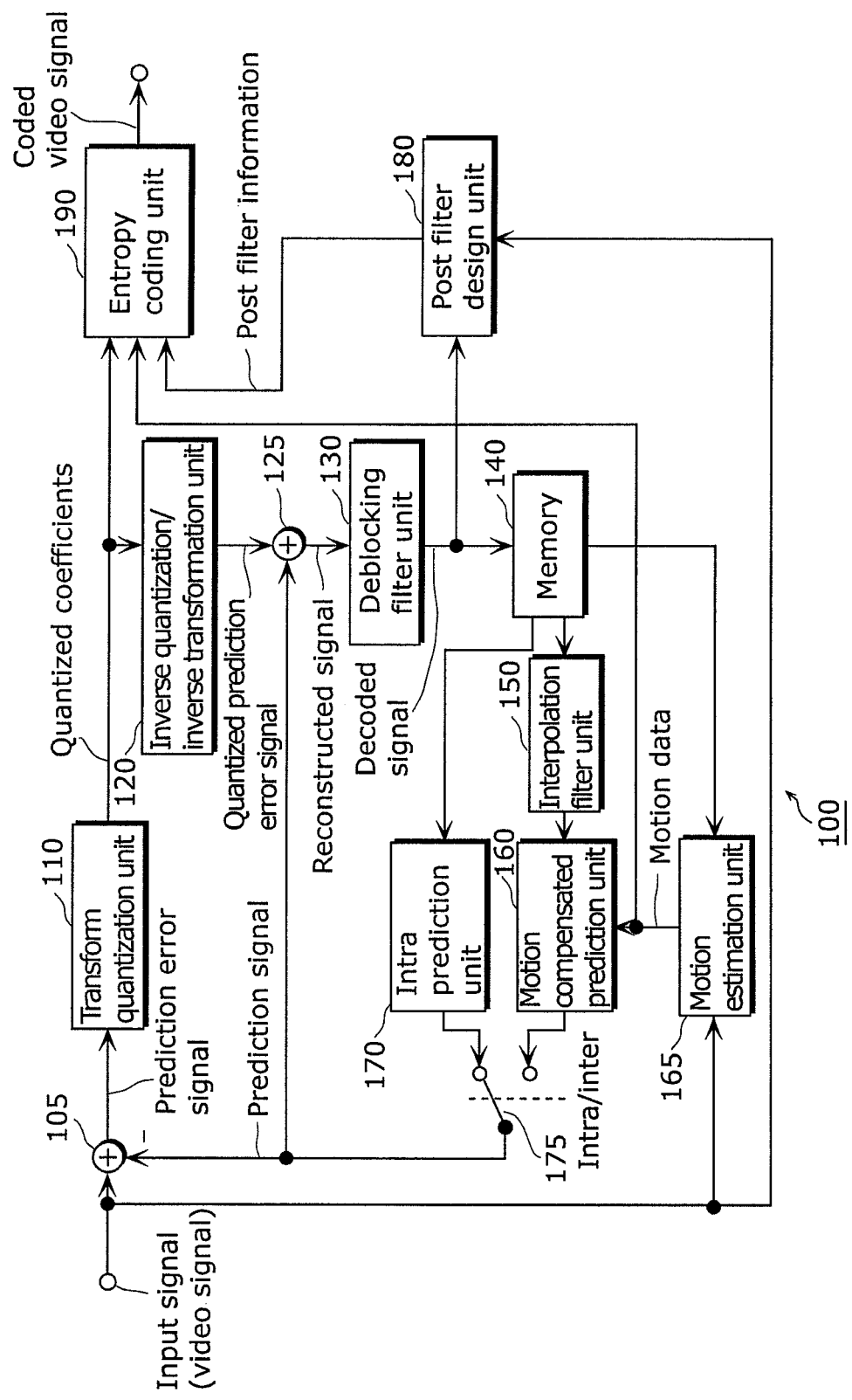
FIG. 1 is a block diagram illustrating an example of a typical H.264/MPEG-4 AVC standard compliant image coding apparatus (encoder).

The image coding method according to the present invention includes calculating of filter data (filter information) used to set up a filter at the decoder side and to filter the video signal during or after the decoding. These filter data is provided from the encoder to the decoder in the coded video signal that is a bitstream. The encoder can use the original video signal to be coded. The encoder may also include a decoder. The decoder cannot use the original video signal. The filter data is, for instance, the filter coefficients. For filtering images, two-dimensional filters are used. A two-dimensional separable filter may be split to a first-component filter and to a second-component filter (e.g. horizontal and vertical filters). The component filter (the first-component filter or the second-component filter) is one-dimensional. Instead of performing a two-dimensional convolution with the two-dimensional filter, filtering with a first-component filter may be performed and the so filtered signal may be then filtered with the second-component filter. This reduces the complexity by reducing the computational expense as well as the required memory size.

The performance of the decoder increases if the filter coefficients are adapted to the signal to be filtered. Since the characteristics of a video sequence change in spatial and temporal domains (typically the change is smooth), the filter coefficients are preferably adapted. Adapting of coefficients signifies their (re)calculation based on different image areas of the video signal, preferably the more recent image areas in order to reflect the changing signal characteristics. The choice of the area, for which the coefficients are calculated, is a trade-off between the quality (increasing with adaptation to the smaller image areas) on the one side and the complexity and data rate necessary for providing the filter coefficients on the other side. The filter coefficients have to be embedded into the bitstream. Thus, the existing bitstream structures such as sequence headers, frame headers, slice headers, macroblock headers, or specialized messages are preferably used to embed the filter data.

The present invention performs the adaptation in two phases. The first phase is calculating the filter coefficients for the first and/or the second one-dimensional filter (first and second component filters) based on a first image area (filter-design image area). The filter coefficients are provided to the decoder as described above. In addition, the calculated filter coefficients are stored at the encoder and after having been received also at the decoder. Each of the encoder and decoder has a filter memory, where these filter data is stored in relation with a unique index, which is either provided from the encoder to the decoder together with the filter data or generated locally in the same way at both of the encoder and decoder.

In the second phase, filter coefficients of the first and the second component filters are selected only among the filter coefficients stored in the filter memory. Instead of providing to the decoder the selected coefficients of the first-component filter, only an index value related in the filter memory with the selected coefficients is provided. Similarly, a second index value is provided which represents the filter coefficients selected for the second component-filter. Since both the encoder and the decoder maintain the same content of the filter memory, the decoder is capable of unambiguously retrieving the filter coefficients associated with the indexes parsed from the bitstream to be decoded.

It is an advantage of such a two-dimensional separable filter (adaptive filter) scheme that the indexes of the two component filters can be determined separately, this provides more flexibility and choice for the component filters. With a single index denoting each combination of the first and the second component filters (vertical and horizontal component filters), the memory requirements increase and the coding efficiency of coding indexes decreases (since there is more possible values and thus, longer codewords are to be used). Each combination of the filter coefficients (filter data) and the indexes may be stored either in a common table or in separate tables, for each component filter. The common storing is beneficial if the filter coefficients of the first and the second component filters (the vertical and horizontal component filters) are similar. A common storing requires less storage capacity. Separated component tables provide advantages if the first and the second component filters (the vertical and horizontal component filters) differ significantly. In such cases, each table may contain different filter coefficients, and each table has less entries, i.e., short codewords are available resulting in higher coding efficiency.

In this second phase, the filter coefficients may be selected for the image areas of the same size and/or type as the filter-design image area. Such image area is, for instance, a slice or a frame. For a first slice, filter coefficients are determined, coded and transmitted. For the next n slices following the first slice, indexes are sent which reference the transmitted filter coefficients of the first slice. The same is applicable to frames, macroblocks, or even to different structured such as image areas chosen based on object segmentation, etc.

Alternatively, the filter coefficients (filter data element) may be selected for the second image area (filter-application image area) smaller than the filter-design image area. For instance, the filter coefficients are calculated per frame and the second phase of selecting the filter coefficients is performed for each macroblock or block of the video signal. This provides a good tradeoff balance between the rate necessary for coding the filter coefficients and the local adaptation. However, the filter-application image area may also be larger than the filter-design area.

The above described mechanism may be applied to an arbitrary interpolation, loop- or post filter employed at the decoder and possibly also at the encoder (for instance, in the local decoder). The filtering may be applied to signals at different stages of the video coding such as prediction signal, prediction error signal, reconstructed signal, etc.

Embodiment 1

An image coding method and an image decoding method according to Embodiment 1 in the present invention will be described with reference drawings. In Embodiment 1, the filter data is calculated per slice and provided within the respective slice header. Indices for blocks in a slice are selected from a filter memory storing filter data calculated for previous slices. Thus, the filter memory is updated after coding and decoding the current slice. This enables the coding of a slice, and herein especially the motion estimation, in a single pass.

Figure 4:
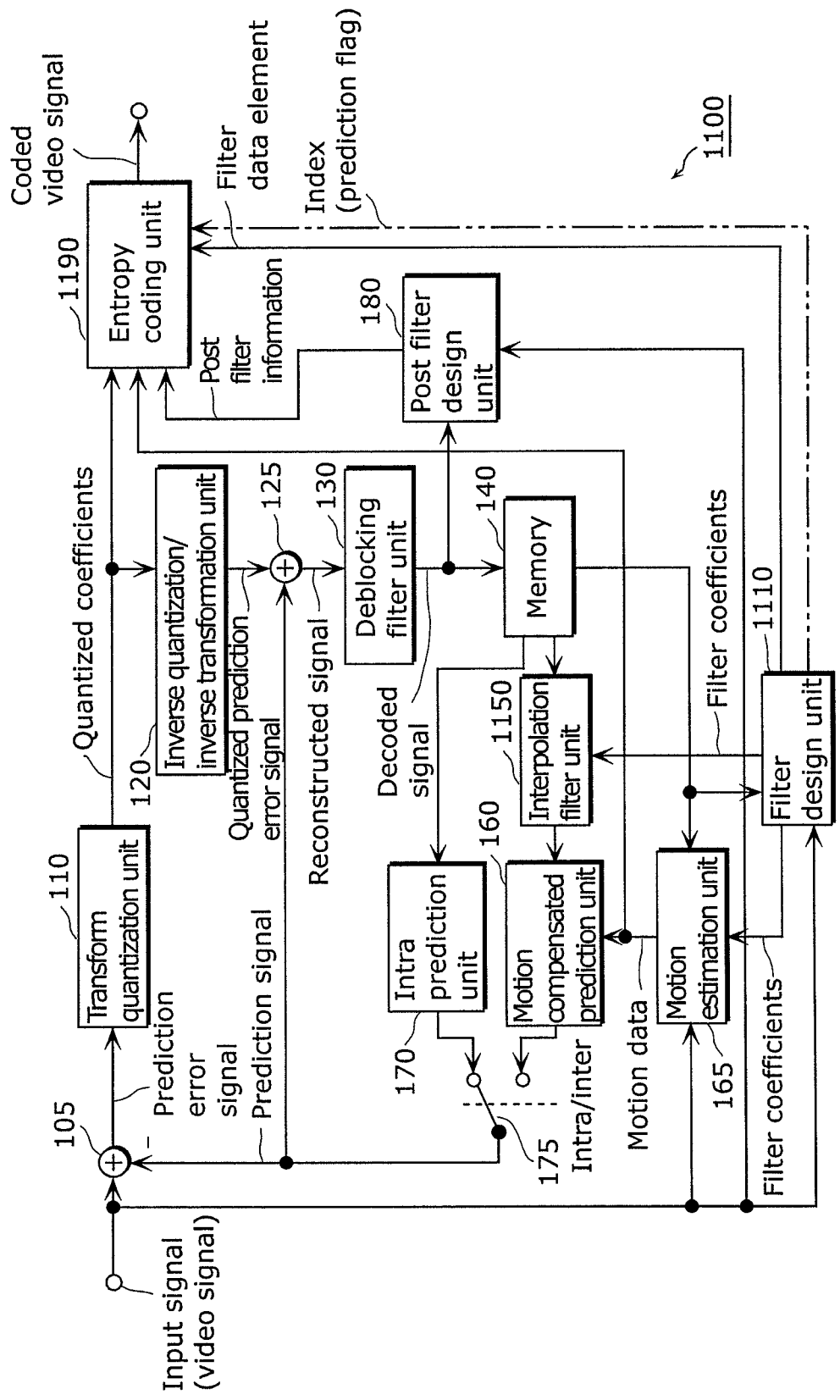
FIG. 4 is a block diagram of an image coding apparatus that is an encoder according to Embodiment 1 of the present invention.

FIG. 4 is a block diagram of an image coding apparatus 1100 that is an encoder according to Embodiment 1.

The image coding apparatus 1100 according to Embodiment 1 includes a subtractor 105, a transform quantization unit 110, an inverse quantization/inverse transformation unit 120, an adder 125, a deblocking filter unit 130, a memory 140, an interpolation filter unit 1150, a motion compensated prediction unit 160, a motion estimation unit 165, an intra prediction unit 170, an intra/inter switch 175, a post filter design unit 180, a filter design unit 1110, and an entropy coding unit 1190. The image coding apparatus 1100 according to Embodiment 1 is characterized by operations performed by the filter design unit 1110, the interpolation filter unit 1150, and the entropy coding unit 1190.

The subtractor 105 subtracts a prediction signal from a video signal that is an input signal to generate a prediction error signal.

The transform quantization unit 110 performs orthogonal transformation, such as DCT transform, and quantization on the prediction error signal generated by the subtractor 105 to generate quantized coefficients.

The inverse quantization/inverse transformation unit 120 inverse-quantizes and performs inverse orthogonal transformation, such as inverse DCT transform, on the quantized coefficients generated by the transform quantization unit 110 to generate a quantized prediction error signal.

The adder 125 adds the quantized prediction error signal corresponding to the prediction signal, to the prediction signal to generate a reconstructed signal.

The deblocking filter unit 130 removes coding artifacts from an image indicated by the reconstructed signal, and stores, in the memory 140, a decoded signal that is the reconstructed signal from which the coding artifacts are removed.

The interpolation filter unit 1150 obtains filter coefficients from the filter design unit 1110, and reads a reference image indicated by the decoded signal stored in the memory 140. Then, the interpolation filter unit 1150 interpolates a sub-pixel in the reference image using the filter coefficients.

The intra prediction unit 170 generates a prediction image of the current block to be coded (for example, macroblock) using intra prediction, and outputs a prediction signal indicating the prediction image.

The motion estimation unit 165 estimates a motion vector for a block included in the video signal, with reference to the reference image indicated by the decoded signal stored in the memory 140. Then, the motion estimation unit 165 outputs the motion vector as motion data to the motion compensated prediction unit 160 and the entropy coding unit 1190. Here, the motion estimation unit 165 according to Embodiment 1 obtains the filter coefficients from the filter design unit 1110, interpolates the sub-pixel in the reference image using the filter coefficients, and consequently estimates the motion vector with a sub-pixel resolution.

The motion compensated prediction unit 160 performs the motion compensation using (i) the reference image in which the interpolation filter unit 1150 interpolates the sub-pixel and (ii) the motion data output from the motion estimation unit 165. Accordingly, the motion compensated prediction unit 160 generates a prediction image of the current block to be coded using inter prediction, and outputs a prediction signal indicating the prediction image.

The intra/inter switch 175 switches between the prediction signal generated by the intra prediction unit 170 and the prediction signal generated by the motion compensated prediction unit 160, according to the coding type (prediction type) of the current block to be coded, and outputs one of the prediction signals to the subtractor 105 and the adder 125. For example, when the current block is coded using intra prediction, the intra/inter switch 175 outputs the prediction signal generated by the intra prediction unit 170 to the subtractor 105 and the adder 125. On the other hand, when the current block is coded using inter prediction, the intra/inter switch 175 outputs the prediction signal generated by the motion compensated prediction unit 160 to the subtractor 105 and the adder 125.

The post filter design unit 180 designs a post filter. In other words, the post filter design unit 180 calculates post filter information (filter coefficients) for making the decoded signal similar to the video signal that is the input signal, based on the decoded signal and the video signal. For example, the post filter design unit 180 calculates the post filter information so that the mean squared error between the decoded signal and the input signal is the smallest. Here, the post filter information may be determined by solving the Wiener-Hopf equations.

The filter design unit 1110 designs an interpolation filter based on the decoded signal and the video signal that is the input signal. In other words, the filter design unit 1110 calculates filter coefficients of a two-dimensional separable filter for each component filter, based on the original image indicated by the input signal (video signal) and the decoded image indicated by the decoded signal. The two-dimensional separable filter is, for example, a separable adaptive interpolation filter (SAIF). Furthermore, the filter design unit 1110 outputs a filter data element for identifying the calculated filter coefficients, to the entropy coding unit 1190. Furthermore, the filter design unit 1110 generates a prediction flag to be described later, and outputs the prediction flag to the entropy coding unit 1190.

The entropy coding unit 1190 generates and outputs a coded video signal by entropy coding (for example, arithmetic coding) the quantized coefficients, the motion data, the post filter information, the filter data element, the index, and the prediction flag. In other words, the coded filter data element, index, and prediction flag are added to the coded video signal.

Figure 5:
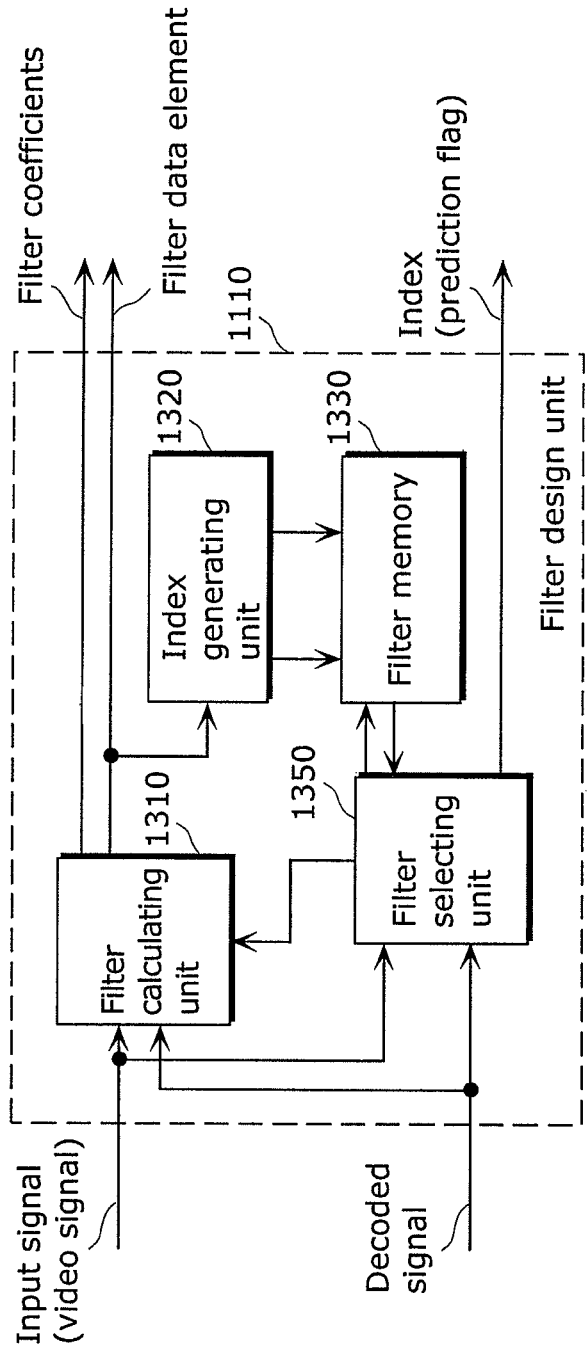
FIG. 5 is a block diagram illustrating a configuration of a filter design unit of the image coding apparatus.

FIG. 5 is a block diagram illustrating a configuration of the filter design unit 1110.

The filter design unit 1110 includes a filter calculating unit 1310, an index generating unit 1320, a filter memory 1330, and a filter selecting unit 1350.

The filter calculating unit 1310 calculates filter coefficients of the two-dimensional separable filter for each component filter so that the mean squared error between the original image indicated by the input signal (video signal) and the decoded image indicated by the decoded signal is the smallest. Here, the filter design unit 1110 calculates filter coefficients of the first and second component filters, for each filter-design image area (for example, slice) indicated by the video signal. Furthermore, the filter design unit 1110 outputs the filter data element for identifying the calculated filter coefficients, to the index generating unit 1320 and the entropy coding unit 1190. Although the filter calculating unit 1310 calculates the filter coefficients by solving the Wiener filter equations (the Wiener-Hopf equations), it may calculate the filter coefficients using other methods.

Furthermore, when the filter calculating unit 1310 obtains the filter data element from the filter selecting unit 1350, it outputs filter coefficients indicated by the filter data element, to the interpolation filter unit 1150. The filter data element obtained from the filter selecting unit 1350 is one of the filter data elements of the first and second component filters selected by the filter selecting unit 1350 for a filter-design image area.

When the index generating unit 1320 obtains the filter data elements of the first and second component filters from the filter calculating unit 1310, it generates a unique index for identifying each of the filter data elements of the first and second component filters, in accordance with a predetermined index generating rule. For example, the index generating unit 1320 generates an index that monotonically increases or decreases each time the filter data element is obtained. Then, the index generating unit 1320 assigns the generated index to each of the filter data elements and associates them to each other, and stores, in the filter memory 1330, the pairs of the associated filter data element and index. In other words, a pair of a filter data element and the index that corresponds to the first component filter and a pair of a filter data element and the index that corresponds to the second component filter are stored in the filter memory 1330 for the filter-design image area.

The filter selecting unit 1350 selects, for each filter-application image area (for example, macroblock) included in the filter-design image area (for example, slice), optimal filter data elements for the filter-application image area from at least one filter data element stored in the filter memory 1330. For example, the filter selecting unit 1350 selects filter data elements using rate-distortion (RD) optimization. In other words, the filter selecting unit 1350 selects filter data elements so that a difference between the filter-application image area indicated by the input signal (video signal) and the image area indicated by the decoded signal and corresponding to the filter-application image area is smaller and that the tradeoff balance between the code amount and artifacts becomes optimal. When the filter selecting unit 1350 selects the filter data elements of the first and second component filters, for each of the filter-application image areas, it outputs the filter data elements to the filter calculating unit 1310. Accordingly, the filter calculating unit 1310 outputs the filter coefficients corresponding to the filter data elements, to the interpolation filter unit 1150.

Furthermore, the filter selecting unit 1350 predicts each index to the first and second component filters, for each of the filter-application image areas. In other words, the filter selecting unit 1350 predicts indexes stored in the filter memory 1330, in association with the filter data elements to be selected for the filter-application image area, in accordance with a predetermined prediction rule.

For example, the filter selecting unit 1350 identifies filter-application image areas (hereinafter referred to as surrounding filter-application image areas) for which the filter data elements have already been selected and which surround a filter-application image area to be selected. Each of the surrounding filter-application image areas may be a macroblock, a block, and another unit.

Then, the filter selecting unit 1350 identifies a surrounding filter-application image area having a motion vector that is the most similar to the motion vector of the filter-application image area to be selected, from among the motion vectors of the surrounding filter-application image areas. Next, the filter selecting unit 1350 obtains one of the indexes stored in association with the filter data element that is already selected for the identified surrounding filter-application image area, as a prediction index from the filter memory 1330. As such, the prediction is performed by obtaining the prediction index. Here, the motion estimation unit 165 outputs, for each of the filter-application image areas, the motion vector (motion data) estimated for the filter-application image area to the filter design unit 1110. Accordingly, the filter selecting unit 1350 obtains, from the motion estimation unit 165, the motion vector for each of the filter-application image area to be selected and the surrounding filter-application image areas, and performs the prediction as described above.

When the filter selecting unit 1350 selects a filter data element for each of the filter-application image areas, it compares the prediction index with the index stored in the filter memory 1330 in association with the selected filter data element. When the prediction index matches the index associated in the filter memory 1330, the filter selecting unit 1350 outputs a prediction flag (prediction flag=1) indicating the matching to the entropy coding unit 1190, instead of the associated index. On the other hand, when they do not match each other, the filter selecting unit 1350 outputs, to the entropy coding unit 1190, a prediction flag (prediction flag=0) indicating no matching and the associated index.

The predicting of such index and outputting of the prediction flag are performed for each of the first and second component filters.

Figure 6:
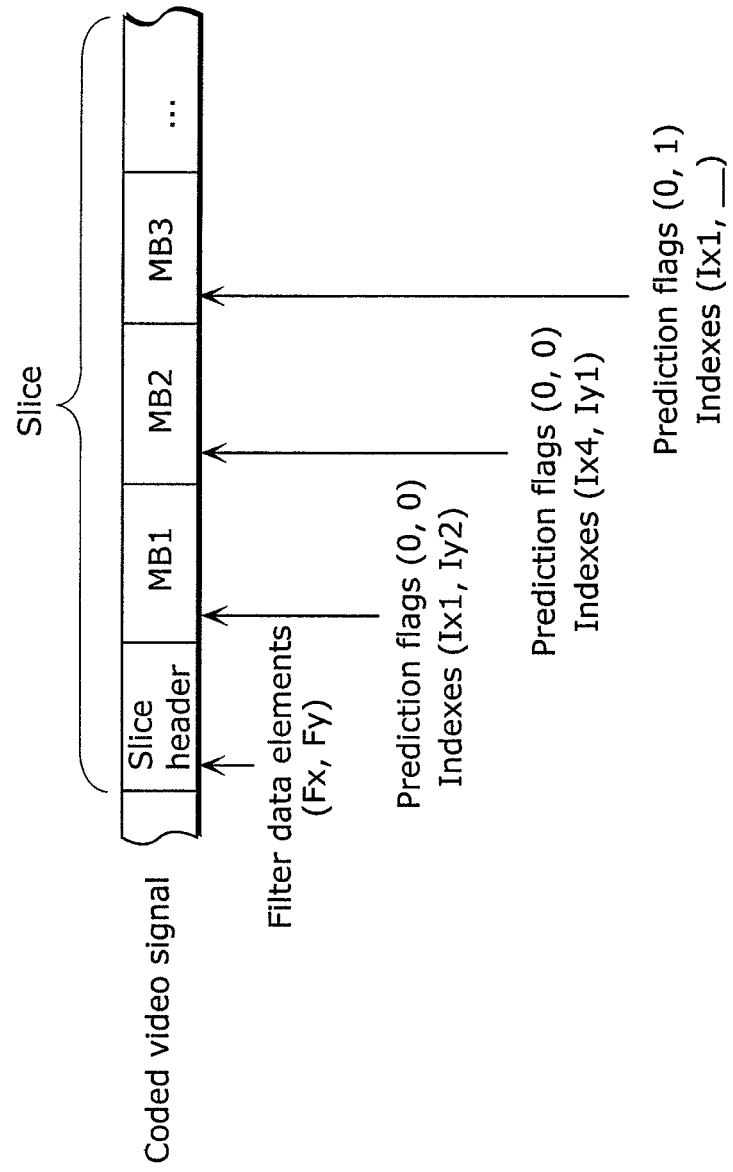
FIG. 6 illustrates a coded video signal according to Embodiment 1 of the present invention.

FIG. 6 illustrates a coded video signal.

The coded video signal includes, for example, filter data elements (Fx, Fy) and indexes (Ix1, Iy2). For example, when the filter-design image area is a slice, the slice header includes the first and second filter data elements (Fx, Fy) for identifying the filter coefficients calculated for the slice. Here, the first filter data element Fx is a data element indicating filter coefficients of a first component filter (horizontal component filter) of a two-dimensional separable filter, whereas the second filter data element Fy is a data element indicating filter coefficients of a second component filter (vertical component filter) of the two-dimensional separable filter.

Furthermore, when the filter-application image area is a macroblock, indexes associated with the filter data elements selected for the macroblock and the prediction flags are added to the macroblock. For example, as illustrated in FIG. 6, the prediction flag=0 and the index Ix1 of the first component filter, and the prediction flag=0 and the index Iy2 of the second component filter are added to the macroblock MB1. Furthermore, the prediction flag=0 and the index Ix4 of the first component filter, and the prediction flag=0 and the index Iy1 of the second component filter are added to the macroblock MB2. Furthermore, the prediction flag=0 and the index Ix1 of the first component filter, and the prediction flag=1 of the second component filter are added to the macroblock MB3. The prediction flag=1 indicates that the prediction index for the macroblock MB3 matches the index associated with the filter data element selected for the macroblock MB3.

Figure 7:
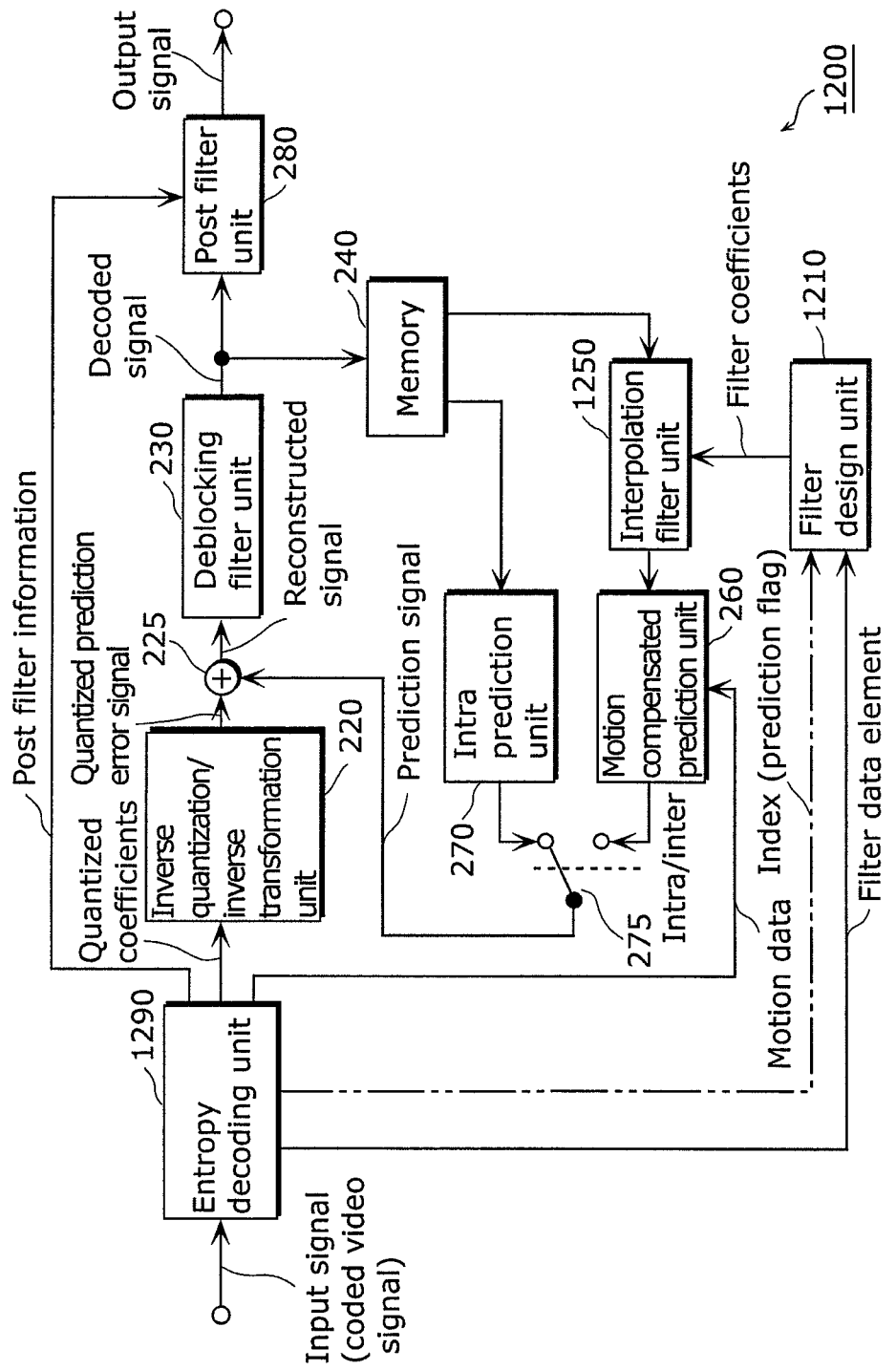
FIG. 7 is a block diagram of an image decoding apparatus that is a decoder, according to Embodiment 1 of the present invention.

FIG. 7 is a block diagram of an image decoding apparatus 1200 that is a decoder according to Embodiment 1.

The image decoding apparatus 1200 according to Embodiment 1 obtains, as an input signal, a coded video signal that is an output signal from the image coding apparatus 1100, and decodes the input signal. The image decoding apparatus 1200 includes an entropy decoding unit 1290, an inverse quantization and inverse transformation unit 220, an adder 225, a deblocking filter unit 230, a memory 240, an interpolation filter unit 1250, an intra prediction unit 270, an intra/inter switch 275, a motion compensated prediction unit 260, a post filter unit 280, and a filter design unit 1210. The image decoding apparatus 1200 according to Embodiment 1 is characterized by the entropy decoding unit 1290, the filter design unit 1210, and the interpolation filter unit 1250.

The entropy decoding unit 1290 entropy-decodes (for example, arithmetically decodes) the coded video signal that is the input signal to output the motion data, the quantized coefficients, and the post filter information to the motion compensated prediction unit 260, the inverse quantization and inverse transformation unit 220, and the post filter unit 280, respectively. Furthermore, through the entropy-decoding, the entropy decoding unit 1290 extracts the prediction flag, the index, and the filter data element from the coded video signal, and outputs these to the filter design unit 1210.

The inverse quantization and inverse transformation unit 220 inverse-quantizes and performs inverse orthogonal transformation, such as inverse DCT transform, on the quantized coefficients output from the entropy decoding unit 1290 to generate a quantized prediction error signal.

The adder 225 adds the quantized prediction error signal generated by the inverse quantization and inverse transformation unit 220, to the prediction signal corresponding to the quantized prediction error signal to generate a reconstructed signal.

The deblocking filter unit 230 removes coding artifacts from an image indicated by the reconstructed signal, and stores, in the memory 240, a decoded signal that is the reconstructed signal from which the coding artifacts are removed.

The interpolation filter unit 1250 obtains filter coefficients from the filter design unit 1210, and reads a reference image indicated by the decoded signal stored in the memory 240. Then, the interpolation filter unit 1250 interpolates a sub-pixel in the reference image using the filter coefficients.

The intra prediction unit 270 generates a prediction image of the current block to be decoded using intra prediction, and outputs a prediction signal indicating the prediction image.

The motion compensated prediction unit 260 performs the motion compensation using (i) the reference image in which the interpolation filter unit 1250 interpolates the sub-pixel and (ii) the motion data output from the entropy decoding unit 1290. Accordingly, the motion compensated prediction unit 260 generates a prediction image of the current block to be decoded using inter prediction, and outputs a prediction signal indicating the prediction image.

The intra/inter switch 275 switches between the prediction signal generated by the intra prediction unit 270 and the prediction signal generated by the motion compensated prediction unit 260, according to the coding type (prediction type) of the current block to be decoded, and outputs one of the prediction signals to the adder 225. For example, when the block to be decoded is coded using intra prediction, the intra/inter switch 275 outputs the prediction signal generated by the intra prediction unit 270 to the adder 225. On the other hand, when the current block to be decoded is coded using inter prediction, the intra/inter switch 275 outputs the prediction signal generated by the motion compensated prediction unit 260 to the adder 225.

The post filter unit 280 obtains the post filter information from the entropy decoding unit 1290, and applies a post filter to the decoded signal, based on the post filter information. As a result, the post filter unit 280 outputs the decoded signal to which the post filter is applied, as an output signal.

When the filter design unit 1210 obtains a filter data element of each component filter from the entropy decoding unit 1290, it generates an index to each of the filter data elements and associates the indexes to the filter data elements. Furthermore, when the filter design unit 1210 obtains the index from the entropy decoding unit 1290, it selects a filter data element associated with the index, and outputs the filter coefficients corresponding to the filter data element, to the interpolation filter unit 1250.

Furthermore, when the filter design unit 1210 obtains a prediction flag indicating 1 from the entropy decoding unit 1290, it predicts an index for the filter-application image area, and outputs the filter coefficients corresponding to the filter data element associated with the index (prediction index) obtained by the prediction, to the interpolation filter unit 1250.

Figure 8:
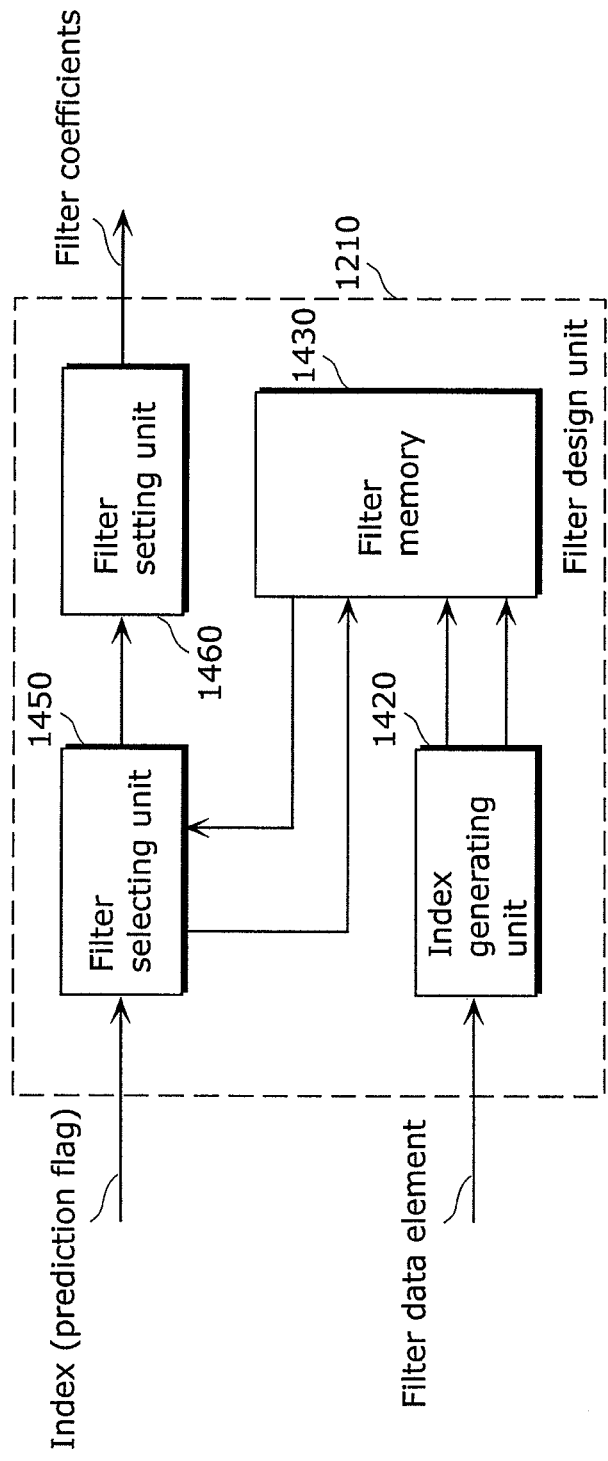
FIG. 8 is a block diagram illustrating a configuration of a filter design unit of the image decoding apparatus.

FIG. 8 is a block diagram illustrating a configuration of the filter design unit 1210.

The filter design unit 1210 includes an index generating unit 1420, a filter memory 1430, a filter selecting unit 1450, and a filter setting unit 1460.

When the index generating unit 1420 obtains a filter data element of each component filter from the entropy decoding unit 1290, for each of the filter-design image areas indicated by the coded video signal (for example, per slice), it generates an index for identifying each of the filter data elements in accordance with a predetermined index generating rule. The index generating rule is the same as that used by the index generating unit 1320 of the image coding apparatus 1100. For example, the index generating unit 1420 generates an index that monotonically increases or decreases each time the filter data element is obtained. Then, the index generating unit 1420 assigns the generated index to each of the filter data elements and associates them to each other, and stores, in the filter memory 1430, the pairs of the associated filter data element and the index.

When the filter selecting unit 1450 obtains the index from the entropy decoding unit 1290 for each of the filter-application image areas (for example, macroblocks) indicated by the coded video signal, it selects a filter data element stored in association with the index, from among the filter data elements stored in the filter memory 1430. Such obtaining of the index and selecting of a filter data element are performed for each two-dimensional separable filter. Then, the filter selecting unit 1450 outputs the selected filter data element of each of the component filters, to the filter setting unit 1460.

Furthermore, when the filter selecting unit 1450 obtains a prediction flag indicating 1 for the first or the second component filter of the filter-application image area, instead of an index, it predicts the index in accordance with the predetermined prediction rule. The prediction flag indicating 1 indicates that an index of a filter data element to be selected matches the prediction index. The index generating rule is the same as that used by the index generating unit 1320 of the image coding apparatus 1100.

For example, the filter selecting unit 1450 identifies filter-application image areas (hereinafter referred to as surrounding filter-application image areas) from which respective filter data elements have already been selected and which surround a filter-application image area to be selected. Each of the surrounding filter-application image areas may be a macroblock, a block, and another unit.

Then, the filter selecting unit 1450 identifies a surrounding filter-application image area having a motion vector that is the most similar to the motion vector of the filter-application image area to be selected, from among the motion vectors of the surrounding filter-application image areas. Next, the filter selecting unit 1450 obtains the index stored in association with the filter data element that is already selected for the identified surrounding filter-application image area, as a prediction index from the filter memory 1430. As such, each index is predicted by obtaining the prediction index. Here, the entropy decoding unit 1290 extracts, for each of the filter-application image areas, the motion vector (motion data) corresponding to the filter-application image area from a coded video signal, and outputs the extracted motion vector to the filter design unit 1210. Accordingly, the filter selecting unit 1450 obtains the motion vector for each of the filter-application image area to be selected and the surrounding filter-application image areas from the entropy decoding unit 1290, and performs the prediction as described above.

After the filter selecting unit 1450 predicts the index as described above, it selects a filter data element stored in association with the prediction index, among the filter data elements stored in the filter memory 1430 from the filter memory 1430. Then, the filter selecting unit 1450 outputs the selected filter data element to the filter setting unit 1460.

The filter setting unit 1460 obtains the filter data element for each of the component filters from the filter selecting unit 1450, identifies the filter coefficients corresponding to the filter data elements, and outputs the filter coefficients to the interpolation filter unit 1250. When a filter data element consists of one or more filter coefficients, the filter setting unit 1460 outputs the filter data element obtained from the filter selecting unit 1450 to the interpolation filter unit 1250 as the one or more filter coefficients. Alternatively, when a filter data element includes, for example, cross-correlation between a decoded signal and an input signal (video signal) and auto-correlation of the decoded signal, the filter setting unit 1460 may obtain the filter coefficients based on the filter data element.

FIG. 9 illustrates data elements to be stored in the filter memories 1330 and 1430.

A table 1000 is stored in each of the filter memories 1330 and 1430. The table 1000 indicates pairs of filter data elements and an index. In other words, when filter data elements and an index are stored in association with each other in each of the filter memories 1330 and 1430, the table 1000 is updated so that the pair is added to the table 1000.

For example, when the index generating unit 1320 generates an index "0" for filter data elements (c1, c2, c3, c4, c5, c6)=(0.02, −0.15, 0.63, 0.63, −0.15, 0.02) for the first component filter, it adds the pair to the table 1000.

Although the table 1000 is a table common to the first and second component filters, each of the filter memories 1330 and 1430 may separately hold two tables for the first and second component filters.

The operations performed by the image coding apparatus (encoder) 1100 and the image decoding apparatus (decoder) 1200 according to Embodiment 1 will be hereinafter described in detail.

Figure 10:
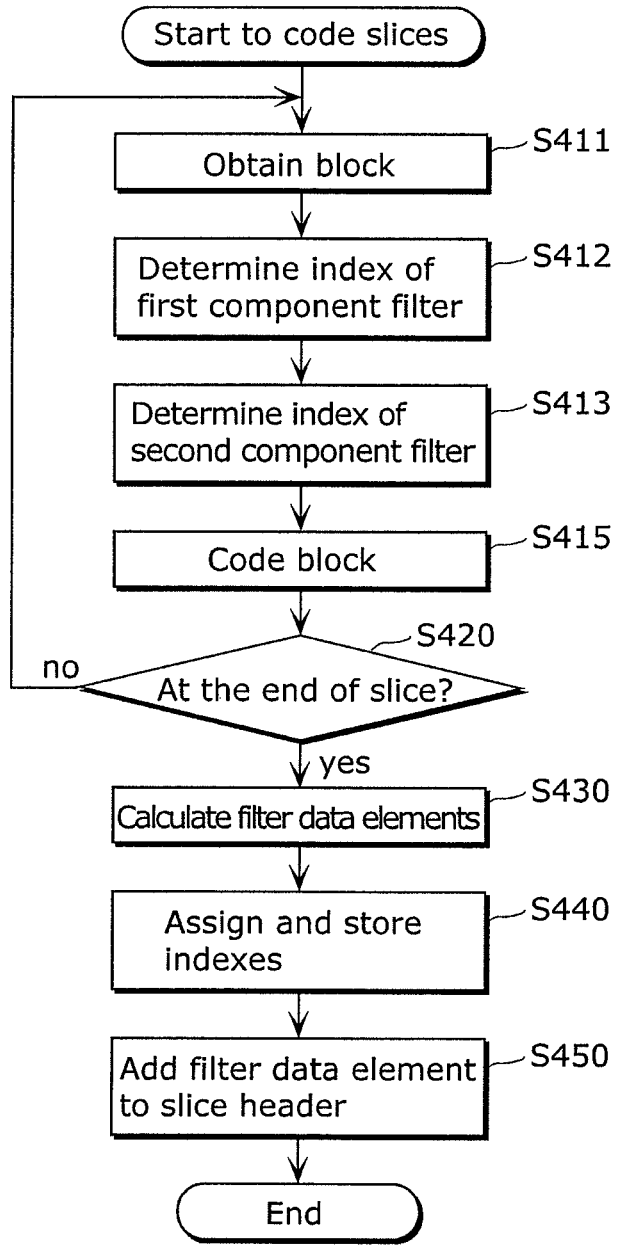
FIG. 10 is a flowchart of operations performed when an encoder codes slices on a per block basis according to Embodiment 1 of the present invention.

FIG. 10 is a flowchart of operations performed when an encoder codes slices on a per block basis. The blocks to be coded may be macroblocks or blocks of various sizes as described, for instance, with reference to the H.264/MPEG-4 AVC encoder and decoder in FIGS. 1 and 2, respectively. If the adaptive filter to be selected is an interpolation filter, subdivision of the slice to blocks corresponding to blocks used for motion estimation is preferably used. Furthermore, a filter-design image area is assumed to be a slice, and a filter-application image area is assumed to be a block (macroblock). Furthermore, the description of predicting indexes will be omitted for simplification in the flowchart of FIG. 10.

The filter selecting unit 1350 obtains a block (macroblock) included in a slice (Step S411). The filter selecting unit 1350 determines an index of a first component filter for the obtained block (Step S412). In other words, the filter selecting unit 1350 selects a filter data element of the first component filter for the obtained block, from the filter memory 1330, and obtains an index stored in the filter memory 1330 in association with the selected filter data element. Accordingly, the index is determined. Then, the index associated with the selected filter data element is then provided within the coded video signal instead of providing the entire filter data element of the first component filter.

Similarly, the filter selecting unit 1350 determines an index of a filter data element of a second component filter for the obtained block (Step S413). In other words, the filter selecting unit 1350 selects the filter data element of the second component filter for the obtained block, from the filter memory 1330, and obtains an index stored in the filter memory 1330 in association with the selected filter data element. Then, the index determined for the second component filter is provided within the coded video signal.

Preferably, the filter data element is selected for each of the first component and the second component (S412 and S413) in order to minimize the distortion after the filtering in both dimensions. For instance, each possible pair of filter data elements for the first component and the second component is considered to set-up a filter, and the filter is applied to the current block (fetched from the slice in Step S411). Finally, the pair is selected, which provides the lowest distortion with respect to the uncoded (original) input video signal. It is also possible to select the pair which results in the lowest Lagrangian costs of bit rate and reconstruction error.

These selection schemes require exhaustive testing of all the pairs. The number of tests may be reduced by pre-selection of the candidate filters, for instance, based on the characteristics of the block to be filtered (i.e., edges/smooth/texture, quantized filter coefficients, etc.).

After determining the indices of each component filter, the image coding apparatus 1100 codes the current block (Step S415). The coding here refers to obtaining a bitstream. In particular, the block may be coded in one of the coding modes of H.264/MPEG-4 AVC, using CAVLC or CABAC.

Here, the image coding apparatus 1100 determines whether or not a coded block is at the end of a slice, that is, the current slice includes other blocks (Step S420). When the image coding apparatus 1100 determines that the current slice includes other blocks (No at Step S420), it obtains the next block at Step S411. Steps S412, S413, and S415 of determining indexes of the first and second component filters and coding the block are performed similarly as described above for this next block. Repeatedly, these steps are performed for each block in the slice.

The indexes determined for the blocks are signalized as a part of the bitstream of a coded video signal, to the decoder. They may be positioned within the data related to the particular blocks or signalized all together within the slice header, or even sent using a separate message such as an SEI message in H.264/MPEG-4 AVC.

After the image coding apparatus 1100 determines that all blocks in the slice have been coded at Step S420 (Yes at S420), the filter calculating unit 1310 calculates a filter data element based on the coded slice (slice in a decoded signal) and the original slice (slice in a video signal) (Step S430). The filter data elements in this context are data used for setting-up a two-dimensional separable filter for filtering a video signal in spatial or in frequency domain. Thus, the filter data elements for setting-up the two-dimensional separable filter are two component filter data elements for identifying the respective one-dimensional component filters.

Figure 3:
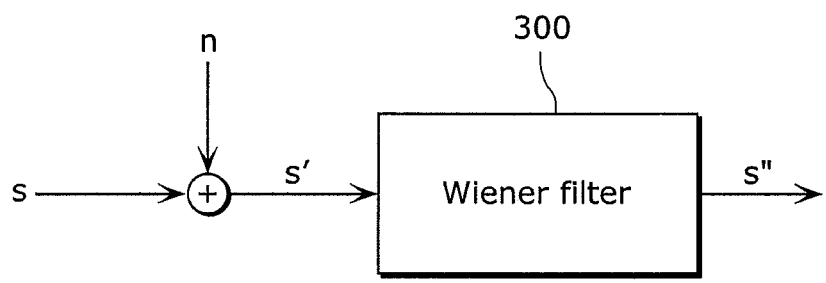
FIG. 3 illustrates a signal flow using a Wiener filter for noise reduction.

The filter data element may be determined, for instance, using a Wiener filter as described above with reference to FIG. 3. However, the filter data element for the purpose of the present invention may also be determined by designing a filter based on the video signal using any other filter design method. The filter data element may include filter coefficients. Alternatively, the filter data element may include information necessary for calculating the filter coefficients by the decoder. At the decoder, the input signal indicating the original image (video signal) is unknown, and the only input is assumed to be the coded video signal. Therefore, the filter data element preferably includes information related to the input signal to be input to the encoder. In particular, the information related to the input signal may be, for example, cross-correlation between a decoded signal and an input signal. The distortion of a decoded signal resulting from video coding is mostly caused by the quantization, and the difference between the input signal and the decoded signal is called quantization noise. Autocorrelation of the quantization noise may also be provided as a filter data element. The cross-correlation or the quantization noise may be used by the decoder to solve the Wiener filter equations. The autocorrelation matrix of the decoded signal may be determined by the decoder.

The index generating unit 1320 generates and assigns a unique index to a filter data element calculated for each component filter. Furthermore, the index generating unit 1320 stores the filter data element for each component filter together with the corresponding indexes in the filter memory 1330. Preferably, the filter data elements of the component filters associated with the indexes are stored in the same way at the encoder and at the decoder. This provides the advantage of automatic and implicit indexing which does not require coding of the indexes together with the filter data elements into a bitstream. However, the pairs of values (indexes and filter data elements) may also be signalized explicitly.

As illustrated in FIG. 9, it is assumed that the filter data element include six filter coefficients $c1, c2, c3, c4, c5$, and $c6$. The six filter coefficients determined for a particular slice are stored in one row of the table 1000 together with an automatically assigned index with a value between 0 and N. The table 1000 in this example thus lists N+1 such rows of filter coefficients.

Preferably, the table 1000 is a common table for storing filter data elements of the first component filter and the second component filter. For instance, if filter data elements of a vertical component and a horizontal component of the two-dimensional separable filter are determined for the slice and both of the filter data elements are to be stored, a certain index is assigned to the filter data element of the horizontal component filter (first component filter), and the filter data element is stored in a row of the table 1000. Furthermore, when the filter data element of the vertical component filter (the second component filter) is different from that of the horizontal component filter, another index is assigned to the filter data element of the vertical component filter, and the filter data element is stored in another row of the table 1000. The common storage for the filter data elements of the first component filter and the second component filter has the advantage of reducing the memory requirements, since each of the component filter data elements is only stored once.

However, a table similar to the table 1000 may be provided separately for storing the filter data element of the first component filter, and another such table may be provided for storing the filter data element of the second component filter. In such a case, the indexes are generated independently and separately for each table. The two tables may also contain the same filter data elements, for example, the same filter coefficients.

The generating and the assigning of the indexes in Step S440 may be performed in various ways. For example, when determining (generating) an index to a filter data element of each component filter for each slice, the index generating unit 1320 may generate and assign the indexes to be increased or decreased according to a determined order. For instance, the filter data element with an index "0" includes the filter coefficients of a predefined default which are not necessarily obtained based on the video signal to be coded. The filter data element with an index "1" includes the filter coefficients obtained for the vertical component filter for the last coded slice, and the filter data element with an index "2" includes the filter coefficients obtained for the horizontal component filter for the last coded slice. Similarly, the filter data elements with indexes 3 and 4 include filter coefficients of the vertical and the horizontal filters, respectively, calculated for the slice coded immediately before the last coded slice, etc. In this configuration, the index assigned to the same filter data elements in the table 1000 changes with each newly stored filter data element. The table 1000 has preferably a limited size of N+1 rows, wherein only the N component filter data elements that are newly generated are stored. Alternatively, the indexes may be assigned in the order of storing the new component filter data elements and as a ring buffer, i.e., once the table 1000 is full so that the oldest filter data element is overwritten.

Furthermore, the index generating unit 1320 may generate an index for each of the filter-design image areas (slices), and assign the index to each of the filter-design image areas so that values indicated by indexes of the first and second component filters corresponding to the filter-design image areas monotonically increase or decrease, according to (i) an order of storing the indexes of the first and second component filters corresponding to the filter-design image areas in the filter memory 1330 or (ii) an order of displaying the filter-design image areas.

The codeword table for coding indexes may also be (re)generated and ordered at the encoder and the decoder in the same way according to probability of occurrence. This allows for a simple derivation of variable length codewords for coding the indexes. In particular, integer (universal) codes, such as Elias, Golomb, and exp-Golomb may be used.

Alternatively, together with the transmission of each filter data element, information indicating whether the filter data element is to be stored and at which position in the table 1000 the filter data is to be stored may be transmitted. All already stored filter data element at this and behind this position could then be shifted in order to empty the row at this position in the table 1000. The shifted filter information at the last entry in the table 1000 could be discarded since it does no longer fit in the table 1000 of a limited size.

As soon as the table is full, the least used filter data element may be replaced with the new filter data element. Alternatively, as soon as the table 1000 is full, the filter data element the most similar to other filter data element stored in the table 1000 may be discarded and the new filter data may be stored at the free position.

Additionally, the vector (filter data element) of filter coefficients to be stored may first be compared to the vectors of filter coefficients stored in the table 1000, and may then be stored with a unique index value only if this vector differs from all the stored filter coefficient vectors.

Preferably, the table 1000 only stores a small number of filter data elements, i.e. between 2 to 8. This has the advantage of reducing the complexity for selecting out of the table 1000 the combination of filter data elements of the two component filters with the best performance for the given block from which a filter data element is selected. Another advantage is that the signaling overhead caused by providing the filter coefficients for each block can be kept reasonable. However, the more filters are available for the better adaptation of filtering to the local characteristics of the image. Thus, especially for application examples where the coding process may be performed slowly, the table 1000 with larger sizes may be beneficial.

At the beginning of the video sequence coding, the table 1000 may contain a default filter data element. It is also possible that the table 1000 includes several default filter data elements. However, the slice may also be coded after calculating the best filter data element for the slice. Other slices may then be decoded as described above, and one of the filter data elements is selected for the previously coded slice.

When the filter data elements and the indexes are stored in the filter memory 1330 in association with each other in Step S440, the filter calculating unit 1310 outputs the filter data elements (the filter data elements calculated in Step S430) to the entropy coding unit 1190. The entropy coding unit 1190 adds one of the filter data elements (a filter data element of at least one of two component filters) to a slice header (Step S450). Accordingly, the filter data element is embedded into the bitstream of the coded video signal. The filter data element may be coded, for instance by using a predictive coding and/or by using a variable length coding such as Huffmann, arithmetic, and any integer (universal) coding.

The coefficients (or in general filter data element) determined in the current frame/slice may also be differentially coded by using already transmitted filter data elements as a predictor. In other words, differences between the filter coefficients and the already transmitted filter data elements may be transmitted. In such a case, the indexes are transmitted for identifying the predictors (already transmitted filter data elements) used for coding the filter coefficients of the two current component filters.

When a video signal includes slices, the image coding apparatus 1100 repeatedly performs the processes of Steps S411 to S450. Furthermore, when Steps S411 to S450 are repeatedly performed, the filter data elements calculated in Step S430 are handled as past filter data elements and stored in the filter memory 1330. In the following Steps S412 and S413, filter data elements for a block to be processed are selected from among filter data elements including the past filter data elements stored in the filter memory 1330.

Figure 11:
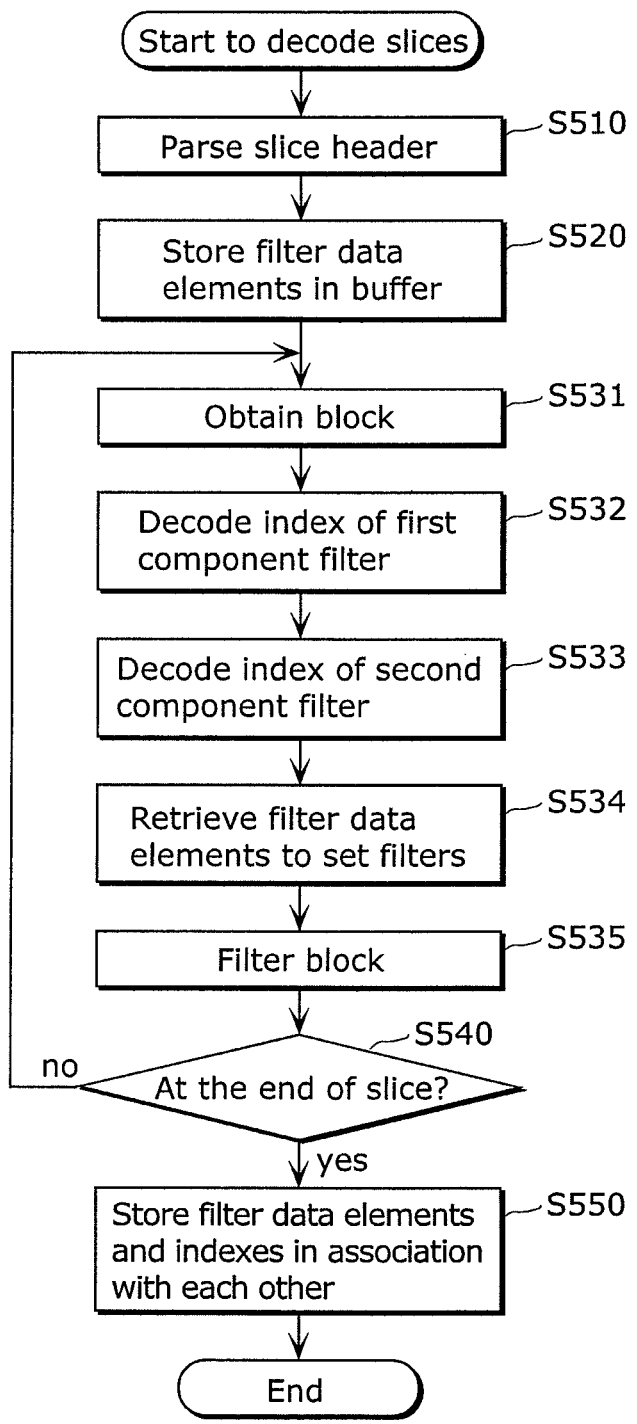
FIG. 11 is a flowchart of example operations performed when a decoder decodes the slices coded according to the procedure in FIG. 10, according to Embodiment 1 of the present invention.

FIG. 11 is a flowchart of example operations performed when a decoder decodes the slices coded according to the procedure in FIG. 10.

The entropy decoding unit 1290 parses a slice header from the bitstream of the coded video signal (Step S510). The index generating unit 1420 stores filter data elements of the component filters extracted from the slice header, in a buffer (not illustrated) (Step S520). Next, the entropy decoding unit 1290 obtains a block (macroblock) included in a slice (Step S531). Furthermore, the entropy decoding unit 1290 decodes an index of the first component filter (Step S532), and an index of the second component filter (Step S533).

The filter selecting unit 1450 obtains the decoded indexes of the first and second component filters, and retrieves the filter data elements stored in association with these indexes from the filter memory 1430. Then, the filter setting unit 1460 sets the retrieved two filter data elements (filter coefficients) to the first and second component filters (Step S534). The interpolation filter unit 1250 filters the block using the set first and second component filters (Step S535).

Here, the image decoding apparatus 1200 determines whether or not the filtered block is at the end of the slice (Step S540). When the image decoding apparatus 1200 determines that the filtered block is not at the end of the slice (No in Step S540), it repeatedly performs the processes from Step S531. On the other hand, when the image decoding apparatus 1200 determines that the filtered block is at the end of the slice (Yes in Step S540), the index generating unit 1420 generates index for each of the filter data elements stored in the buffer in Step S520 and associates the generated indexes with the filter data elements, and stores the pairs of the filter data element and the index in the filter memory 1430 (Step S550). When a coded video signal includes slices, the image decoding apparatus 1200 repeatedly performs the processes of Steps S510 to S550 for each of the slices.

In other words, the slice is block-wise decoded to be described as follows. Data of a first block is obtained from a bitstream and decoded. In steps S532 and S533, the indexes of the first and second component filters are obtained from the bitstream. The filter data elements of the first and second component filters associated with these indexes, respectively, are loaded from the filter memory 1430. Based on the filter data elements of the two component filters, the two component filters of a two-dimensional separable filter for filtering the first block are set up (Step S534), and the filter is applied to the first block (Step S535). If there are other blocks in the slice, the described block decoding processes are repeated for each block of the slice. After the end of slice is achieved (Yes in Step S540), the filter data elements together with the associated indexes buffered in Step S520 are stored in the filter memory 1430.

The two indexes signalized to the decoder, and identifying in the table 1000 the component filter data elements of the respective first and second filter components, are preferably coded. Each index may be coded independently from all other indexes using a fixed or variable length code. This way of coding is robust against errors and simple to perform. However, the indexes of the temporally or spatially neighbouring blocks are likely to be correlated. Therefore, preferably the indexes are coded in a way enabling to exploit this correlation, for instance by using a predictive coding.

FIG. 12 is an example syntax of a bitstream for providing indexes. Here, the two component filters are not only identified, but also coded independently. Furthermore, the syntax in FIG. 12 is for a separable adaptive interpolation filter (SAIF). However, a syntax element "if(apply_SAIF)" in the slice header of the syntax is modified into "if(apply_inloop_filter)" or "if(apply_post_filter)" as necessary, so that the modified syntax element can be used in an in-loop filter or a post filter.

A syntax element "Coefficient_table_size_minus1" is provided within the slice header and stored in the table 1000 in each of the filter memories of both of the encoder and decoder, and denotes the maximum index value regularly updated. If this syntax element is zero, no filter data element is stored in the filter memory. In such a case, default filter coefficients may be used, independent of the filter data element.

The filter selecting unit 1350 predicts indexes I_cur1 and I_cur2 of each component filter. In other words, the filter selecting unit 1350 predicts these indexes for the indexes I_cur1 and I_cur2. If the prediction index of I_cur1 is equal to I_cur1, a syntax element "most_probable_filter_component1" is set to 1, otherwise to 0. Here, the syntax element "most_probable_filter_component1" is a prediction flag described above, for the first component filter. Similarly, if the prediction index of I_cur2 is equal to I_cur2, a syntax element "most_probable_filter_component2" is set to 1, otherwise to 0. Here, the syntax element "most_probable_filter_component2" is a prediction flag described above, for the second component filter.

Preferably, the indexes I_cur1 or I_cur2 are predicted based on the indexes determined for the neighbouring and already coded (at least by the encoder) or decoded (at least by the decoder) blocks. The indexes I_top1 and I_top2 denote the indexes of the first and the second component filters selected for the block adjacent to and on the top of the current block. Indexes I_left1 and I_left2 denote the indexes of the first and second component filters selected for the block immediately left to the current block. There are several alternatives to determine the prediction index.

The prediction index I_cur1_pre of the first (and also of the second) component filter of the current block may be derived from an arbitrary function F of the indexes selected for the blocks on the top or on the left of the current block. For example, the prediction index is derived as follows.

$$I\_cur1\_pre = F(I\_top1, I\_left1, I\_top2, I\_left2)$$

An example of the function F is a function for selecting the minimum value of the indexes I_top1, I_left1, I_top2, and I_left2. In other words, the function F is defined as follows.

$$F = \min(I\_top1, I\_left1, I\_top2, I\_left2)$$

Such prediction is efficient in particular, if the probability of the use of a filter data element decreases with an increasing index in the table 1000. This is the case, if the filter data element in the table 1000 is ordered in accordance with the time of their determination, the last determined (generated) index being always the first index, the index determined before, being the second index, etc. The minimum function may also be applied only to the same component filters of the neighbouring blocks. Here, the function F is defined as, for example, $F = \min(I\_top1, I\_left1)$. Alternatively, the function F may be defined so as to indicate the minimum value of the indexes (subset) arbitrarily selected from among the indexes I_top1, I_left1, I_top2, and I_left2. The function F is defined as, for example, $F = \min(I\_top1, I\_top2)$.

Similarly, if the probability of the use of a filter increases with an increasing index in the table 1000, the maximum function will be advantageous. For example, the function F is defined as follows.

$$F = \min(I\_top1, I\_left1, I\_top2, I\_left2)$$

This is the case, for instance, if the newly determined filter data element is assigned to the next higher index. Again, the function F may be applied to subsets of any indexes such as: $F = \max(I\_top1, I\_left1)$, or $F = I\_top1$, and $F = I\_left1$.

The prediction function F may even take a constant value such as $F = 0$, $F = 1$, ..., $F =$ "Coefficient_table_size_minus1". However, the function F may be also different depending on whether or not the minimum or maximum. Functions such as an average, a weighted average, or any other functions are applicable to the present invention and may be determined in accordance with the characteristics of the video signal to be coded.

Alternatively, the function F (I_top1, I_left1, I_top2, I_left2) may be defined as a complete table, indicating the most probable index for each combination of I_top1, I_left1, I_top2, and I_left2. Again, the table may also be defined for a subset, for example, of the indexes I_top1 and I_left1. Such a prediction table may be fixed. A fixed prediction table may be obtained, for instance by evaluating a test set and measuring the correlation/differences between the indexes I_top1, I_left1, I_top2, and I_left2. However, the prediction table can be also adaptive, measured for parts of a video sequence such as GoP (Group of Pictures), frame, slice, etc., and transmitted as header information (forward adaptation). Alternatively, the prediction table may be measured during the coding/decoding of the part of the video sequence and adapted to the statistics (backward adaptation).

Although the above examples focus on using the top and the left blocks neighbouring with the current block, the present invention is not limited thereto. Other already coded/decoded (spatially and temporally) neighboring blocks could also be considered. Temporally neighboring blocks could be the ones following the motion trajectory (P-Frames) or trajectories (B-Frames) determined using motion estimation.

In the case where the index I_cur1 of the current block does not equal its prediction index I_cur1_pre, the syntax element "most_probable_filter_component1" is set to 0 and the syntax element "filter_index_1" is provided. The syntax element "filter_index_1" is an index indicating the filter data element of the first component filter selected for the block (macroblock). In such a case, codewords are assigned to all indexes in the table 1000, except the one used as the prediction index "I_cur1_pre". This can be done e.g. based on a fixed codeword table of a fixed length or a variable length code, such as Huffman code, and the codeword table has coefficient_table_size_minus1 entries.

The codeword table may be regularly updated, for instance, by adapting it to the probability of the occurrence of the indexes. The update may be performed once per frame, or slice, or GoP, etc. or even irregularly, triggered by the changing probability of the indexes. Update of the code words for the coding of the indices enables further increasing of the coding efficiency (similar to the update of the code in the case of the reference frame index in H.264). Information about the code word update is provided from the encoder to the decoder, i.e., embedded within the bitstream. The binary symbols of the codeword table may also be coded arithmetically. For this purpose, CABAC may be used.

The prediction and coding of the index I_cur1 of the first component filter of the current block and the prediction and coding of the index I_cur2 of the second component filter of the current block may be performed in similar ways as shown above. The function F may differ between the index of the first component filter and the index of the second component filter. For instance, the index of the first component filter in the current block may be predicted based on indexes of the first component filter in the neighbouring blocks only, and the index of the second component filter in the current block may be predicted based on indexes of the second component filter in the neighbouring blocks only. If the prediction index I_cur2_pre=I_cur2, the syntax element "most_probable_filter_component2" is set to 1, otherwise to 0. Here, the syntax element "most_probable_filter_component2" is a prediction flag described above, for the second component filter.

The prediction index I_cur2_pre of the index of the second component filter of the current block may be determined using also the index of the first component filter. The simplest case, which is efficient if the vertical and the horizontal component filters are correlated, is a case where the prediction index I_cur2_pre=index I_cur1. However, other combinations may provide advantages by exploiting both the correlation between the indexes of the neighbouring blocks and the correlation between indexes of the two current component filters. For example, the prediction index I_cur2_pre is derived using the function F as follows.

$$I\_cur2\_pre = F(I\_top1, I\_left1, I\_top2, I\_left2, I\_cur1)$$

Again, the function F is an arbitrary function. It may be a minimum or a maximum function depending on the way of generating the indexes for storing the filter data elements in the filter memory. In other words, the function F is defined as $F = \min (I\_top1, I\_left1, I\_top2, I\_left2, I\_cur1)$ or $F = \max (I\_top1, I\_left1, I\_top2, I\_left2, I\_cur1)$. The function F may be calculated based only on a subset of indexes I_top1, I_left1, I_top2, I_left2, I_cur1, such as F=min(I_top2, I_left2, I_cur1), or F=min(I_top2, I_cur1), or F=max (I_top2, I_left2, I_cur1), or F=I_top2, or F=I_left2, or constant value functions F=0; F=1; . . . ; F=Coefficient_table_size_minus2.

Alternatively, the function F may be defined as follows.

$$F=\min(\text{Coefficient\_table\_size\_minus1}, \max(0, I\_cur1+1))$$

Such a function F is simple and may be efficient if the filter data element of the second component filter is always stored after the filter data element of the first component filter. If the filter data element of the second component filter is stored before the filter data element of the first component filter, the following function F may provide a simple and efficient way of predicting.

$$F=(\text{Coefficient\_table\_size\_minus1}, \max(0, I\_cur1-1))$$

Again, the function F may also be defined as a prediction table indicating the most probable index for each combination of the indexes I_top1, I_left1, I_top2, I_left2 and I_cur1 or their subset.

In the case where the index I_cur2 of the current block does not equal its prediction index I_cur2_pre, the syntax element "most_probable_filter_component2" is set to 0 and the syntax element "filter_index_2" is provided. The syntax element "filter_index_2" is an index indicating the filter data element of the second component filter selected for the block (macroblock). The syntax element "filter_index_2" may be coded similarly as "filter_index_1".

Here, the indexes of the two filter components may also be coded jointly. In this case, an individual code word is assigned to each possible pair of the first and the second indexes. Hereinafter, indexes of two component filters will be referred to as an index pair, and the vector indicating the index pair will be referred to as a pair vector. In addition, a temporal prediction of the index pairs from previously coded index pairs may be advantageous for reducing the amount of data to be transmitted. In this case, all possible pair vectors of (I_cur1, I_cur2) are represented by new symbols, which are then coded. This coding method may be beneficial for rather small filter tables 1000, i.e., if "Coefficient_table_size_minus1" is quite small. Thus, the number of vectors (filter data elements) that consist of filter coefficients and the code length that are selected for one block are reduced.

FIG. 13 is an example syntax for jointly coding the two indexes I_cur1 and I_cur2 of the current block. As the syntax in FIG. 12, the syntax in FIG. 13 is for a separable adaptive interpolation filter (SAIF). However, a syntax element "if (apply_SAIF)" in the slice header of the syntax is modified into "if(apply_inloop_filter)" or "if(apply_post_filter)" as necessary, so that the modified syntax element can be used in an in-loop filter or a post filter.

The components I_cur1 and I_cur2 of the pair vector (I_cur1, I_cur2) could be predicted independently by the above described methods. This would result in a prediction pair vector (I_cur1_pre, I_cur2_pre). In the case where the pair vector (I_cur1, I_cur2) of the current block does not equal its prediction pair vector (I_cur1_pre, I_cur2_pre), the syntax element "most_probable_filter_combination" is set to 0, otherwise 1.

The prediction pair vector (I_cur1_pre, I_cur2_pre) could also be set to a pair vector (I_nei1, I_nei2) of the neighboring blocks. Such neighbouring block for prediction is preferably selected from among the neighboring blocks as the neighbouring block with a motion vector that is the most similar to the motion vector of the current block. Alternatively, the neighbouring block for prediction may be selected from among the neighboring blocks as a neighbouring block of the block mode which is the most similar to the block mode (coding mode or prediction mode) of the current block. Other alternatives may be chosen in order to implement the present invention. The prediction pair vector (I_cur1_pre, I_cur2_pre) could also be fixed, e.g. using the index of the left or to the top neighboring block.

In the case where the pair vector (I_cur1, I_cur2) of the current block does not equal its prediction pair vector (I_cur1_pre, I_cur2_pre), the syntax element "most_probable_filter_combination" is set to 0, otherwise 1. In this case, codewords are assigned to all pair vectors (I_cur1, I_cur2), except for the one used as a prediction pair vector (I_cur1_pre, I_cur2_pre). This can be done, for instance, based on a fixed codeword table of a fixed or a variable length code. The codeword table has the number of entries as follows.

$$(\text{Coefficient\_table\_size\_minus1}+1) \times (\text{Coefficient\_table\_size\_minus1}+1)-1$$

Another possibility of predictive coding is the prediction derived by generating prediction signals based on the component filters rather than on the indexes themselves.

Still another possibility for obtaining the prediction of indexes of the current component filters is to use the filter data elements. In particular, a video signal of the current block may be reconstructed by using each of the filter data elements listed in the filter memory. For the reconstruction, different prediction signals are generated by using all possible filter data elements, and the quantized prediction error signal is added to the generated prediction signals. Then, a distortion measure is calculated between each of the border pixels of the reconstructed signals (corresponding to the current block reconstructed using different filters) and the neighboring reconstructed signal (neighbouring block). The distortion may be, for instance, a sum of absolute or squared differences, or any other distortion measure. Finally, the indexes leading to the lowest distortion are selected as the prediction indexes of the current block. Such a prediction mechanism is more complex than directly predicting indexes from other indexes. However, better prediction accuracy may be achieved.

Figure 14:
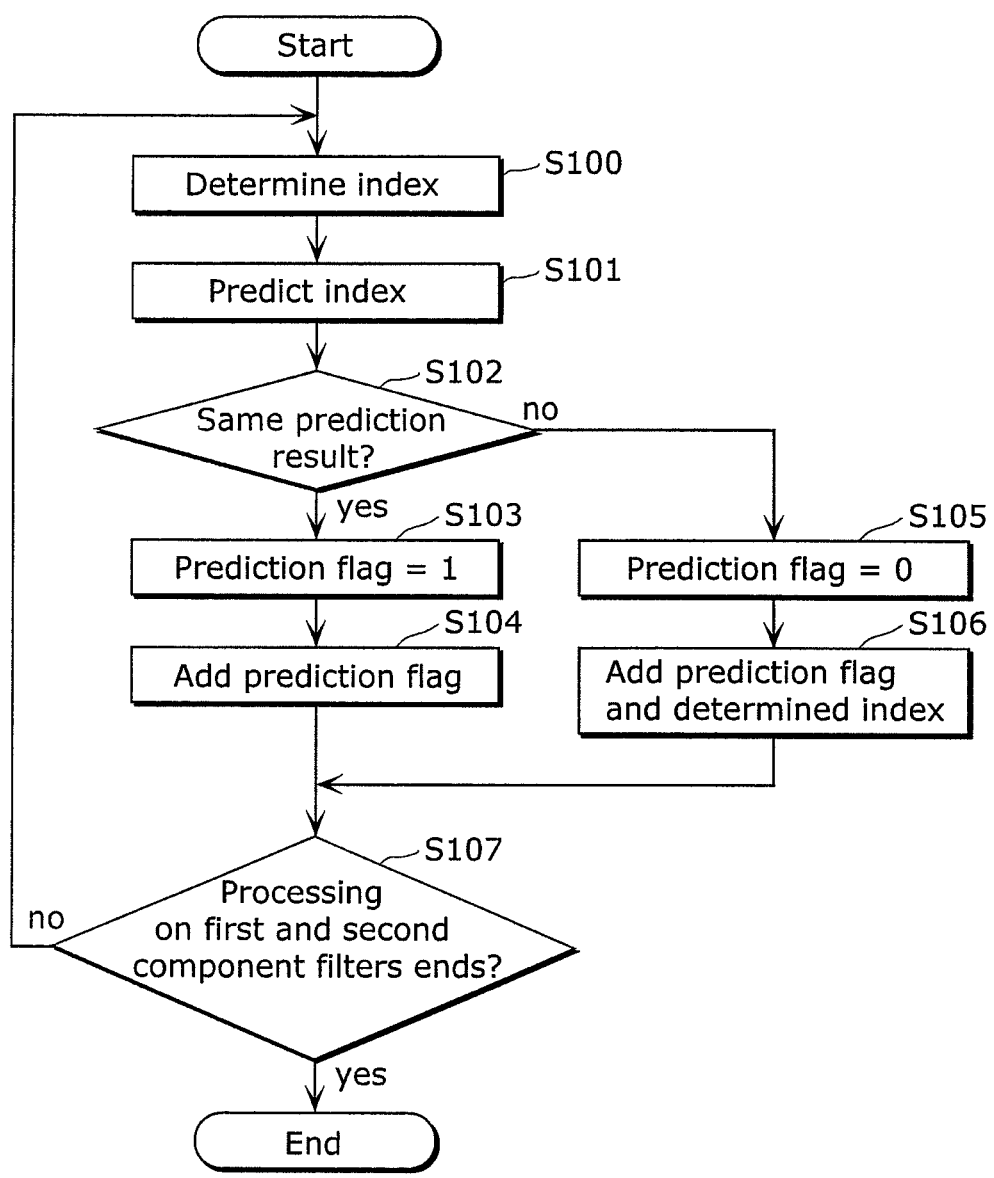
FIG. 14 is a flowchart of prediction operations performed by the filter selecting unit of the image coding apparatus according to Embodiment 1 of the present invention.

FIG. 14 is a flowchart of prediction operations performed by the filter selecting unit of the image coding apparatus 1100.

The filter selecting unit 1350 initially determines an index of a first component filter when predicting indexes of the first and second component filters for a macroblock to be processed that is a filter-application image area (Step S100). In other words, the filter selecting unit 1350 selects a filter data element of the first component filter that corresponds to the macroblock to be processed, from among filter data elements stored in the filter memory 1330 based on an input signal and a decoded signal. Then, the filter selecting unit 1350 determines the index of the first component filter that corresponds to the macroblock to be processed, by obtaining the index stored in the filter memory 1330 in association with the selected filter data element.

Next, the filter selecting unit 1350 predicts the index of the first component filter that corresponds to the macroblock to be processed, using the surrounding filter-application image areas described above (Step S101). Each of the surrounding filter-application image areas may be, for example, a macroblock (surrounding macroblock) that surrounds the macroblock to be processed. In other words, the filter selecting unit 1350 selects one of the indexes already determined for the surrounding filter-application image areas, as a prediction index in accordance with a predetermined prediction rule.

Here, the filter selecting unit 1350 determines whether or not the index determined in Step S100 is the same as the index predicted in Step S101 (prediction index) for the first component filter (Step S102).

When determining that the indexes are the same (Yes in Step S102), the filter selecting unit 1350 sets the prediction flag to 1 (Step S103), and adds the prediction flag to a coded video signal by outputting the prediction flag to the entropy coding unit 1190 (Step S104).

On the other hand, when determining that the indexes are different (No in Step S102), the filter selecting unit 1350 sets the prediction flag to 0 (Step S105), and adds the prediction flag (=0) and the index determined in Step S100 to the coded video signal by outputting the prediction flag and the index to the entropy coding unit 1190 (Step S106).

Then, the filter selecting unit 1350 determines whether or not the processing on the first and second component filters ends (Step S107). When determining that the processing does not end (No in Step S107), the filter selecting unit 1350 repeatedly performs the processes from Step S100 for the second component filter.

Figure 15:
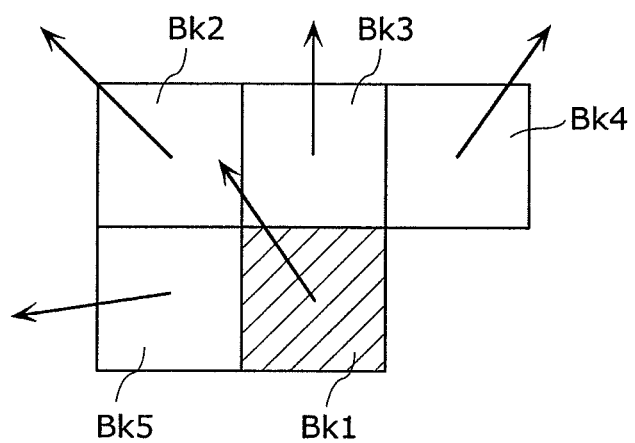
FIG. 15 illustrates an example for predicting indexes according to Embodiment 1 of the present invention.

FIG. 15 illustrates an example for predicting indexes.

When the filter selecting unit 1350 predicts an index in Step S101 in FIG. 14, it uses, for example, motion vectors of the surrounding macroblocks Bk2 to Bk5 that are adjacent to the upper left, upper, upper right, left of the macroblock to be processed Bk1 as illustrated in FIG. 15. In other words, the filter selecting unit 1350 identifies a surrounding macroblock from which a motion vector that is the most similar to the motion vector of the macroblock to be processed Bk1 is estimated, from among the surrounding macroblocks Bk2 to Bk5. For example, when the most similar motion vector is the motion vector of the surrounding macroblock Bk2, the filter selecting unit 1350 selects the index already determined for the surrounding macroblock Bk2, as the prediction index of the macroblock to be processed Bk1. Here, the indexes already determined for the surrounding macroblock Bk2 include two indexes of the first and second component filters. Thus, the filter selecting unit 1350 may select an index of a component filter of the same type as a component filter with an index for which the macroblock to be processed Bk1 is to be predicted, out of the two indexes of the surrounding macroblock Bk2 as the prediction index. For example, when the component filter with the index to be predicted is the first component filter, the filter selecting unit 1350 selects, as the prediction index, the index of the first component filter out of the two indexes of the first and second component filters of the surrounding macroblock Bk2.

Furthermore, the filter selecting unit 1350 may use respective reference indexes of the surrounding macroblocks Bk2 to Bk5 when predicting the index in Step S101 of FIG. 14. Each of the reference indexes indicates a picture referred to when a macroblock corresponding to the reference index is coded (reference picture indicated by a decoded signal stored in the memory 140). Here, the filter selecting unit 1350 identifies a reference index that is identical or the most similar to the reference index of the macroblock to be processed Bk1, from among the four reference indexes of the surrounding macroblocks Bk2 to Bk5. For example, when the reference index of the macroblock to be processed Bk1 is identical to that of the surrounding macroblock Bk2, the filter selecting unit 1350 selects the index already determined for the surrounding macroblock Bk2, as the prediction index of the macroblock to be processed Bk1.

Furthermore, the filter selecting unit 1350 may use respective block modes of the surrounding macroblocks Bk2 to Bk5 when predicting the index in Step S101 of FIG. 14. Each of the block modes is a mode for coding a macroblock corresponding to the block mode. The block modes include, for example, coding using forward or backward reference prediction, coding bi-directional forward and backward reference prediction, direct mode, intra prediction, and inter prediction.

Here, the filter selecting unit 1350 identifies a block mode that is identical or the most similar to the block mode of the macroblock to be processed Bk1, from among four block modes of the surrounding macroblocks Bk2 to Bk5. For example, when the block mode of the macroblock to be processed Bk1 is identical to that of the surrounding macroblock Bk2, the filter selecting unit 1350 selects the index already determined for the surrounding macroblock Bk2, as the prediction index of the macroblock to be processed Bk1.

Figure 16:
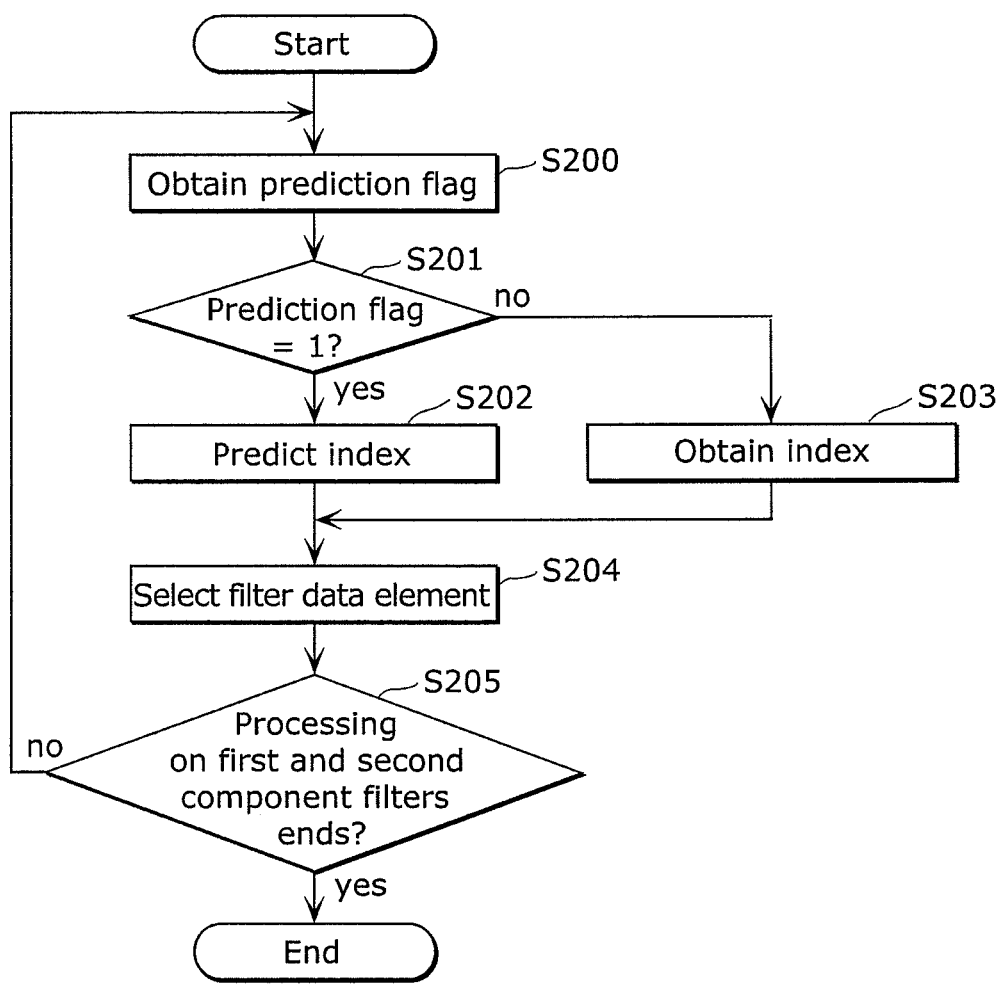
FIG. 16 is a flowchart of operations for selecting filter data elements using the prediction by the filter selecting unit of the image decoding apparatus.

FIG. 16 is a flowchart of operations for selecting filter data elements using the prediction by the filter selecting unit 1450 of the image decoding apparatus 1200.

The filter selecting unit 1450 initially obtains a prediction flag for the first component filter from the entropy decoding unit 1290 when selecting filter data elements of the first and second component filters for a macroblock to be processed that is a filter-application image area (Step S200).

The filter selecting unit 1450 determines whether or not the prediction flag indicates 1 (Step S201). Here, when the filter selecting unit 1450 determines that the prediction flag indicates 1 (Yes in Step S201), it predicts an index of the first component filter for the macroblock to be processed (Step S202). Here, the filter selecting unit 1450 predicts an index in the same manner as the filter selecting unit 1350 of the image coding apparatus 1100. On the other hand, when the filter selecting unit 1450 determines that the prediction flag does not indicate 1 (No in Step S201), it obtains the index for the first component filter from the entropy decoding unit 1290 (Step S203).

Next, the filter selecting unit 1450 selects a filter data element of the first component filter for the macroblock to be processed from the filter memory 1430 using the prediction index obtained in the prediction in Step S202 or the index obtained in Step S203 (Step S204).

Then, the filter selecting unit 1450 determines whether or not the processing on the first and second component filters ends (Step S205). When determining that the processing does not end (No in Step S205), the filter selecting unit 1450 repeatedly performs the processes from Step S200 for the second component filter.

Figure 17:
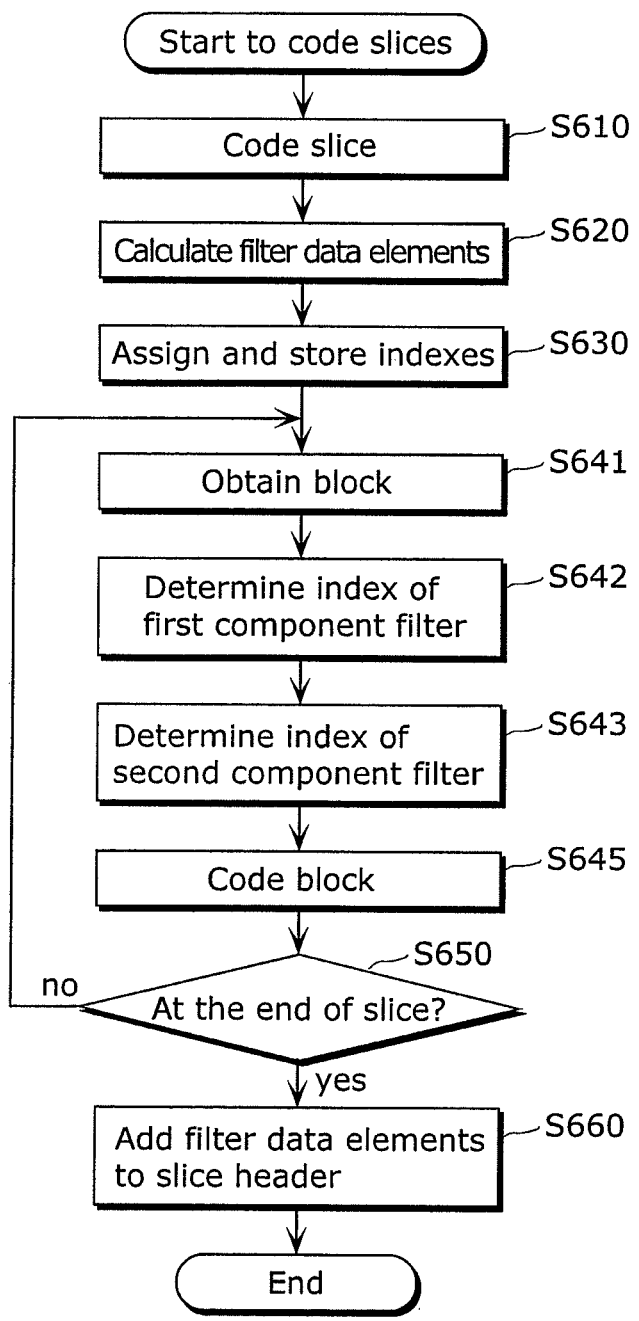
FIG. 17 is a flowchart of other operations performed when an encoder codes slices according to Embodiment 1 of the present invention.

FIG. 17 is a flowchart of other operations performed when an encoder codes slices. In Embodiment 1, the filter data elements are calculated per slice and provided within the respective slice header. The processes in the flowchart of FIG. 17 are different from the processes in the flowchart of FIG. 10 and characterized by selecting indexes in a block in the current slice not only from filter data elements stored in the filter memory 1330 and calculated for a coded slice but also from filter data elements including the filter data elements calculated for the current slice. Thus, the filter memory is updated after coding and decoding the current slice. This enables to use the filter data elements transmitted in the same slice for the block in the slice.

FIG. 17 shows the slice coding method starting with the standard coding of a slice (Step S610), such as is used in any of nowadays video codecs, for instance, in H.264/MPEG-4 AVC as described above with reference to FIG. 1. In other words, the image coding apparatus 1100 first codes the current slice to be coded (current slice) (Step S610). In particular, the lossy compression is performed in order to obtain the reconstructed slice after coding. Based on the coded and reconstructed slice and the input signal, the filter calculating unit 1310 calculates the filter data elements similarly as in the previously described embodiment, for instance by Wiener filter estimation (Step S620). The index generating unit 1320 generates unique indexes and stores the filter data elements in association with the indexes in the filter memory 1330. After storing the filter data elements, the current slice is coded block after block. First, the filter selecting unit 1350 obtains the block (Step S641).

The filter selecting unit 1350 selects a filter data element of the first component filter from the filter memory 1330 in order to filter the block, and obtains an index associated with the selected filter data element. Accordingly, the filter selecting unit 1350 determines the index of the first component filter for the block (Step S642). Furthermore, the filter selecting unit 1350 selects a filter data element of the second component filter from the filter memory 1330 in order to filter the block, and obtains an index associated with the selected filter data element. Accordingly, the filter selecting unit 1350 determines the index of the second component filter for the block (Step S643).

The image coding apparatus 1100 codes the block for which the indexes of the first and second component filters are determined (Step S645). The indexes are coded into the bitstream and provided together with the bitstream of the coded video signal at the block, macroblock, or packet level. The image coding apparatus 1100 determines whether or not the block coded in Step S645 is at the end of the current slice (Step S650). Here, when the image coding apparatus 1100 determines that the coded block is at the end of the current slice (Yes in Step S650), the filter calculating unit 1310 outputs the filter data elements calculated in Step S620, to the entropy coding unit 1190. The entropy coding unit 1190 adds the filter data elements to the slice header of the current slice in the coded video signal (Step S660). On the other hand, when the image coding apparatus 1100 determines that the coded block is not at the end of the current slice (No in Step S650), it repeatedly performs the processes from Step S641 for the next block included in the current slice. When a video signal includes slices, the image coding apparatus 1100 repeatedly performs the processes of Steps S610 to S660.

In this example, each block is coded twice: the first time for determining the filter data elements for the entire slice and the second time for selecting the filter data elements for each block. If the adaptive filter for filtering the blocks is a loop filter, the blocks are preferably also filtered therewith at the encoder. When the adaptive filter is a post filter, the blocks are coded without having been filtered by the selected filter.

Figure 18:
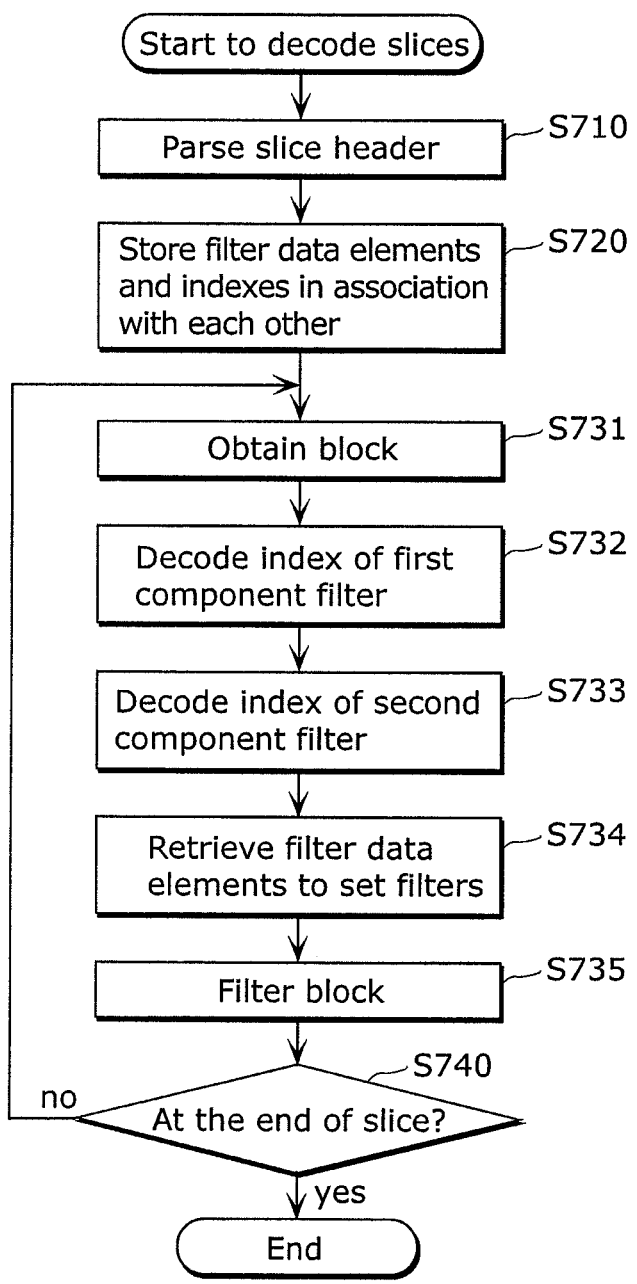
FIG. 18 is a flowchart of example operations performed when a decoder decodes the slices coded according to the procedure in FIG. 17 according to Embodiment 1 of the present invention.

FIG. 18 is a flowchart of example operations performed when a decoder decodes the slices coded according to the procedure in FIG. 17.

At first, the entropy decoding unit 1290 parses a slice header of the current slice to be decoded (current slice) (Step S710). The index generating unit 1420 obtains filter data elements extracted from the slice header and decoded, and generates indexes for the filter data elements. Furthermore, the index generating unit 1320 stores the filter data elements and the indexes in association with each other in the filter memory 1330 (Step S720). The indexes generated herein are identical to the indexes generated by the encoder.

Next, the entropy decoding unit 1290 obtains a block (macroblock) included in the current slice (Step S731). Furthermore, the entropy decoding unit 1290 decodes an index of the first component filter (Step S732), and an index of the second component filter (Step S733).

The filter selecting unit 1450 obtains the decoded indexes of the first and second component filters, and retrieves the filter data elements stored in association with these indexes from the filter memory 1430. Then, the filter setting unit 1460 sets the retrieved two filter data elements (filter coefficients) to the first and second component filters (Step S734). Here, the setting includes assigning the filter coefficients. When each filter data element includes filter coefficients, the filter coefficients are set to the first or second component filter. When each filter data element does not include filter coefficients, filter coefficients are calculated based on the filter data element, and the filter coefficients are set to the first or second component filter. The interpolation filter unit 1250 filters the block using the set first and second component filters (Step S735).

Here, the image decoding apparatus 1200 determines whether or not the filtered block is at the end of the current slice (Step S740). When the image decoding apparatus 1200 determines that the filtered block is not at the end of the current slice (No in Step S740), it repeatedly performs the processes from Step S731 for the next block included in the current slice. On the other hand, when the image decoding apparatus 1200 determines that the filtered block is at the end of the current slice (Yes in Step S740), the image decoding apparatus 1200 ends the processes for the current slice. When a coded video signal includes slices, the image decoding apparatus 1200 repeatedly performs the processes of Steps S710 to S740 for each of the slices.

The single coding processes described with reference to FIG. 10 are less complex than the double coding processes described with reference to FIG. 17. Thus, the single coding processes are advantageous, in particular, for applications requiring lower delay and/or power consumption at the encoder. On the other hand, the double coding processes may provide better performance, e.g. in terms of coding efficiency, depending on the changes of the local video characteristics. The double coding processes enable immediate adaptation to new video content, necessary especially for rapidly changing the local video characteristics. However, the performance of both the single and the double coding processes will likely be influenced by the choice of the slicing. If slices are chosen to contain blocks with similar characteristics, the coding efficiency as well as the quality of reconstruction will increase. It is also possible to switch between the single coding processes and the double coding processes. The signal instructing the switching may be signaled, e.g. in the slice or picture header.

Figure 19A:
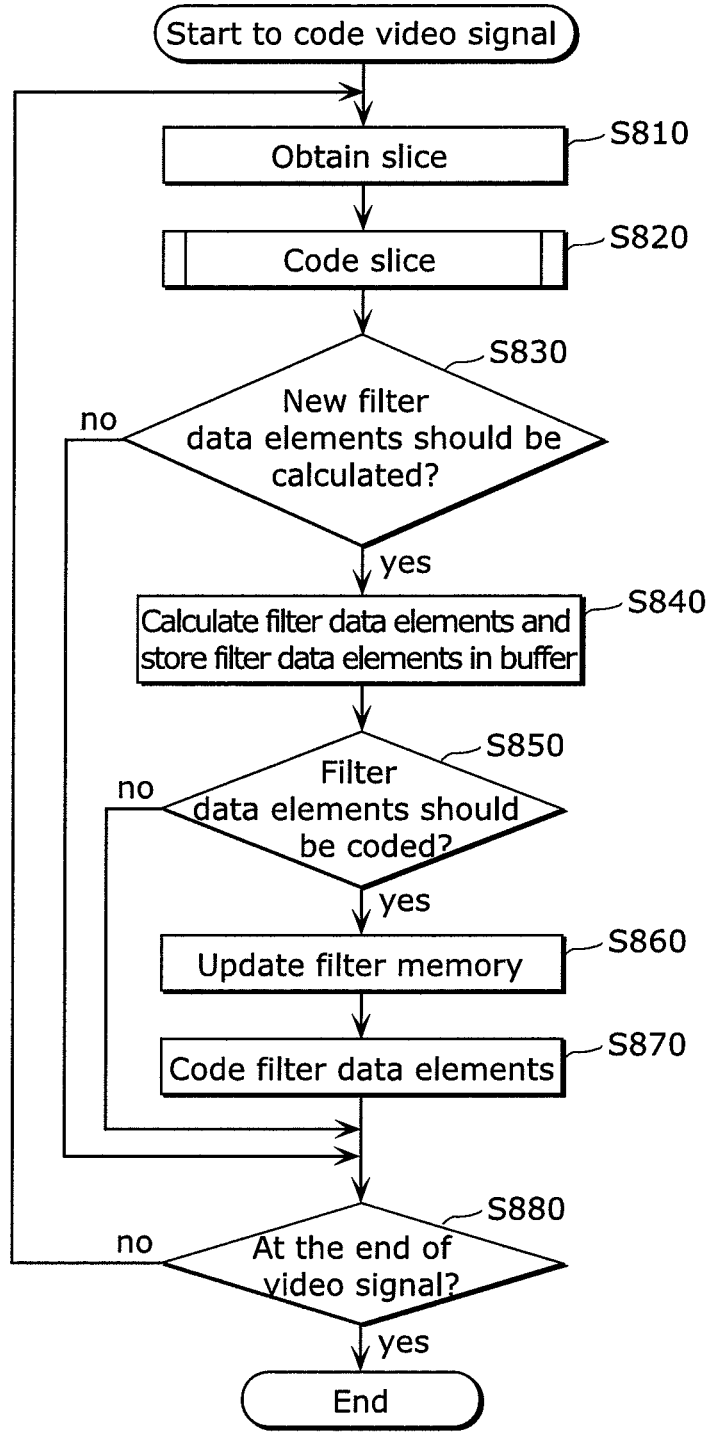
FIG. 19A is a flowchart of other operations performed when an encoder codes a video signal according to Embodiment 1 of the present invention.
Figure 19B:
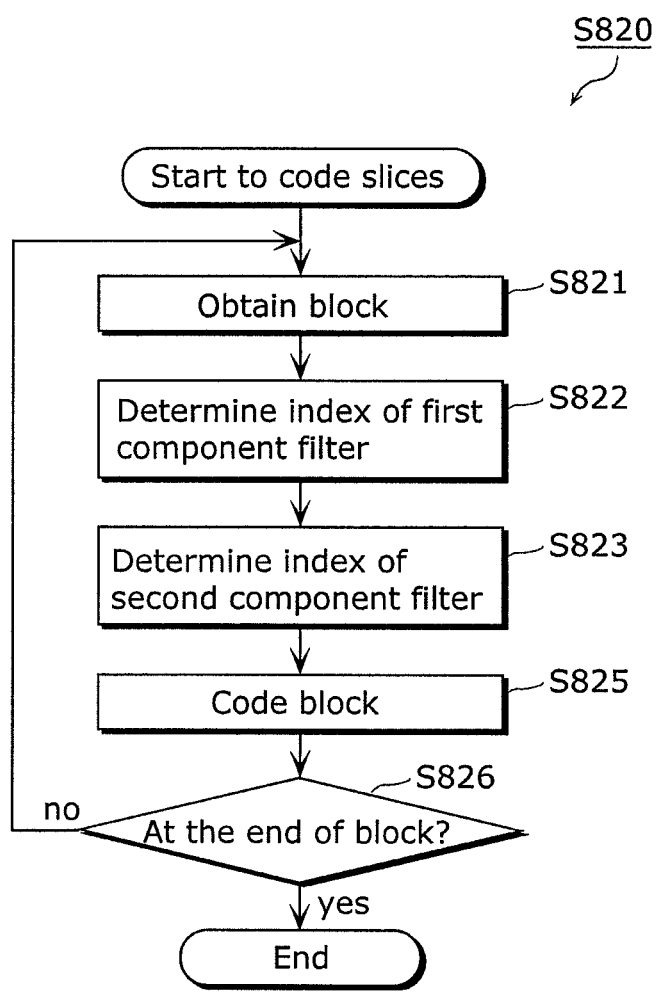
FIG. 19B is a flowchart of other operations performed when slices are coded according to the procedure in FIG. 19A according to Embodiment 1 of the present invention.

FIGS. 19A and 19B are flowcharts indicating other operations performed when the encoder codes a video signal. The processes in FIGS. 19A and 19B are different from those in FIGS. 10 and 17, and characterized by calculating one filter data element for one or more filter-design image areas when a first condition is satisfied without always calculating a filter data element for each of the filter-design image areas (each slice or frame). Furthermore, the processes in FIGS. 19A and 19B are different from those in FIGS. 10 and 17, and characterized by collectively transmitting one or more filter data elements to a decoder when a second condition is satisfied, without, each time one filter data element is calculated, always coding the filter data element and transmitting the coded filter data element.

In other words, in the processes in FIGS. 19A and 19B, the generation of the filter data element is rather triggered by the first condition and may be sent cumulatively, i.e., more filter data elements at once, for instance, within the same message, or slice header.

First, the image coding apparatus 1100 obtains the current slice (Step S810), and codes the current slice (Step S820) as illustrated in FIG. 19A. FIG. 19B illustrates the details of Step S820. In other words, the same processes of Steps S411 to 420 in FIG. 10 or Steps S641 to S650 in FIG. 17 are performed in Step S820.

More specifically, the filter selecting unit 1350 obtains a block from the current slice (Step S821). The filter selecting unit 1350 selects a filter data element of the first component filter for the block from the filter memory 1330, and obtains an index associated with the selected filter data element. Accordingly, the filter selecting unit 1350 determines the index of the first component filter for the block (Step S822). Furthermore, the filter selecting unit 1350 selects a filter data element of the second component filter for the block from the filter memory 1330, and obtains an index associated with the selected filter data element. Accordingly, the filter selecting unit 1350 determines the index of the second component filter for the block (Step S823). The indexes of the first and second component filters are coded and included in a coded video signal, and the coded video signal is transmitted to the decoder.

The image coding apparatus 1100 codes the block for which the indexes of the first and second component filters are determined (Step S825). The coding may or may not include filtering using the selected filter data elements. The image coding apparatus 1100 determines whether or not the block coded in Step S825 is at the end of the current slice (Step S826). Here, when the image coding apparatus 1100 determines that the coded block is at the end of the current slice to be coded (Yes in Step S826), it ends the coding processes on the current slice. When the image coding apparatus 1100 determines that the coded block is not at the end of the current slice (No in Step S826), it repeatedly performs the processes from Step S821 for the next block included in the current slice.

When the coding processes on the current slice ends, the filter calculating unit 1310 determines whether the first condition is satisfied, that is, whether or not new filter data elements should be calculated (Step S830). When the first condition is satisfied (Yes in Step S830), the filter calculating unit 1310 calculates filter data elements based on the last coded slice or several coded slices, and stores the filter data elements in a buffer (not illustrated) (Step S840).

Next, the filter calculating unit 1310 determines whether the second condition is satisfied, that is, whether or not one or more filter data elements stored in the buffer should be coded (Step S850). When the second condition is satisfied (Yes in Step S850), the index generating unit 1320 generates a unique index for each of the filter data elements stored in the buffer and associates the generated indexes with the filter data elements, and stores pairs of the filter data element and the index having the number of the filter data elements stored in the buffer, in the filter memory 1330 (Step S860). Accordingly, the filter memory 1330 is updated. Furthermore, the filter calculating unit 1310 outputs all the filter data elements stored in the buffer, to the entropy coding unit 1190. Accordingly, one or more filter data elements are collectively coded and included in the coded video signal (Step S870).

When determining that the first condition is not satisfied in Step S830 (No in Step S830), the second condition is not satisfied in Step S850 (No in Step S850), or the filter data elements are coded in Step S870, the image coding apparatus 1100 determines whether the slice coded in Step S820 is at the end of the video signal (Step S880). Here, when the image coding apparatus 1100 determines that the coded slice is not at the end of the video signal (No in Step S880), it repeatedly performs the processes from Step S810 for the next block included in the video signal. When the image coding apparatus 1100 determines that the coded slice is at the end of the video signal (Yes in Step S880), it ends the coding processes on the video signal.

Here, the first and second conditions will be described.

The first condition is, for example, a condition for coding k slices in Step S820. In other words, filter data elements are calculated for each set of the k slices. Furthermore, the first condition may be a condition under which the characteristics of a video signal change. For example, a cost for each of the filter data elements stored in the filter memory 1330 is calculated based on the video signal, and each of the costs is compared with a predetermined threshold. The cost indicates distortion in an image, and is, for example, a Rate Distortion (RD) cost. If any one of the costs (distortion) is higher than the threshold, the characteristics of a video signal change, and the first condition is satisfied. Furthermore, the first condition may be another condition, and may be, for example, a condition under which the filter data elements stored in the memory 1330 does not provide satisfying filtered image quality.

The second condition may be identical to the first condition. Here, the filter data elements are coded and transmitted immediately after having been calculated. The second condition may be different from the first condition. For example, the second condition may be set so that the frequency with which the filter data elements are coded and transmitted is less than the frequency with which the filter data elements are calculated.

The filter data elements may be calculated for each filter-design image area smaller than a slice, and a larger number of pairs of filter data elements may be calculated and provided within a bitstream. If the filter data elements are provided irregularly, a flag may be necessary to identify each of the filter data elements.

Figure 20A:
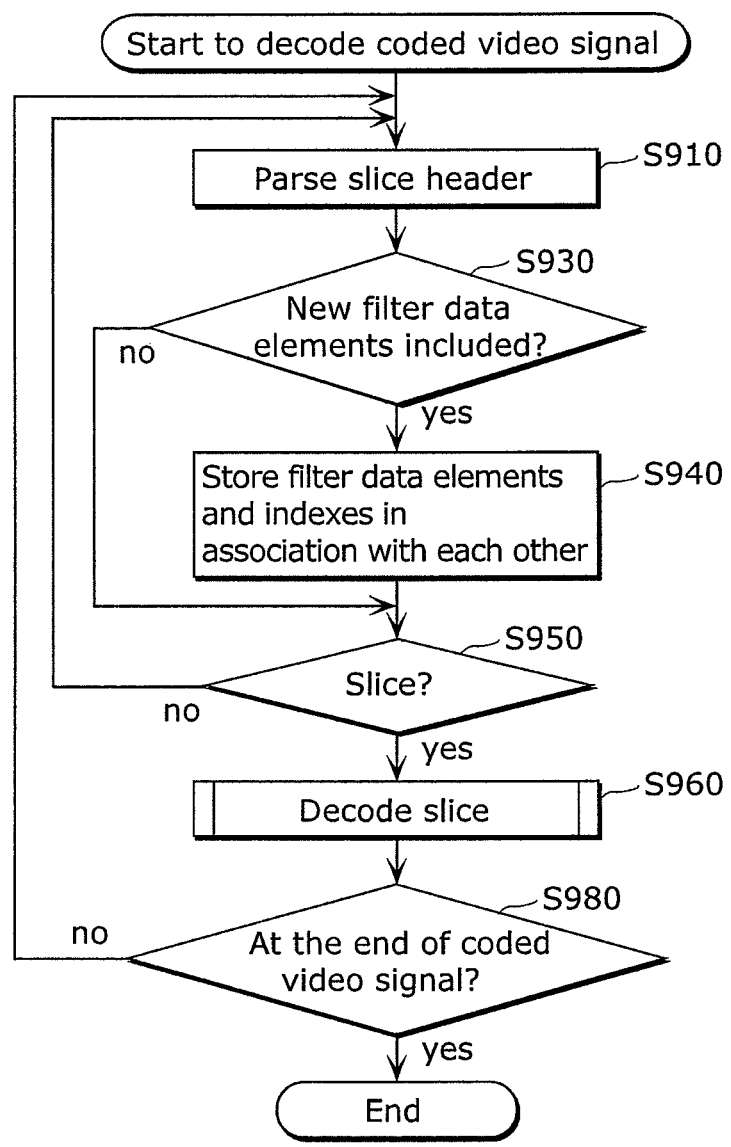
FIG. 20A is a flowchart of example operations performed when the video signal coded according to the procedure in FIG. 19A is decoded, according to Embodiment 1 of the present invention.
Figure 20B:
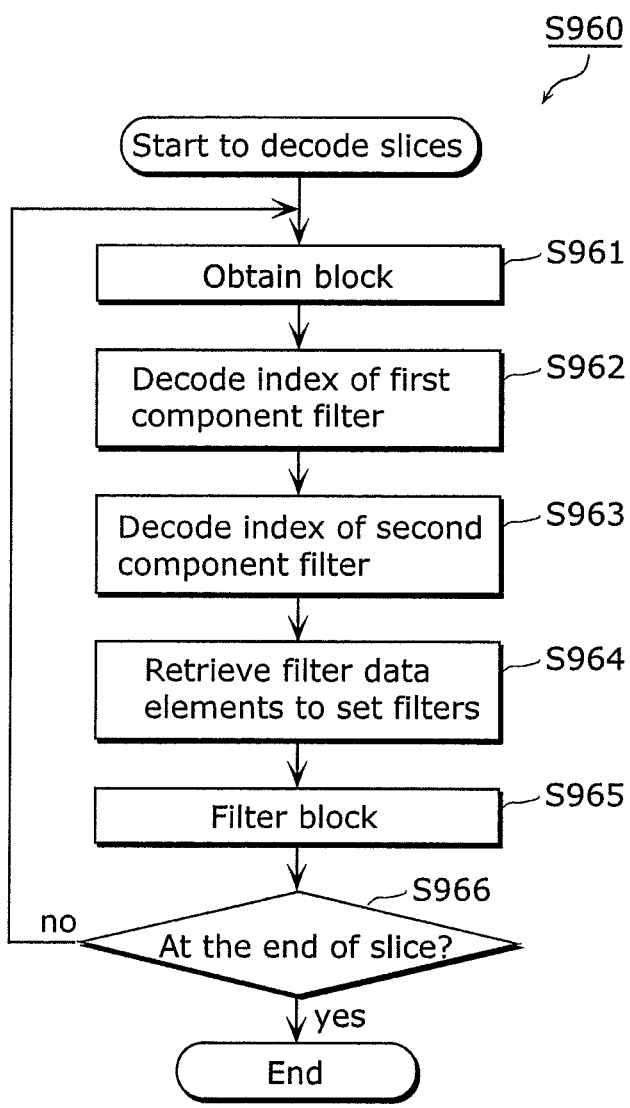
FIG. 20B is a flowchart of operations performed when the slices are decoded in FIG. 20A, according to Embodiment 1 of the present invention.

FIGS. 20A and 20B illustrate an example of processes of decoding a video signal coded according to the processes described with reference to FIGS. 19A and 19B.

First, the entropy decoding unit 1290 parses a header of a unit (for instance a NAL unit in H.264/MPEG-4 AVC) (Step S910). The index generating unit 1420 determines whether or not new filter data elements are included in the unit (Step S930). The unit may be a sequence parameter set (SPS), a picture parameter set (PPS) unit, a slice containing the filter data elements in a header, an SEI message, etc. When the index generating unit 1420 determines that the unit includes the new filter data elements (Yes in Step S930), it generates indexes for the filter data elements and associates the generated indexes with the filter data elements, and stores the pairs of the filter data element and the index in the filter memory 1430 (Step S940).

The image decoding apparatus 1200 determines whether or not the unit is a VCL unit containing slice data (Step S950). When the image decoding apparatus 1200 determines that the unit is not the VCL unit containing slice data (No in Step S950), it repeatedly performs the processes from Step S910 for the next unit included in the coded video signal. On the other hand, when the image decoding apparatus 1200 determines that the unit is the VCL unit containing slice data (Yes in Step S950), it starts to decode the slice (Step S960). FIG. 20B illustrates the details of Step S960. In other words, the same processes of Steps S531 to S540 in FIG. 11 or Steps S731 to S740 in FIG. 18 are performed in Step S960.

More specifically, the entropy decoding unit 1290 obtains a block (macroblock) included in the current slice (Step S961). Furthermore, the entropy decoding unit 1290 decodes an index of the first component filter (Step S962), and an index of the second component filter (Step S963).

The filter selecting unit 1450 obtains the decoded indexes of the first and second component filters, and retrieves the filter data elements stored in association with these indexes from the filter memory 1430. Then, the filter setting unit 1460 sets the retrieved two filter data elements (filter coefficients) to the first and second component filters (Step S964). The interpolation filter unit 1250 filters the block using the set first and second component filters (Step S965).

Here, the image decoding apparatus 1200 determines whether or not the filtered block is at the end of the current slice (Step S966). When the image decoding apparatus 1200 determines that the filtered block is not at the end of the current slice (No in Step S966), it repeatedly performs the processes from Step S961 for the next block included in the current slice. On the other hand, when the image decoding apparatus 1200 determines that the filtered block is at the end of the current slice (Yes in Step S966), the image decoding apparatus 1200 ends the decoding processes for the current slice.

Next, the image decoding apparatus 1220 determines whether or not the decoded slice obtained in Step S960 is at the end of the coded video signal (Step S980). When the image decoding apparatus 1220 determines that the decoded slice is not at the end of the coded video signal (No in Step S980), it repeatedly performs the processes from Step S910 for the next slice included in the coded video signal. On the other hand, when the image decoding apparatus 1220 determines that the decoded slice is at the end of the coded video signal (Yes in Step S980), it ends the processes of decoding the coded video signal.

It is possible to provide several filter data elements of component filters in a frame, a slice, or a sequence header. A filter data element of a single component, or filter data elements of two or any number of filter components may be provided. In order to facilitate this, a syntax element is needed to indicate the number of filter data elements to be transmitted.

The position to be stored in the table 100 may be indicated with each filter data element. This is beneficial, if all filter data elements are estimated at the encoder in advance and transmitted at the sequence header. In other words, a lot of possible filter data elements are available already for the first frame. Selection of the indexes I_cur1 and I_cur2 may include RD optimization performed by the encoder as one encoder control method.

In order to reduce the signaling overhead connected with providing the filter data elements, one filter data element of an already transmitted (horizontal or vertical) filter component may be used and the corresponding index may be provided. For the other component filters, the filter data elements are coded and transmitted together with the current slice. Thus, each component filter data element is sent once per two slices. In each slice either the vertical or the horizontal filter data element is provided, while the filter data elements of the other components are signalized by means of an index.

Usually, horizontal motion in a natural video sequence varies more than the vertical motion. In compliance with the present invention, an index separate from a filter data element of a first component filter is provided for selecting the filter data element of the first component filter, and an index separate from a filter data element of a second component filter is provided for selecting the filter data element of the second component filter. This allows further to scale the accuracy of filtering differently for the vertical and the horizontal directions. For instance, information more than a filter data element of a horizontal component filter may be provided to a filter data element of a vertical component filter. In particular, a filter data element more than a vertical component filter may be provided to the horizontal component filter, resulting in separated filter tables having different sizes for vertical and horizontal component filters. Moreover, vertical and horizontal component filters may also have different order. In general, the filter table 1000 may store the filters having different orders. By distinguishing between the first and the second component filters, requirements for the encoder/decoder memory for the filter coefficient storage may be reduced, and the coding efficiency will be increased (less indexes to be selected for the vertical component).

The above described approaches for reducing the number of bits to be transmitted can be applied individually or by any combination thereof, in particular by a combination of two or all of these approaches. Further, these approaches regarding the bit reduction can be employed in each of the described embodiments of the present invention.

Although the filter design unit 1110 calculates filter data elements (filter coefficients) based on an input signal and a decoded signal in Embodiment 1, more signals and other signals such as a prediction signal, a prediction error signal, and a reconstructed video signal may be used. Such an approach provides an improved filtering performance.

Furthermore, although Embodiment 1 describes a filter data element and an index of an interpolation filter, the present invention is not limited thereto and may be equally employed for other image filters such as a post filter, a deblocking filter, or another loop filter.

Figure 21:
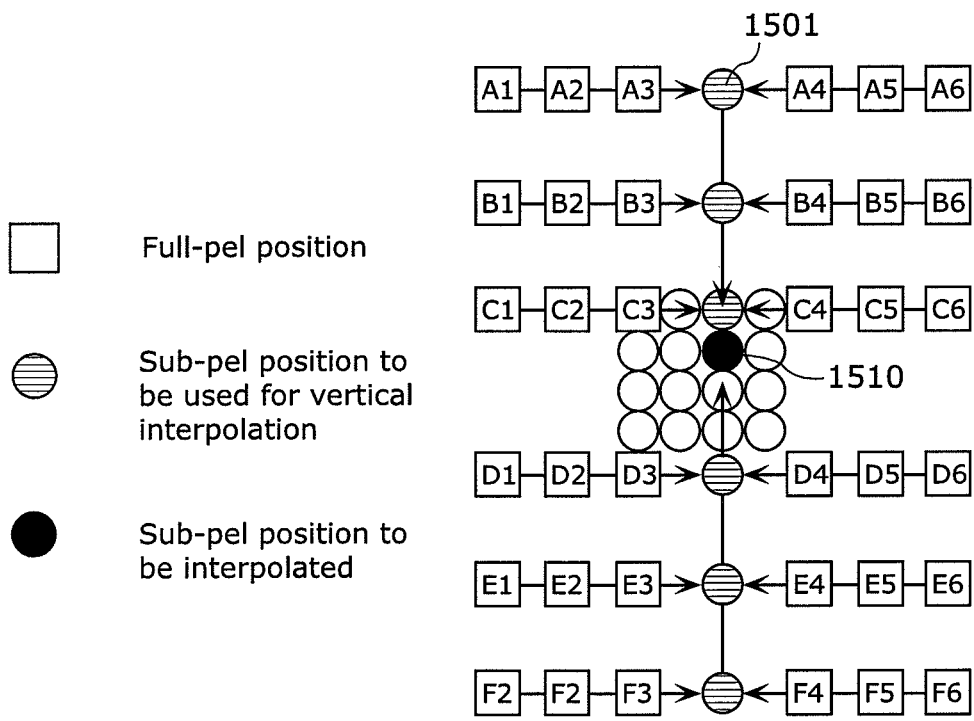
FIG. 21 illustrates the principle of interpolation filtering performed by an interpolation filter unit according to Embodiment 1 of the present invention.

FIG. 21 illustrates the principle of interpolation filtering which may be performed by the above described interpolation filter units 1150 and 1250. The interpolation filter units 1150 and 1250 calculate pixel values of the half-pel positions from the full-pel positions, by applying an interpolation filter to the full-pel positions. For instance, a pixel value of a half-pel position 1501 is obtained by applying a horizontal filter to full-pel positions A1 to A6. Similarly, the half-pel positions in the same column as the half-pel position 1501 are interpolated. The interpolation filter units 1150 and 1250 may calculate other sub-pel positions like the sub-pel position 1510, from the pixel value of the sub-pel position 1501 by vertical filtering. In this way, all missing sub-pel positions are interpolated.

In order to improve the quality of the interpolation filtering, the filter coefficients for each sub-pel position (such as 1501) may be additionally interpolated as individual component filters. To each of these filter components, the corresponding indexes may be assigned. Thus, the index of each filter component to be signaled for a block will contain several indexes of component filters, one for each sub-pel position. The coding/decoding of the indexes may be performed in the same way as described above. Since the filters for filtering of different sub-pel positions may vary significantly, it may be of advantage to provide separate filter tables and codeword tables for different sub-pel positions.

Figure 22:
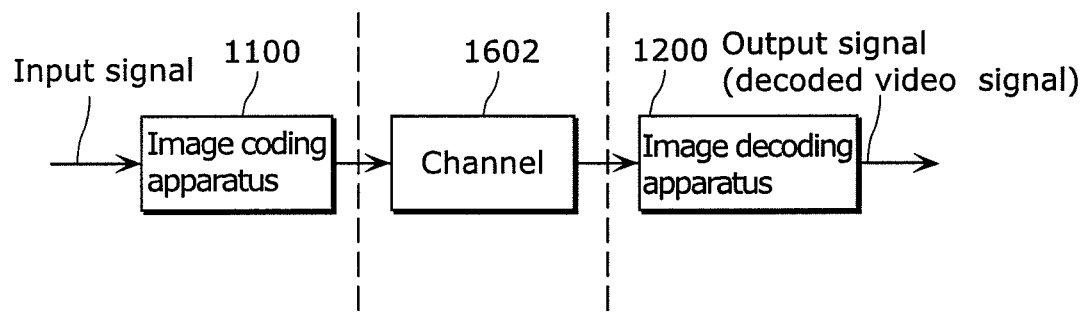
FIG. 22 illustrates a system according to Embodiment 1 of the present invention.

FIG. 22 illustrates a system in Embodiment 1.

The image coding apparatus 1100 transmits a coded video signal to the image decoding apparatus 1200. In other words, the image coding apparatus 1100 codes an input signal and provides it to a channel 1602. The channel 1602 is either storage or any transmission channel. The recording medium may be, for instance, any volatile or non-volatile memory, any magnetic or optical medium, a mass-storage medium, etc. The transmission channel may be formed by physical resources of any transmission system, wireless or wired, fixed or mobile, such as xDSL, ISDN, WLAN, GPRS, UMTS, Internet, or any standardized or proprietary system. The image coding apparatus 1100 may also include preprocessing of the input signal such as format conversion and/or transmitter for transmitting the coded video signal over the channel 1602 or an application for transferring the coded video signal into the recording medium. The image decoding apparatus 1200 obtains the coded video signal from the channel 1602. The image decoding apparatus 1200 decodes the coded video signal. The image decoding apparatus 1200 may further include a receiver for receiving the coded video signal from the channel 1602, or an application for extracting the coded video signal from the recording medium, and/or post-processing means for post processing of an output signal (decoded video signal), such as format conversion.

Although Embodiment 1 describes the image coding method, the image decoding method, and the apparatuses therefor according to the present invention, the present invention is not limited to the configurations in FIGS. 4, 5, 7, and 8 and the processes in FIGS. 10, 11, and 17 to 20B. For example, the present invention includes processes and configurations in FIGS. 23A to 24B.

Figure 23A:
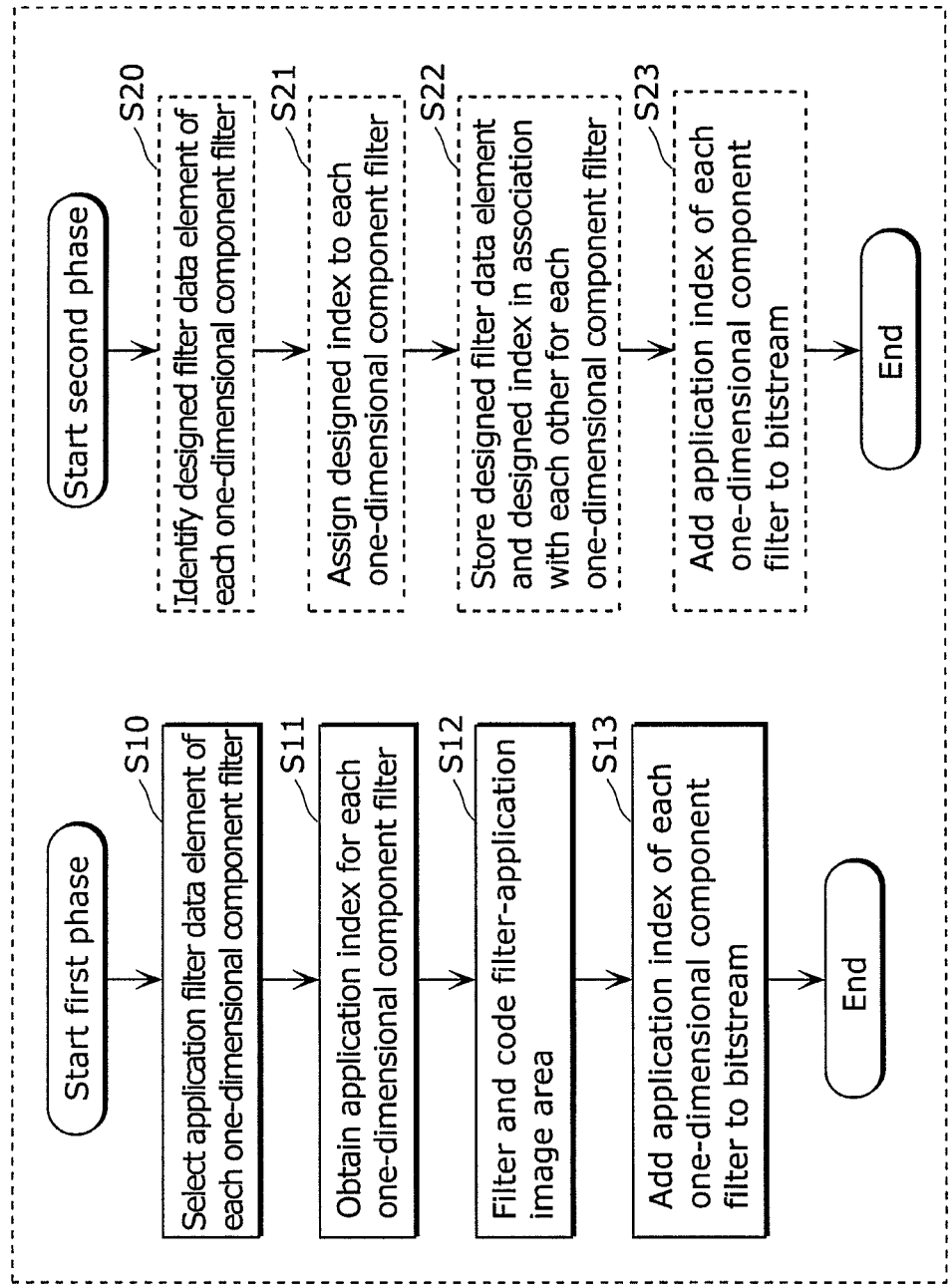
FIG. 23A is a flowchart of processes of an image coding method according to the present invention.

FIG. 23A is a flowchart of processes of an image coding method according to the present invention.

The image coding method of coding a video signal to generate a coded video signal that is a bitstream includes: selecting (S10), from at least one filter data element stored in a memory, respective filter data elements of one-dimensional component filters of two types that compose a two-dimensional separable filter as two application filter data elements, the one-dimensional component filters being to be applied to a filter-application image area indicated by the video signal; obtaining (S11) an index stored in the memory in association with a corresponding one of the selected two application filter data elements, as an application index, for each of the one-dimensional component filters; coding (S12) the filter-application image area by applying, to the filter-application image area, the one-dimensional component filters of two types using the two application filter data elements selected in the selecting (S10); adding the two application indexes (S13) obtained in the obtaining (S11) to the coded filter-application image area in the coded video signal; identifying (S20) filter data elements of the one-dimensional component filters as two designed filter data elements, based on a filter-design image area including the filter-application image area and indicated by the video signal; assigning (S21) an index for identifying a corresponding one of the designed filter data elements to the corresponding one of the designed filter data elements as a designed index for each of the one-dimensional component filters; storing (S22), in the memory, the designed filter data element and the designed index in association with each other, for each of the one-dimensional component filters, the designed index being assigned to the designed filter data element; and adding the two designed filter data elements (S23) identified in the identifying of filter data elements (S20), to the coded filter-design image area in the coded video signal.

The image coding method includes the first phase and the second phase, and the first phase includes Steps S10 to S13, and the second phase includes Steps S20 to S23. After the first phase, the second phase may be performed. Conversely, after the second phase, the first phase may be performed. Furthermore, the second phase does not necessarily have to be performed.

In the first phase, the selecting S10, the obtaining S11, and the adding of the two application indexes S13 correspond to Steps S412 and S413 in FIG. 10, Steps S642 and S643 in FIG. 17, and Steps S822 and S823 in FIG. 19B. The filter data elements to be selected in each of Steps in FIGS. 10, 17, and 19B are application filter data elements, and the indexes determined in each of Steps are application indexes. Furthermore, the coding in Step S12 corresponds to Step S415 in FIG. 10, Step S645 in FIG. 17, and Step S825 in FIG. 19B.

In the second phase, the identifying S20 corresponds to Step S430 in FIG. 10, Step S620 in FIG. 17, and Step S840 in FIG. 19A. The filter data elements to be calculated in each of Steps in FIGS. 10, 17, and 19A are designed filter data elements. The assigning S21 and the storing S22 correspond to Step S440 in FIG. 10, Step S630 in FIG. 17, and Step S860 in FIG. 19A. The indexes to be assigned (associated) in each of Steps in FIGS. 10, 17, and 19A are designed indexes. Furthermore, the adding of the two designed filter data elements S23 corresponds to Step S450 in FIG. 10, Step S660 in FIG. 17, and Step S870 in FIG. 19A.

Furthermore, a filter-design image area is represented by a slice, and a filter-application image area is represented by a macroblock or a block. The filter-design image area includes slices in the processes of FIGS. 19A to 20B. For example, the slices are the ones processed from when the filter memory 1330 is updated in Step S860 of FIG. 19A to the next update.

Figure 23B:
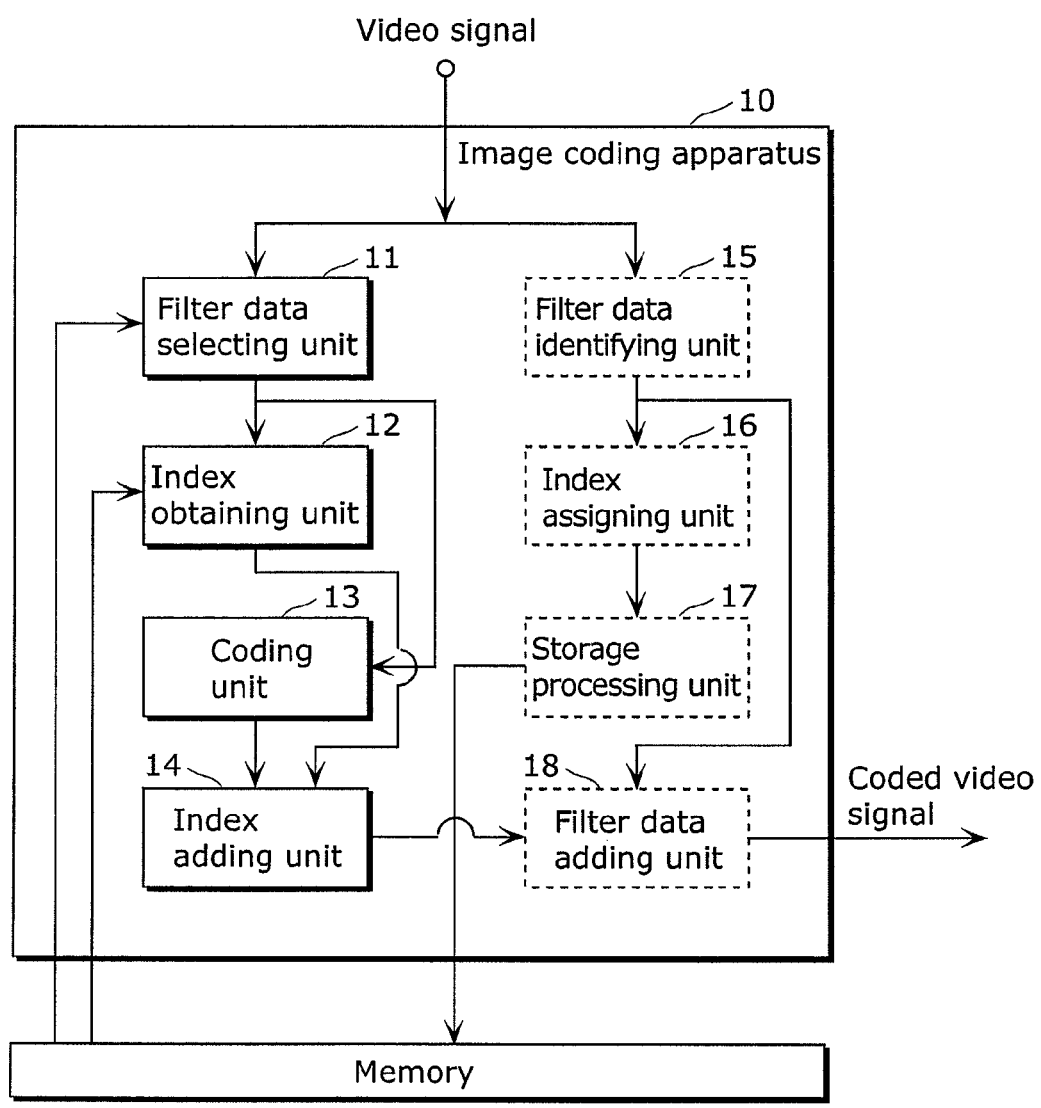
FIG. 23B is a block diagram illustrating an image coding apparatus according to the present invention.

FIG. 23B is a block diagram illustrating an image coding apparatus 10 according to the present invention.

The image coding apparatus 10 that codes a video signal to generate a coded video signal that is a bitstream, the apparatus includes: a filter data selecting unit 11 configured to select, from at least one filter data element stored in a memory, respective filter data elements of one-dimensional component filters of two types that compose a two-dimensional separable filter as two application filter data elements, the one-dimensional component filters being to be applied to a filter-application image area indicated by the video signal; an index obtaining unit 12 configured to obtain an index stored in the memory in association with a corresponding one of the selected two application filter data elements, as an application index, for each of the one-dimensional component filters; a coding unit 13 configured to code the filter-application image area by applying, to the filter-application image area, the one-dimensional component filters of two types using the two application filter data elements selected by the filter data selecting unit 11; an index adding unit 14 configured to add the two application indexes obtained by the index obtaining 12 to the coded filter-application image area in the coded video signal; a filter data identifying unit 15 configured to identify filter data elements of the one-dimensional component filters as two designed filter data elements, based on a filter-design image area including the filter-application image area and indicated by the video signal; an index assigning unit 16 configured to assign an index for identifying a corresponding one of the designed filter data elements to the corresponding one of the designed filter data elements as a designed index for each of the one-dimensional component filters; a storage processing unit 17 configured to store, in the memory, the designed filter data element and the designed index in association with each other, for each of the one-dimensional component filters, the designed index being assigned to the designed filter data element; and a filter data adding unit 18 configured to add the two designed filter data elements identified by the filter data identifying unit 15, to the coded filter-design image area in the coded video signal.

The filter data selecting unit 11, the index obtaining unit 12, the coding unit 13, and the index adding unit 14 perform the first phase in FIG. 23A. Furthermore, the filter data identifying unit 15, the index assigning unit 16, the storage processing unit 17, and the filter data adding unit 18 perform the second phase in FIG. 23A, and are not the essential constituent elements in implementing the present invention.

Furthermore, the filter data selecting unit 11 and the index obtaining unit 12 correspond to the filter selecting unit 1350 in FIG. 5. The coding unit 13 corresponds to the interpolation filter unit 1150, the subtractor 105, and the transform quantization unit 110, etc. in FIG. 4. Furthermore, the index adding unit 14 correspond to the filter selecting unit 1350 in FIG. 5 and the entropy coding unit 1190 in FIG. 4.

Furthermore, the filter data identifying unit 15 corresponds to the filter calculating unit 1310 in FIG. 5. The index assigning unit 16 and the storage processing unit 17 correspond to the index generating unit 1320 in FIG. 5. The filter data adding unit 18 corresponds to the filter calculating unit 1310 in FIG. 5 and the entropy coding unit 1190 in FIG. 4.

As such, the image coding method and the apparatus therefor according to the present invention implement the first phase. Thus, since application filter data elements to be applied to a filter-application image area (for example, macroblock, block, etc.) are selected and the filter-application image area is filtered using the application filter data elements and is coded, as long as a video signal includes filter-application image areas, the filter-application image areas are appropriately and separately filtered. As a result, the quality of video filtering can be improved, and the quality can be further improved as the data amount of such application filter data elements increases. Furthermore, even when the data amount of filter data elements stored in the memory is large, the data amount of indexes stored in the memory in association with the filter data elements can be reduced in the image coding method. Thus, since the application indexes for identifying the selected application filter data elements are added to the coded video signal instead of the application filter data elements in the image coding method, increase in the transmission bandwidth for transmitting the coded video signal can be suppressed.

Furthermore, in the image coding method, selecting of an application filter data element, obtaining of an application index, and associating of the filter data element with the index are performed for each of one-dimensional component filters of two types (for example, vertical and horizontal component filters) that compose a two-dimensional separable filter. Thus, an appropriate application filter data element can be selected for the filter-application image area, for each of the one-dimensional component filters, and the quality of filtering can be improved.

Furthermore, the image coding method and the apparatus therefor according to the present invention may implement the second phase. Here, designed filter data elements are identified based on the filter-design image area including the filter-application image area (for example, slice or frame), and the designed filter data elements are stored in a memory in association with the indexes for identifying the designed filter data elements. Thus, when application filter data elements are selected for a filter-application image area, the designed filter data elements identified for the filter-design image area including the filter-application image area can be selected as the application filter data elements. Furthermore, the designed filter data elements identified for a filter-design image area that is different from the filter-design image area and has been processed in the past can be selected as the application filter data elements. As a result, each time the filter-design image areas are processed, the number of candidate application filter data elements to be selected can be increased, an appropriate application filter data elements can be selected for the filter-application image area, and the quality of filtering can be further improved.

Furthermore, in the image coding method, designed indexes are assigned to the identified designed filter data elements, the designed indexes and the designed filter data elements are stored in a memory in association with each other, and the designed filter data elements are added to a coded video signal (for example, slice header, etc.). Thus, the image decoding apparatus can obtain the designed filter data elements from the coded video signal. Furthermore, the image decoding apparatus can manage the content of the memory included therein in consistency with the content of the memory included in the image coding apparatus as long as the designed indexes are assigned to the obtained designed filter data elements and the designed filter data elements and the designed indexes are stored in the memory, in accordance with a rule identical to the rule of assigning designed indexes in the image coding apparatus. As a result, the image decoding apparatus can select an appropriate application filter data elements corresponding to the application indexes added to the coded video signal, from the memory, and the filter-application image area can be appropriately filtered using the application filter data elements. Consequently, the quality of filtering can be improved, and the coded video signal can be appropriately decoded.

Furthermore, in the image coding method, identifying of a designed filter data element, assigning of a designed index, and associating of the filter data element with the index are performed for each of one-dimensional component filters of two types (for example, vertical and horizontal component filters) that compose a two-dimensional separable filter. Here, when a filter data element of a two-dimensional filter is identified for each filter-design image area, that is, when two designed filter data elements of the one-dimensional component filters of two types are collectively identified, a pair of two designed filter data elements and the index are stored in a memory for each pair of the two designed filter data elements, and the amount of data to be stored in the memory increases according to the number of the pairs. However, since a designed filter data element and a designed index are stored in the memory in association with each other for each of the one-dimensional component filters (for example, vertical and horizontal component filters) in the image coding method, the amount of data to be stored in the memory can be suppressed regardless of any pair of the designed filter data element and the designed index.

Figure 24A:
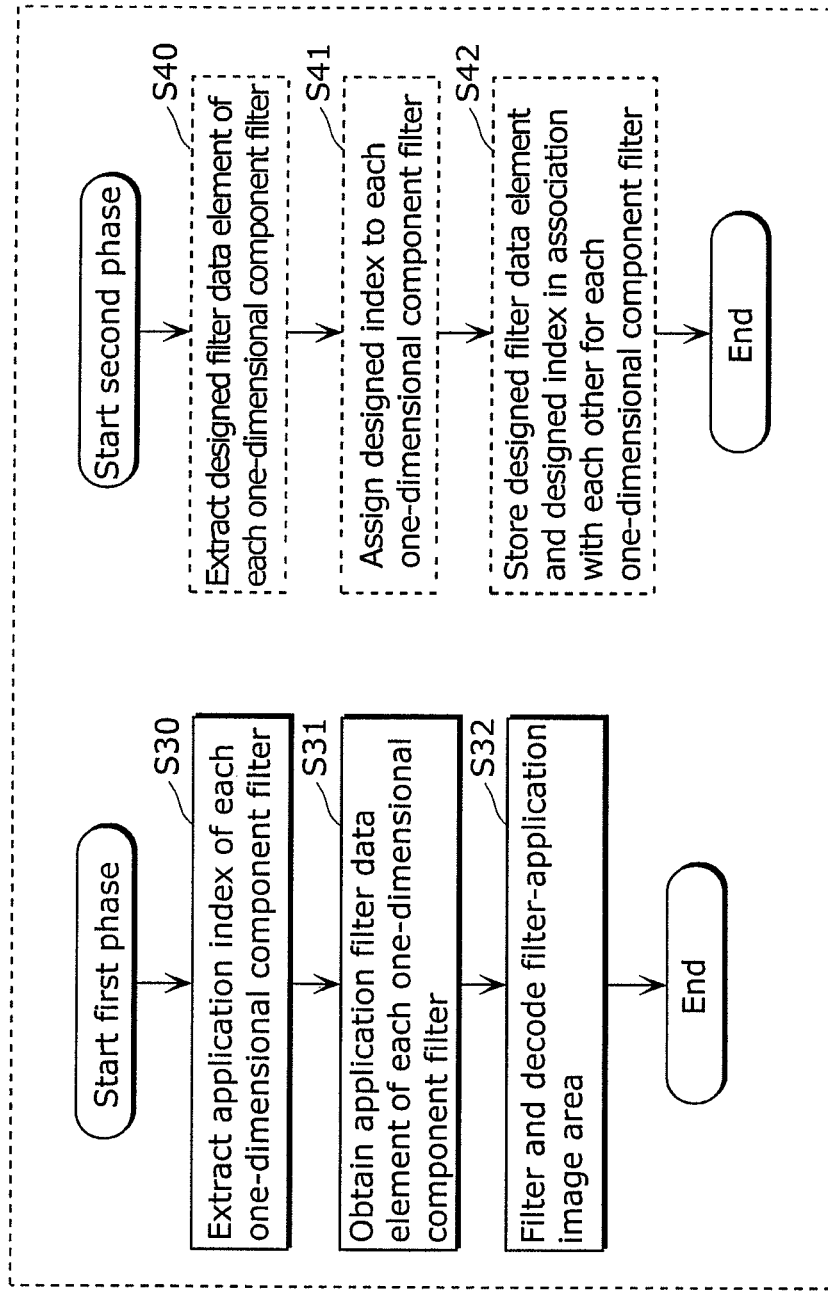
FIG. 24A is a flowchart of processes of an image decoding method according to the present invention.

FIG. 24A is a flowchart of processes of an image decoding method according to the present invention.

The image decoding method of decoding a coded video signal that is a bitstream includes: extracting two indexes (S30) of one-dimensional component filters of two types that compose a two-dimensional separable filter from a filter-application image area indicated by the coded video signal, as two application indexes; obtaining (S31) respective filter data elements of the one-dimensional component filters of two types from at least one filter data element stored in a memory as two application filter data elements, the respective filter data elements being stored in association with the two application indexes extracted in the extracting of two indexes (S30); decoding (S32) the filter-application image area by applying, to the filter-application image area, the one-dimensional component filters of two types using the two application filter data elements obtained in the obtaining (S31); extracting filter data elements (S40) of the one-dimensional component filters as designed filter data elements, from a filter-design image area including the filter-application image area and indicated by the video signal; assigning (S41) an index for identifying a corresponding one of the designed filter data elements to the corresponding one of the designed filter data elements as a designed index, for each of the one-dimensional component filters; and storing (S42) the designed filter data element and the designed index in association with each other, in the memory for each of the one-dimensional component filters, the designed index being assigned to the designed filter data element.

The image decoding method includes the first phase and the second phase, and the first phase includes Steps S30 to S32, and the second phase includes Steps S40 to S42 as the image coding method in FIG. 23A. After the first phase, the second phase may be performed. Conversely, after the second phase, the first phase may be performed. Furthermore, the second phase does not necessarily have to be performed.

In the first phase, the extracting of two indexes S30 corresponds to Steps S532 and S533 in FIG. 11, Steps S732 and S733 in FIG. 18, and Steps S962 and S963 in FIG. 20B. The index to be decoded (extracted) in each of Steps in FIGS. 11, 18, and 20B are application indexes. The obtaining S31 corresponds to Step S534 in FIG. 11, Step S734 in FIG. 18, and Step S964 in FIG. 20B. The filter data elements to be retrieved (obtained) in each of Steps in FIGS. 11, 18, and 20B are application filter data elements. Furthermore, the decoding in Step S32 corresponds to Step S535 in FIG. 11, Step S735 in FIG. 18, and Step S965 in FIG. 20B.

In the second phase, the extracting of filter data elements S40 corresponds to Step S520 in FIG. 11, Step S720 in FIG. 18, and Step S940 in FIG. 20A. The assigning S41 and the storing S42 correspond to Step S550 in FIG. 11, Step S720 in FIG. 18, and Step S940 in FIG. 20A. The filter data elements and the indexes stored in each of Steps in FIGS. 11, 18, and 20B are designed filter data elements and designed indexes, respectively.

Figure 24B:
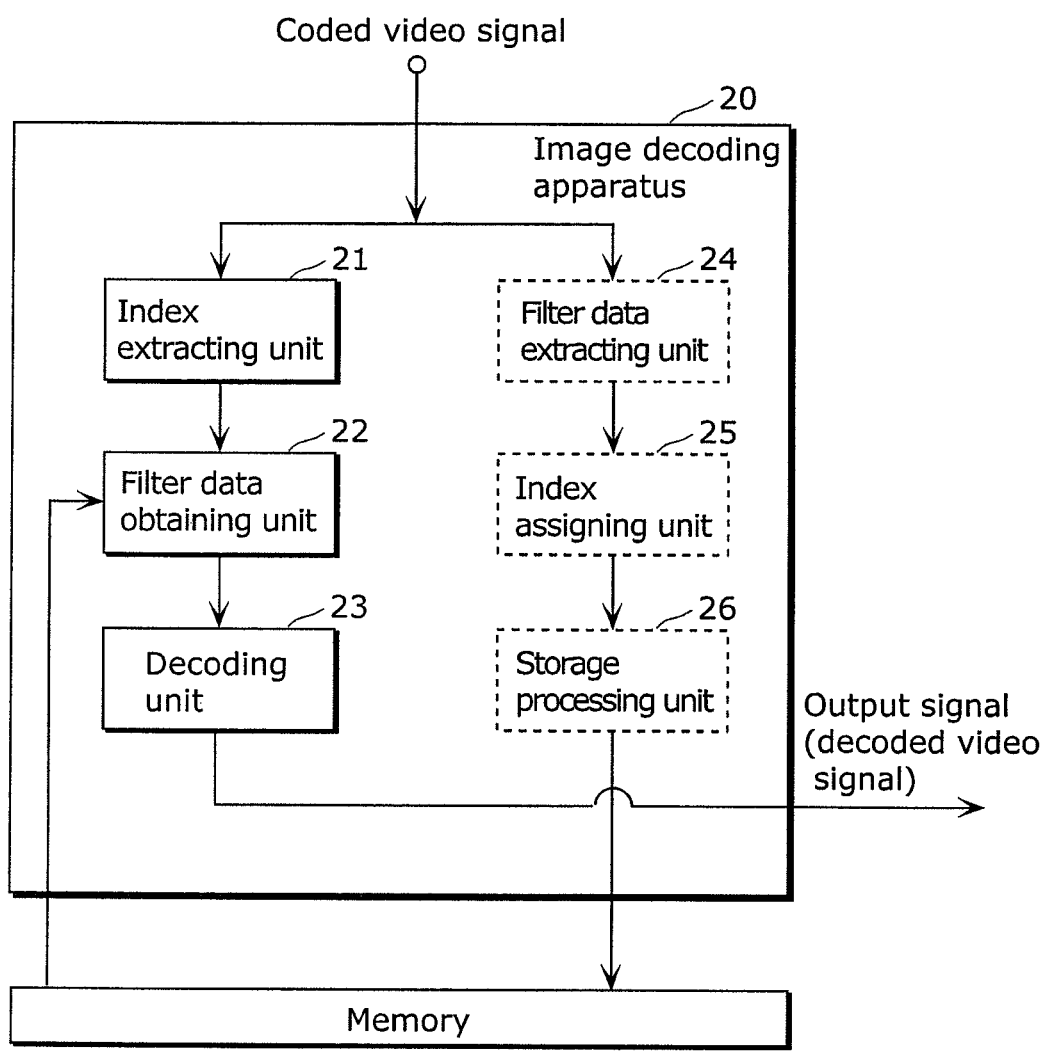
FIG. 24B is a block diagram illustrating an image decoding apparatus according to the present invention.

FIG. 24B is a block diagram illustrating an image decoding apparatus 20 according to the present invention.

The image decoding apparatus 20 that decodes a coded video signal that is a bitstream includes: an index extracting unit 21 configured to extract two indexes of one-dimensional component filters of two types that compose a two-dimensional separable filter from a filter-application image area indicated by the coded video signal, as two application indexes; a filter data obtaining unit 22 configured to obtain respective filter data elements of the one-dimensional component filters of two types from at least one filter data element stored in a memory as two application filter data elements, the respective filter data elements being stored in association with the two application indexes extracted by the index extracting unit 21; a decoding unit 23 configured to decode the filter-application image area by applying, to the filter-application image area, the one-dimensional component filters of two types using the two application filter data elements obtained by the filter data obtaining unit 22; a filter data extracting unit 24 configured to extract filter data elements of the one-dimensional component filters as designed filter data elements, from a filter-design image area including the filter-application image area and indicated by the video signal; an index assigning unit 25 configured to assign an index for identifying a corresponding one of the designed filter data elements to the corresponding one of the designed filter data elements as a designed index, for each of the one-dimensional component filters; and a storage processing unit 26 configured to store the designed filter data element and the designed index in association with each other, in the memory for each of the one-dimensional component filters, the designed index being assigned to the designed filter data element.

The index extracting unit 21, the filter data obtaining unit 22, and the decoding unit 23 perform the first phase in FIG. 24A. Furthermore, the filter data extracting unit 24, the index assigning unit 25, and the storage processing unit 26 perform the second phase in FIG. 24A, and are not the essential constituent elements in implementing the present invention.

Furthermore, the index extracting unit 21 and the filter data obtaining unit 22 correspond to the entropy decoding unit 1290 in FIG. 7 and the filter selecting unit 1450 in FIG. 8. The decoding unit 23 corresponds to the interpolation filter unit 1250, the adder 225, and the inverse quantization and inverse transformation unit 220, etc. in FIG. 7.

Furthermore, the filter data extracting unit 24 and the index assigning unit 25 correspond to the entropy decoding unit 1290 in FIG. 7 and the index generating unit 1420 in FIG. 8. The storage processing unit 26 corresponds to the index generating unit 1420 in FIG. 8.

As such, the image decoding method and the apparatus therefor according to the present invention implement the first phase. Thus, since application indexes are extracted from a filter-application image area, application filter data elements stored in association with the application indexes in a memory are obtained, and the filter-application image area is filtered using the application filter data elements and is decoded, as long as a coded video signal includes filter-application image areas, the filter-application image areas can be appropriately and separately filtered. As a result, the quality of video filtering can be improved, and the quality can be further improved as the data amount of such application filter data elements increases.

Furthermore, in the image decoding method, extracting of an application index, obtaining of an application filter data element, associating of the filter data element with the index are performed for each of one-dimensional component filters of two types (for example, vertical and horizontal component filters) that compose a two-dimensional separable filter. Thus, an appropriate application filter data element can be obtained for the filter-application image area, for each of the one-dimensional component filters, and the quality of filtering can be improved.

Furthermore, the image decoding method and the apparatus therefor according to the present invention may implement the second phase. Here, designed filter data elements are extracted from the filter-design image area, and the designed filter data elements are stored in a memory in association with the designed indexes for identifying the designed filter data elements. Thus, when application filter data elements are obtained for a filter-application image area, the designed filter data elements extracted from the filter-design image area including the filter-application image area can be obtained as the application filter data elements. Furthermore, the designed filter data elements extracted from a filter-design image area that is different from the filter-design image area and has been processed in the past can be obtained as the application filter data elements. As a result, each time the filter-design image area is processed, the number of candidate application filter data elements to be obtained can be increased, appropriate application filter data elements can be selected for the filter-application image area, and the quality of filtering can be further improved.

Furthermore, in the image decoding method, designed indexes are assigned to the extracted designed filter data elements, and the designed indexes and the designed filter data elements are stored in a memory in association with each other. Thus, the image decoding apparatus can manage the content of the memory included therein in consistency with the content of the memory included in the image coding apparatus as long as the designed indexes are assigned to the extracted designed filter data elements and the designed filter data elements and the designed indexes are stored in the memory, in accordance with a rule identical to the rule of assigning designed indexes in the image coding apparatus. As a result, the image decoding apparatus can select appropriate application filter data elements corresponding to the application indexes added to the coded video signal, from the memory, and the filter-application image area can be appropriately filtered using the application filter data elements. Consequently, the quality of filtering can be improved, and the coded video signal can be appropriately decoded.

Furthermore, in the image decoding method, extracting of a designed filter data element, assigning of a designed index, and associating of the filter data element with the index are performed for each of one-dimensional component filters of two types (for example, vertical and horizontal component filters) that compose a two-dimensional separable filter. Here, when a filter data element of a two-dimensional filter is extracted for each filter-design image area, that is, when two designed filter data elements of the one-dimensional component filters of two types are collectively identified, a pair of the two designed filter data elements and the index are stored in a memory for each pair of two designed filter data elements, and the amount of data to be stored in the memory increases according to the number of the pairs. However, since a designed filter data element and a designed index are stored in the memory in association with each other for each one-dimensional component filter (for example, vertical and horizontal component filters) in the image decoding method, the amount of data to be stored in the memory can be suppressed regardless of any pair of the designed filter data element and the designed index.

Furthermore, although the present invention is applied to an interpolation filter in Embodiment 1, it may be applied to other filters.

Figure 25:
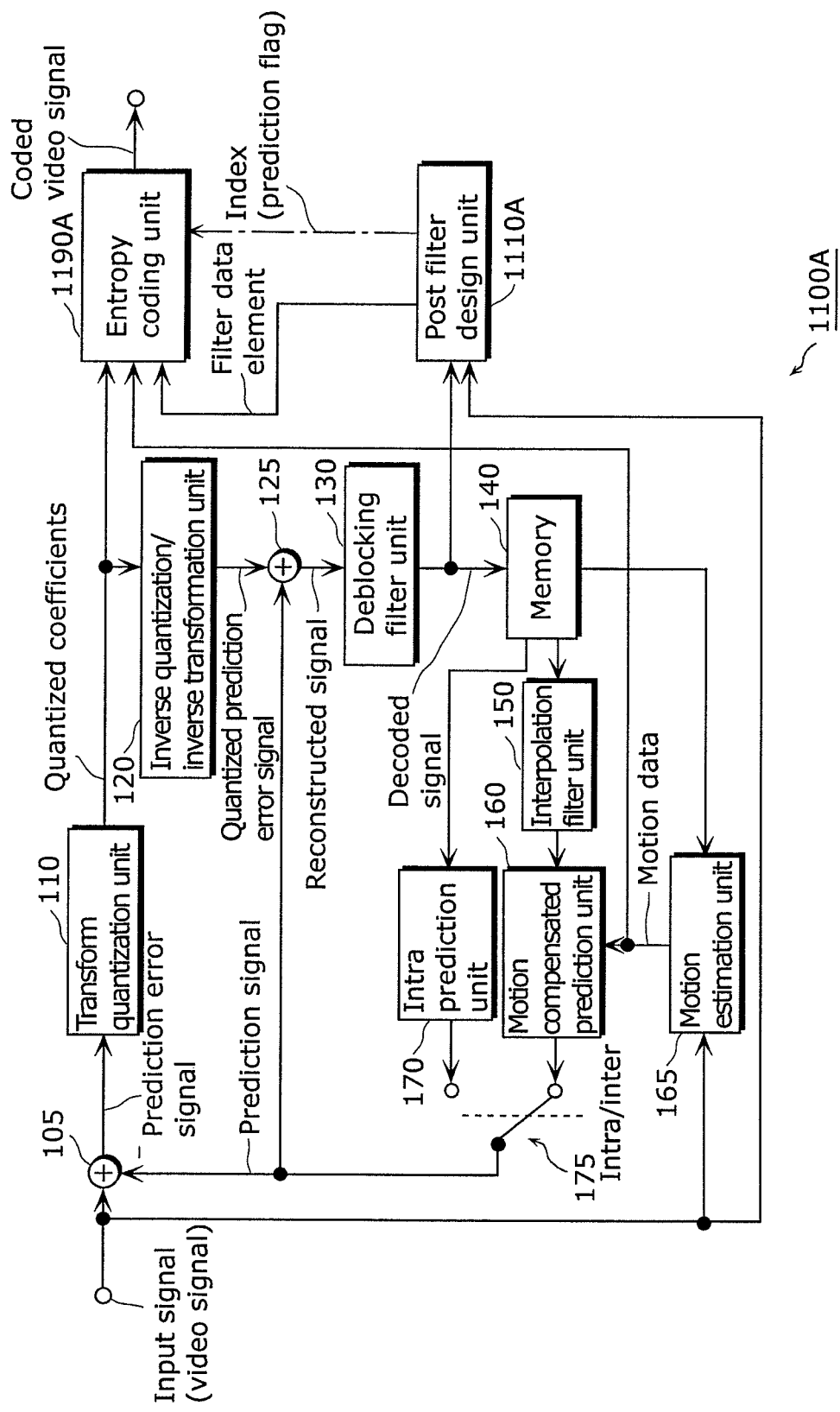
FIG. 25 is a block diagram illustrating an image coding apparatus with regard to an adaptive post filter according to the present invention.

FIG. 25 is a block diagram illustrating an image coding apparatus with regard to an adaptive post filter according to the present invention. An image coding apparatus 1100A includes a subtractor 105, a transform quantization unit 110, an inverse quantization/inverse transformation unit 120, an adder 125, a deblocking filter unit 130, a memory 140, an interpolation filter unit 150, a motion compensated prediction unit 160, a motion estimation unit 165, an intra prediction unit 170, an intra/inter switch 175, a post filter design unit 1110A, and an entropy coding unit 1190A. In FIG. 25, the constituent elements identical to those in FIGS. 1 and 4 are denoted by the same reference numerals in FIGS. 1 and 4, and the description thereof will be omitted. In the image coding apparatus 1100A according to the present invention, the functions and the configuration of the filter design unit 1110 in FIG. 5 are applied to the post filter design unit 1110.

The post filter design unit 1110A obtains an input signal and a decoded signal, determines (generates or obtains) post filter information as a filter data element (filter coefficients of a separable adaptive post filter) based on these signals, and outputs the filter data element, the index, and the prediction flag to the entropy coding unit 1190A. The entropy coding unit 1190A obtains quantized coefficients, motion data, and the filter data element, the index, and the prediction flag that are output from the post filter design unit 1110A, and entropy-codes those obtained to generate and output a coded video signal.

The post filter design unit 1110A may use many more signals other than the input signal and the decoded signal to determine a filter data element. For example, the post filter design unit 1110A may use, for example, a prediction signal, a prediction error signal, and a reconstructed signal. Furthermore, the post filter design unit 1110A may generate a filter data element for filtering each of these signals. Accordingly, the filtering performance can be further improved.

Figure 2:
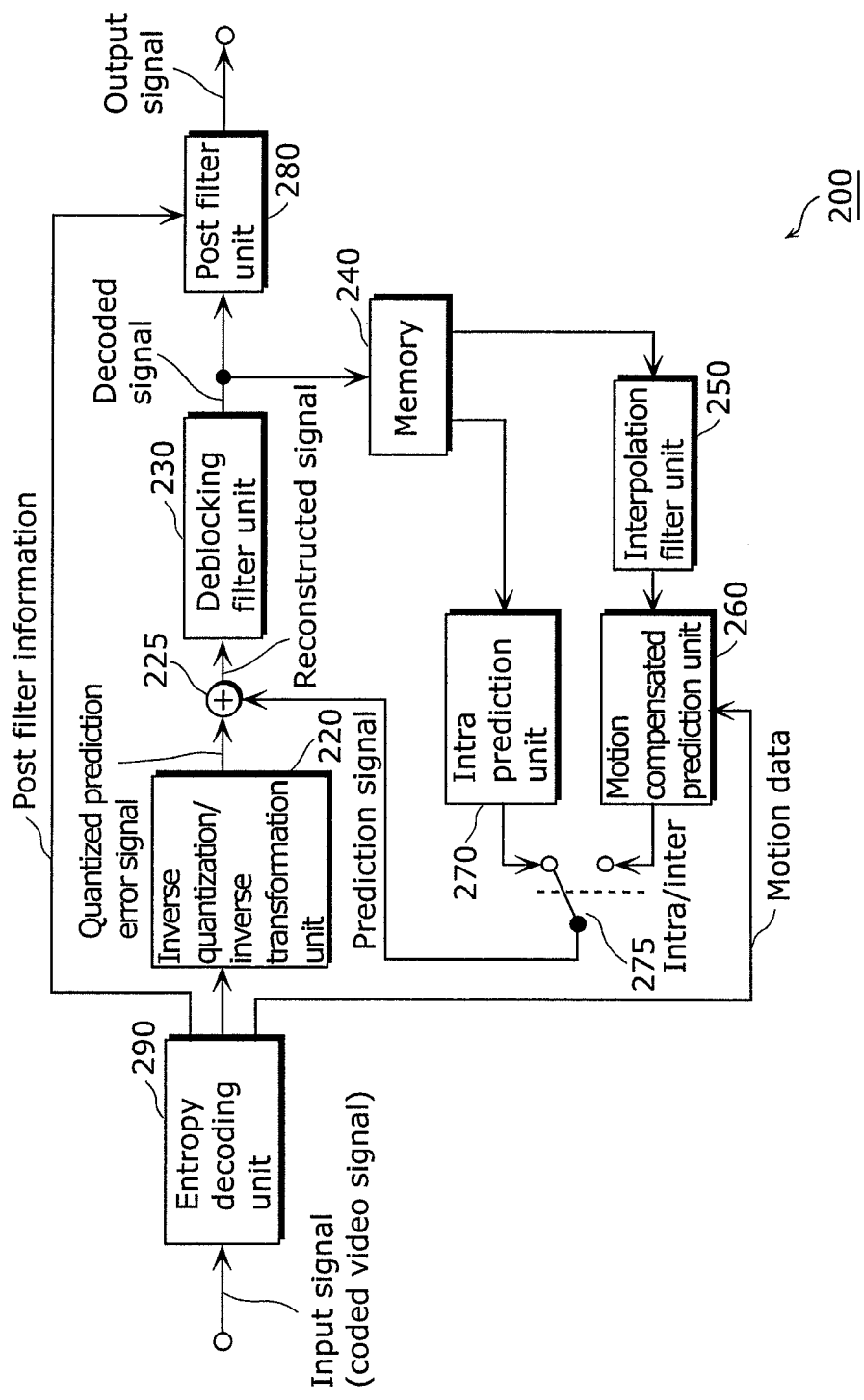
FIG. 2 is a block diagram illustrating an example of a typical H.264/MPEG-4 AVC standard compliant image decoding apparatus (decoder).
Figure 26:
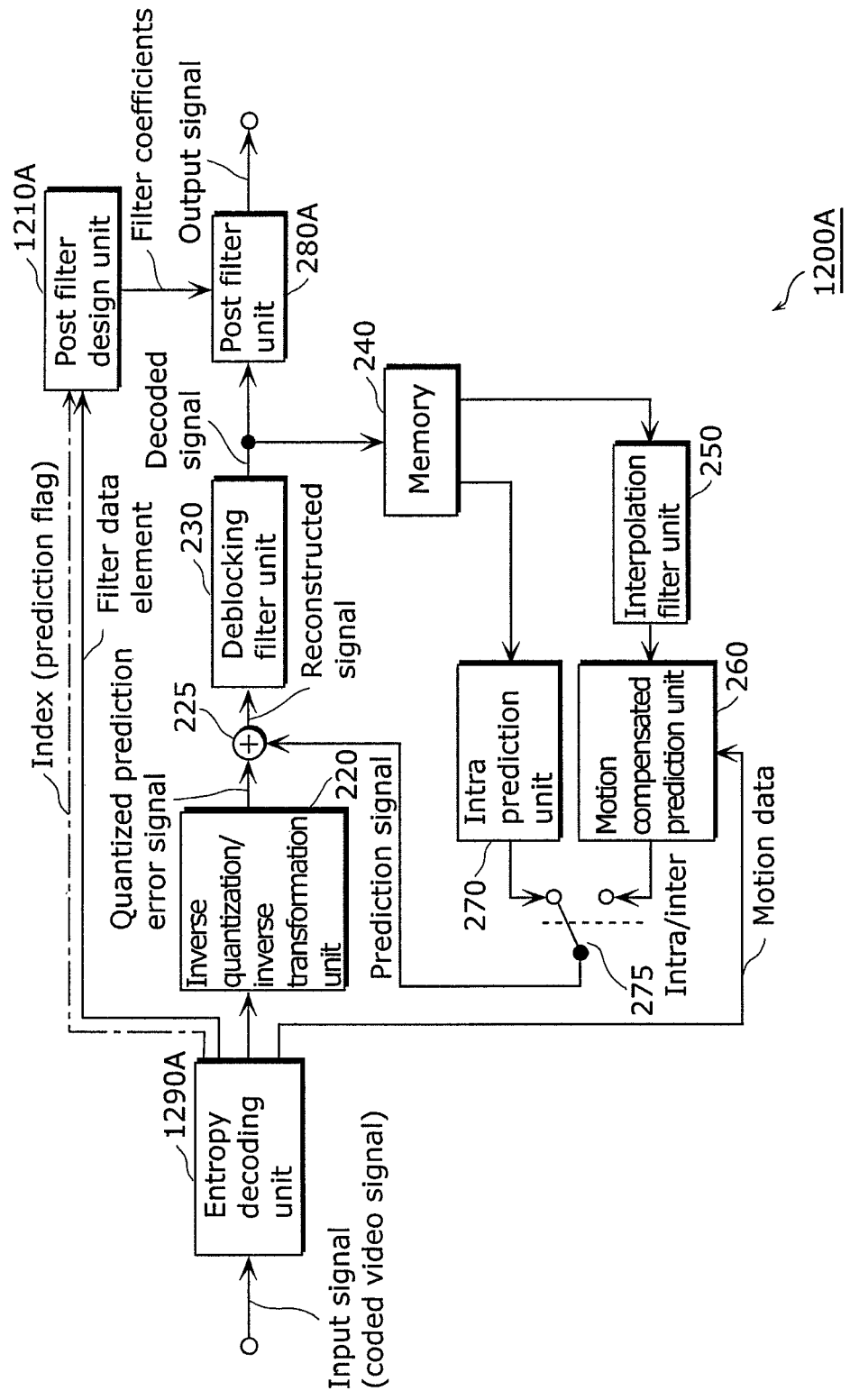
FIG. 26 is a block diagram illustrating an image decoding apparatus with regard to an adaptive post filter according to the present invention.

FIG. 26 is a block diagram illustrating an image decoding apparatus with regard to an adaptive post filter according to the present invention. An image decoding apparatus 1200A corresponding to the image coding apparatus 1100A in FIG. 25 obtains, as an input signal, a coded video signal that is an output signal from the image coding apparatus 1100A, and decodes the input signal. The image decoding apparatus 1200A includes an entropy decoding unit 1290A, an inverse quantization and inverse transformation unit 220, an adder 225, a deblocking filter unit 230, a memory 240, an interpolation filter unit 250, an intra prediction unit 270, an intra/inter switch 275, a motion compensated prediction unit 260, a post filter unit 280A, and a post filter design unit 1210A. In FIG. 26, the constituent elements identical to those in FIGS. 2 and 7 are denoted by the same reference numerals in FIGS. 2 and 7, and the description thereof will be omitted. In the image decoding apparatus 1200A according to the present invention, the functions and the configuration of the filter design unit 1210 in FIG. 8 are applied to the post filter design unit 1210A.

The entropy decoding unit 1290A entropy-decodes (for example, arithmetically decodes) the coded video signal that is the input signal to output the motion data and the quantized coefficients to the motion compensated prediction unit 260 and the inverse quantization and inverse transformation unit 220, respectively. Furthermore, through the entropy-decoding, the entropy decoding unit 1290A extracts the prediction flag, the index, and the filter data element from the coded video signal, and outputs these to the filter design unit 1210A.

The post filter design unit 1210A obtains the filter data element, the index, and the prediction flag from the entropy decoding unit 1290A, and outputs the filter coefficients corresponding to the index or the prediction flag, to the post filter unit 280A. The post filter unit 280A obtains the filter coefficients from the post filter design unit 1210A, and applies a post filter (adaptive post filter) to a decoded signal based on the filter coefficients. As a result, the post filter unit 280A outputs the decoded signal to which the post filter is applied, as an output signal.

Using the image coding apparatus 1100A in FIG. 25 and the image decoding apparatus 1200A in FIG. 26, the efficiency of the post filter can be improved.

Figure 27:
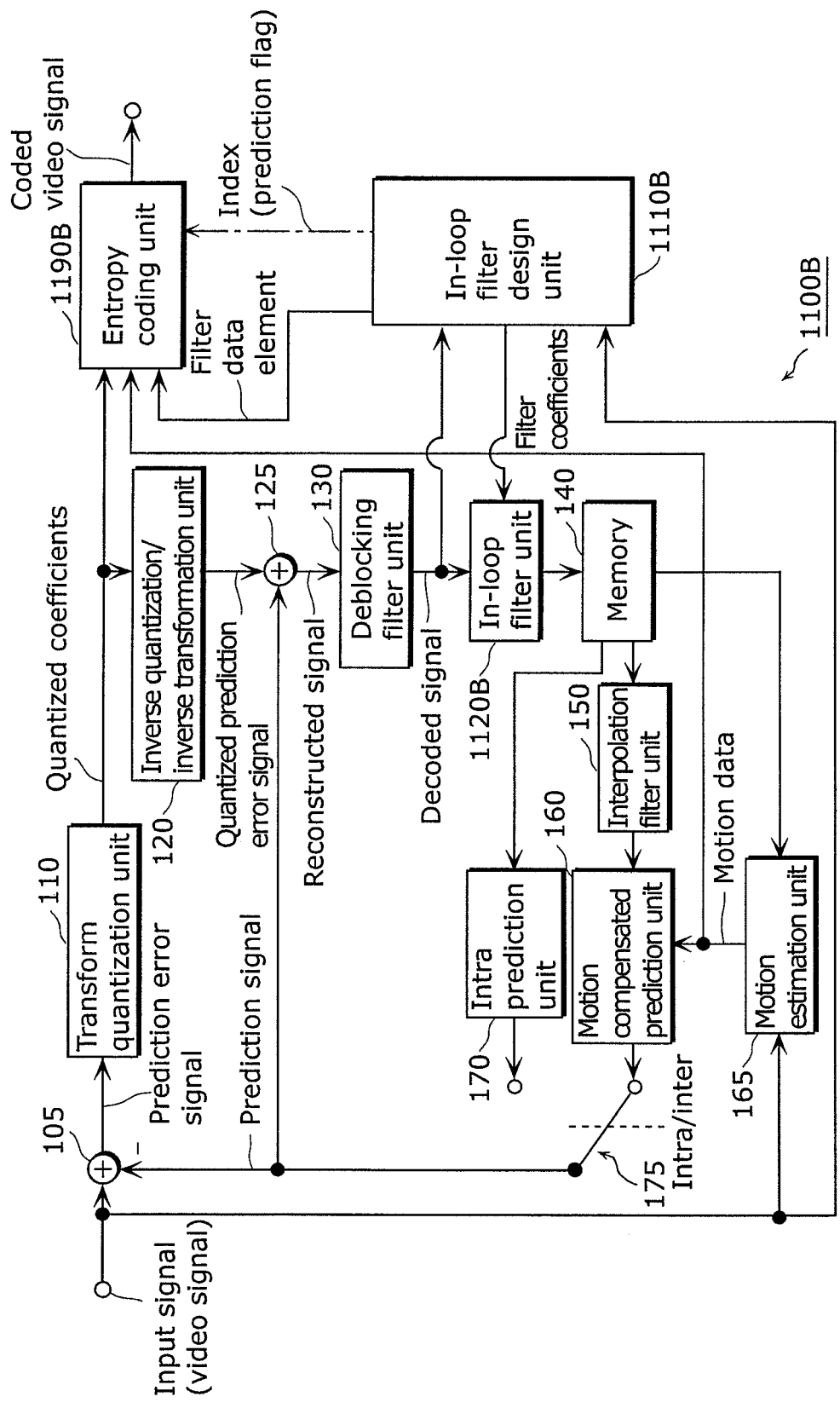
FIG. 27 is a block diagram illustrating an image coding apparatus with regard to an adaptive in-loop filter according to the present invention.

FIG. 27 is a block diagram illustrating an image coding apparatus 1100B with regard to an adaptive in-loop filter according to the present invention. The image coding apparatus 1100B includes a subtractor 105, a transform quantization unit 110, an inverse quantization/inverse transformation unit 120, an adder 125, a deblocking filter unit 130, a memory 140, an interpolation filter unit 150, a motion compensated prediction unit 160, a motion estimation unit 165, an intra prediction unit 170, an intra/inter switch 175, an in-loop filter unit 1120B, an in-loop filter design unit 1110B, and an entropy coding unit 1190B. In FIG. 27, the constituent elements identical to those in FIGS. 1 and 4 are denoted by the same reference numerals in FIGS. 1 and 4, and the description thereof will be omitted. In the image coding apparatus 1100B according to the present invention, the functions and the configuration of the filter design unit 1110 in FIG. 5 are applied to the in-loop filter design unit 1110B.

The in-loop filter design unit 1110B obtains an input signal and a decoded signal, determines (generates or obtains) a filter data element (filter coefficients of a separable adaptive in-loop filter) based on these signals, and outputs the filter data element, the index, and the prediction flag to the entropy coding unit 1190B. The entropy coding unit 1190B obtains quantized coefficients, motion data, and the filter data element, the index, and the prediction flag that are output from the in-loop filter design unit 1110B, and entropy-codes those obtained to generate and output a coded video signal. Furthermore, the in-loop filter design unit 1110B outputs the filter coefficients corresponding to the index or the prediction flag, to the in-loop filter unit 1120B. The in-loop filter unit 1120B obtains the filter coefficients from the in-loop filter design unit 1110B, and applies an in-loop filter to the decoded signal based on the filter coefficients.

The in-loop filter design unit 1110B may use many more signals other than the input signal and the decoded signal to determine a filter data element. For example, a prediction signal, a prediction error signal, and a reconstructed signal may be used. Furthermore, a filter data element for filtering each of these signals may be generated. Accordingly, the filtering performance can be further improved.

Figure 28:
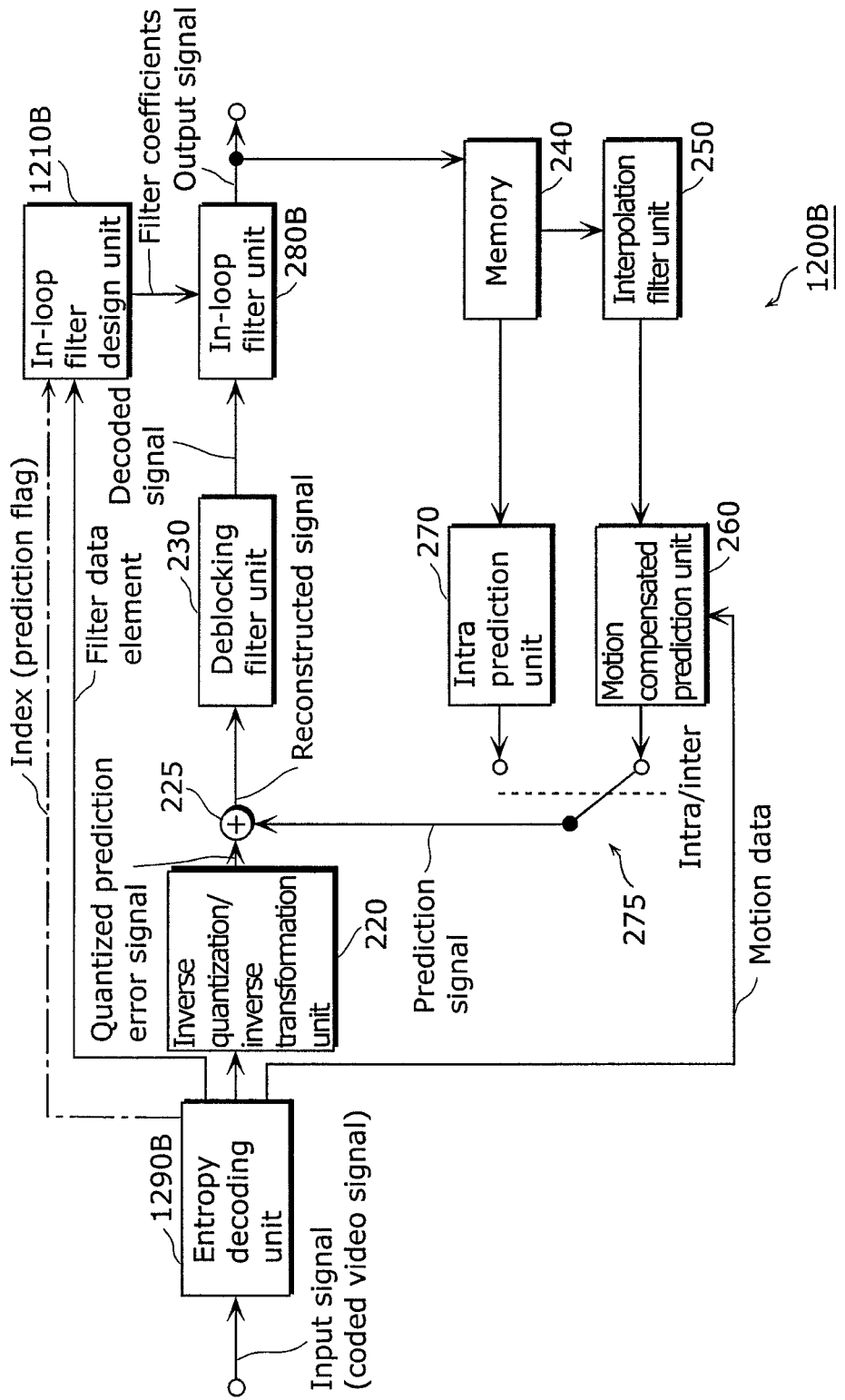
FIG. 28 is a block diagram illustrating an image decoding apparatus with regard to an adaptive in-loop filter according to the present invention.

FIG. 28 is a block diagram illustrating an image decoding apparatus with regard to an adaptive in-loop filter according to the present invention. An image decoding apparatus 1200B corresponding to the image coding apparatus 1100B in FIG. 27 obtains, as an input signal, a coded video signal that is an output signal from the image coding apparatus 1100B, and decodes the input signal. The image decoding apparatus 1200B includes an entropy decoding unit 1290B, an inverse quantization and inverse transformation unit 220, an adder 225, a deblocking filter unit 230, a memory 240, an interpolation filter unit 250, an intra prediction unit 270, an intra/inter switch 275, a motion compensated prediction unit 260, an in-loop filter unit 280B, and an in-loop filter design unit 1210B. In FIG. 28, the constituent elements identical to those in FIGS. 2 and 7 are denoted by the same reference numerals in FIGS. 2 and 7, and the description thereof will be omitted. In the image decoding apparatus 1200B according to the present invention, the functions and the configuration of the filter design unit 1210 in FIG. 8 are applied to the in-loop filter design unit 1210B.

The entropy decoding unit 1290B entropy-decodes (for example, arithmetically decodes) the coded video signal that is the input signal to output the motion data and the quantized coefficients to the motion compensated prediction unit 260 and the inverse quantization and inverse transformation unit 220, respectively. Furthermore, through the entropy-decoding, the entropy decoding unit 1290B extracts the prediction flag, the index, and the filter data element from the coded video signal, and outputs these to the in-loop filter design unit 1210B.

The in-loop filter design unit 1210B obtains the filter data element, the index, and the prediction flag from the entropy decoding unit 1290B, and outputs the filter coefficients corresponding to the index or the prediction flag, to the in-loop filter unit 280B. The in-loop filter unit 280B obtains the filter coefficients from the in-loop filter design unit 1210B, and applies an in-loop filter (adaptive in-loop filter) to the decoded signal based on the filter coefficients. As a result, the in-loop filter unit 280B outputs the decoded signal to which the in-loop filter is applied, as an output signal.

Using the image coding apparatus 1100B in FIG. 27 and the image decoding apparatus 1200B in FIG. 28, the efficiency of the in-loop filter can be improved.

Figure 29:
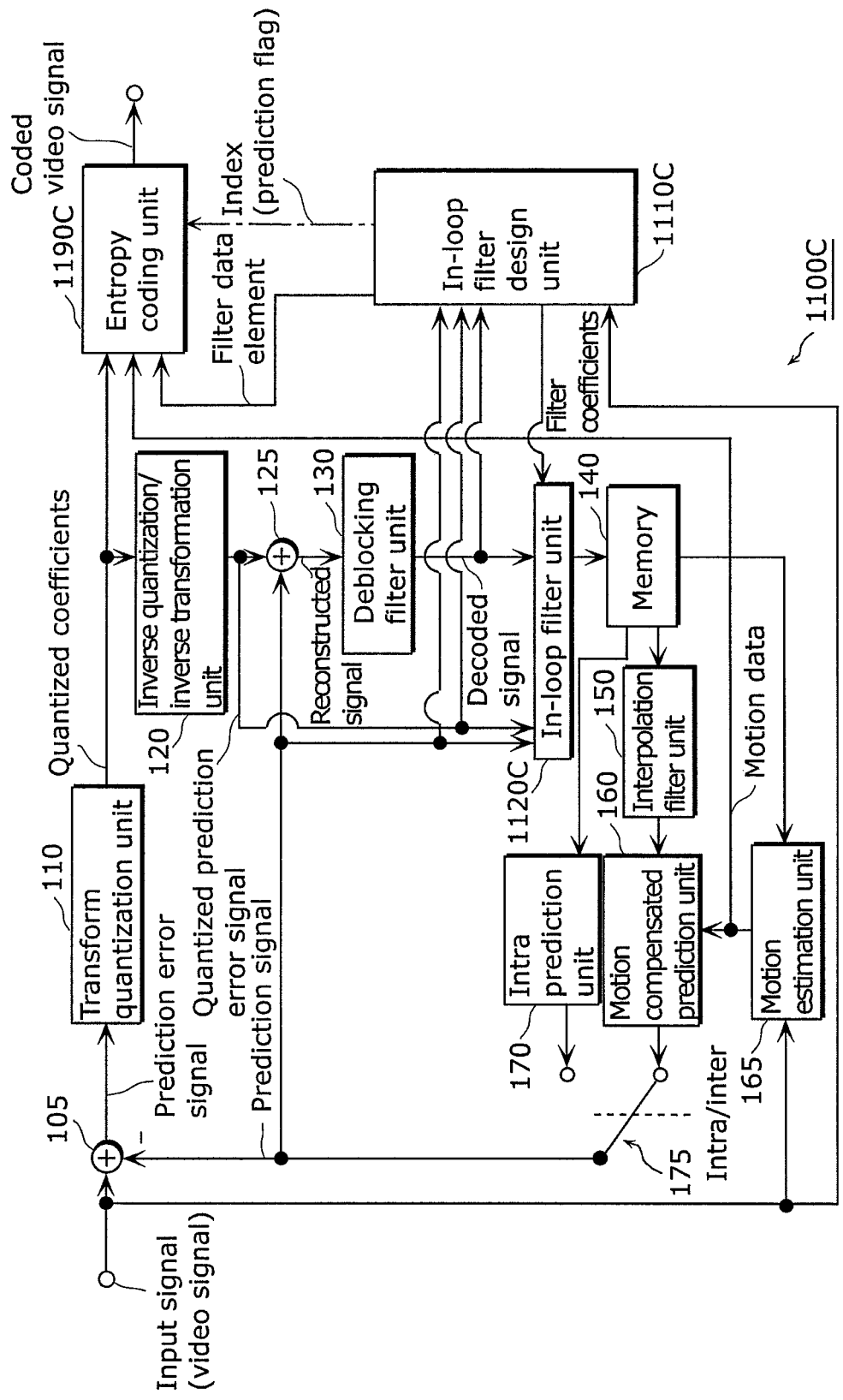
FIG. 29 is a block diagram illustrating an image coding apparatus with regard to another adaptive in-loop filter according to the present invention.

FIG. 29 is a block diagram illustrating an image coding apparatus 1100C with regard to an adaptive in-loop filter according to the present invention. The image coding apparatus 1100C includes a subtractor 105, a transform quantization unit 110, an inverse quantization/inverse transformation unit 120, an adder 125, a deblocking filter unit 130, a memory 140, an interpolation filter unit 150, a motion compensated prediction unit 160, a motion estimation unit 165, an intra prediction unit 170, an intra/inter switch 175, an in-loop filter unit 1120C, an in-loop filter design unit 1110C, and an entropy coding unit 1190C. In FIG. 29, the constituent elements identical to those in FIGS. 1 and 4 are denoted by the same reference numerals in FIGS. 1 and 4, and the description thereof will be omitted. In the image coding apparatus 1100C according to the present invention, the functions and the configuration of the filter design unit 1110 in FIG. 5 are applied to the in-loop filter design unit 1110C.

The in-loop filter design unit 1110C obtains an input signal, a quantized prediction error signal, a prediction signal, and a decoded signal, determines (generates or obtains) a filter data element (filter coefficients of a separable adaptive in-loop filter) based on these signals, and outputs the filter data element, the index, and the prediction flag to the entropy coding unit 1190C. The entropy coding unit 1190C obtains quantized coefficients, motion data, and the filter data element, the index, and the prediction flag that are output from the in-loop filter design unit 1110C, and entropy-codes those obtained to generate and output a coded video signal. Furthermore, the in-loop filter design unit 1110C outputs the filter coefficients corresponding to the index or the prediction flag, to the in-loop filter unit 1120C. The in-loop filter unit 1120C obtains the quantized prediction error signal, the prediction signal, and the decoded signal as well as the filter coefficients output from the in-loop filter design unit 1110B. Then, the in-loop filter unit 1120C applies an in-loop filter to the quantized prediction error signal, the prediction signal, and the decoded signal based on the filter coefficients.

The in-loop filter design unit 1110C may use many more signals other than the input signal and the decoded signal to determine a filter data element. Furthermore, the in-loop filter design unit 1110C may generate a filter data element for filtering each of the quantized prediction error signal, the prediction signal, and the decoded signal. Accordingly, the filtering performance can be further improved.

Figure 30:
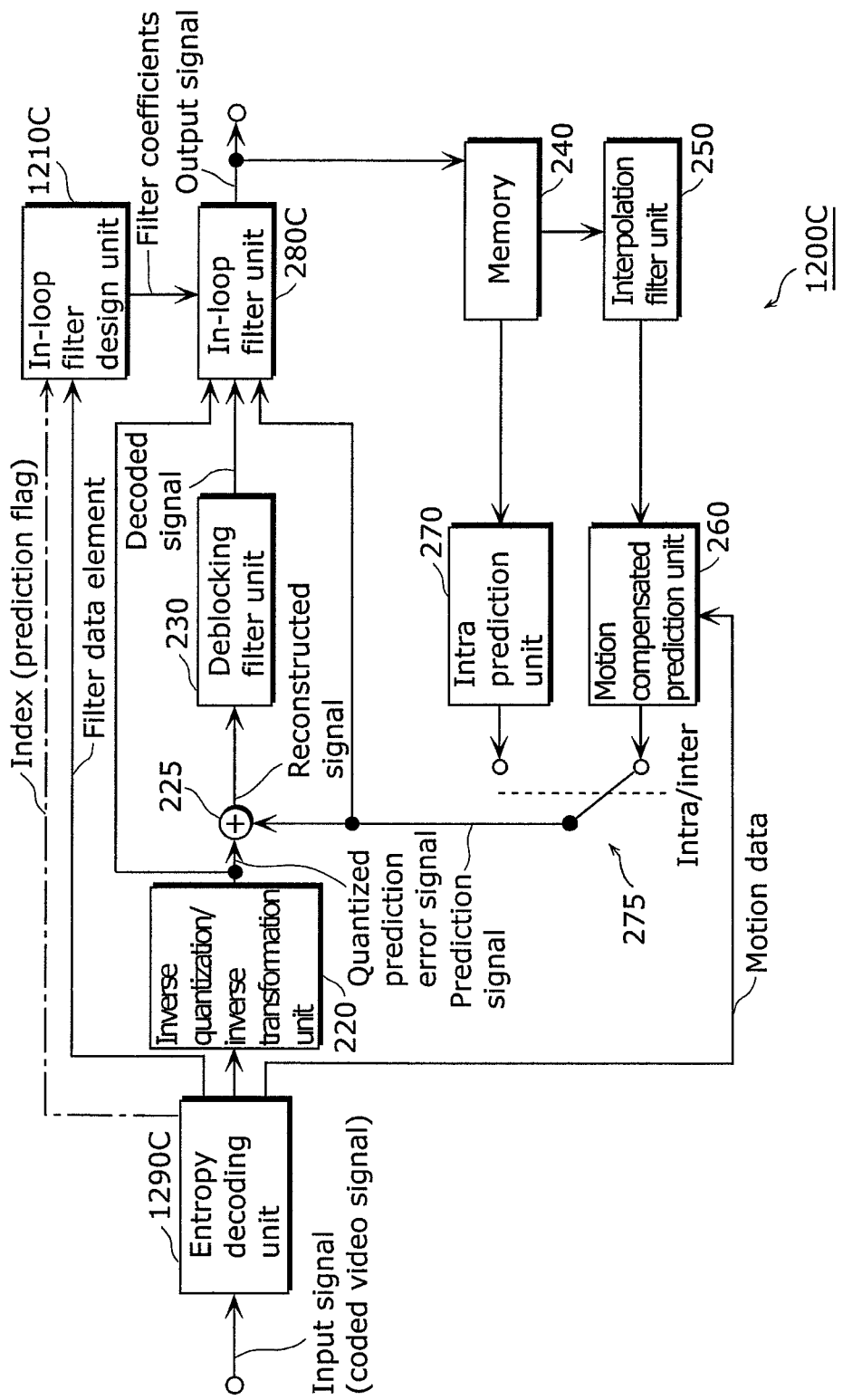
FIG. 30 is a block diagram illustrating an image decoding apparatus with regard to another adaptive in-loop filter according to the present invention.

FIG. 30 is a block diagram illustrating an image decoding apparatus 1200C with regard to an adaptive in-loop filter according to the present invention. The image decoding apparatus 1200C corresponding to the image coding apparatus 1100C in FIG. 29 obtains, as an input signal, a coded video signal that is an output signal from the image coding apparatus 1100C, and decodes the input signal. The image decoding apparatus 1200C includes an entropy decoding unit 1290C, an inverse quantization and inverse transformation unit 220, an adder 225, a deblocking filter unit 230, a memory 240, an interpolation filter unit 250, an intra prediction unit 270, an intra/inter switch 275, a motion compensated prediction unit 260, an in-loop filter unit 280C, and an in-loop filter design unit 1210C. In FIG. 30, the constituent elements identical to those in FIGS. 2 and 7 are denoted by the same reference numerals in FIGS. 2 and 7, and the description thereof will be omitted. In the image decoding apparatus 1200C according to the present invention, the functions and the configuration of the filter design unit 1210 in FIG. 8 are applied to the in-loop filter design unit 1210C.

The entropy decoding unit 1290C entropy-decodes (for example, arithmetically decodes) the coded video signal that is the input signal to output the motion data and the quantized coefficients to the motion compensated prediction unit 260 and the inverse quantization and inverse transformation unit 220, respectively. Furthermore, through the entropy-decoding, the entropy decoding unit 1290C extracts the prediction flag, the index, and the filter data element from the coded video signal, and outputs these to the in-loop filter design unit 1210C.

The post filter design unit 1210C obtains the filter data element, the index, and the prediction flag from the entropy decoding unit 1290C, and outputs the filter coefficients corresponding to the index or the prediction flag, to the in-loop filter unit 280C. The in-loop filter unit 280C obtains the filter coefficients from the in-loop filter design unit 1210C, and applies an in-loop filter (adaptive in-loop filter) to the quantized prediction error signal, the prediction signal, and the decoded signal based on the filter coefficients. As a result, the in-loop filter unit 280C outputs the decoded signal to which the in-loop filter is applied, as an output signal.

Using the image coding apparatus 1100C in FIG. 29 and the image decoding apparatus 1200C in FIG. 30, the efficiency of the in-loop filter can be improved.

Figure 31:
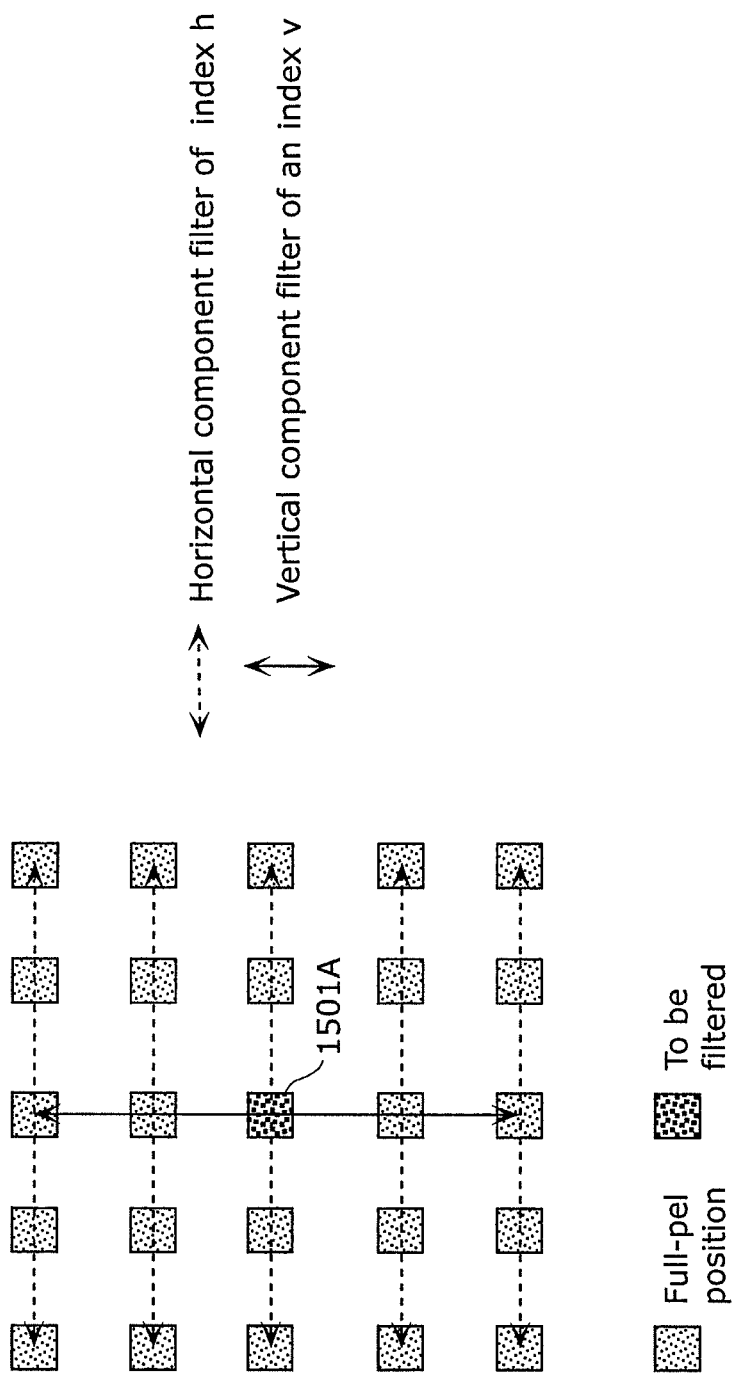
FIG. 31 illustrates the principle of filtering using a post filter and an in-loop filter.

FIG. 31 illustrates the principle of filtering using a post filter and an in-loop filter. The post filter is a filter to be applied by the post filter unit 280A. Furthermore, the in-loop filter is a filter to be applied by the in-loop filter units 280B, 280C, 1120B, and 1120C. The pixel value of a full-pel position 1501A is obtained by applying a horizontal component filter of an index h, and subsequently, a vertical component filter of an index v.

Embodiment 2

The processing described in Embodiment 1 can be simply implemented by recording, onto a recording medium, a program for implementing the image coding apparatus, the image decoding apparatus, and the methods therefor described in Embodiment 1. The recording medium may be any recording medium as long as the program can be recorded thereon, such as a magnetic disk, an optical disc, a magnetic optical disc, an IC card, and a semiconductor memory.

Hereinafter, the applications to the image coding apparatus and the image decoding apparatus and the methods therefor described in Embodiment 1 and a system using the same will be described.

Figure 32:
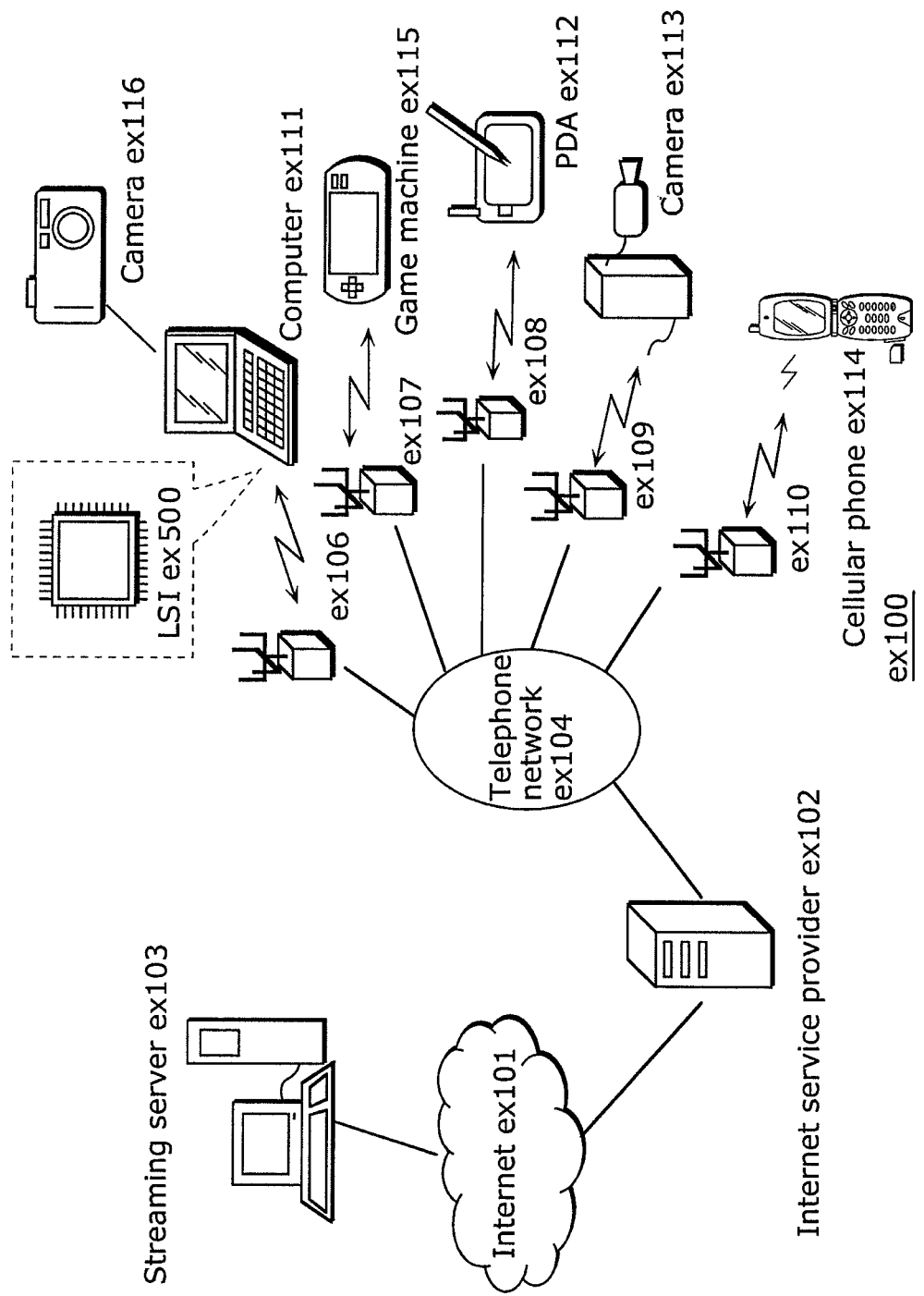
FIG. 32 schematically illustrates an overall configuration of a content providing system for implementing content distribution services.

FIG. 32 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex102 is not limited to the configuration shown in FIG. 32, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in Embodiment 1, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the moving picture data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

When each of the devices included in the content providing system ex100 performs coding and decoding, the image coding method and the image decoding method shown in Embodiment 1 may be used.

The cellular phone ex114 will be described as an example of such a device.

Figure 33:
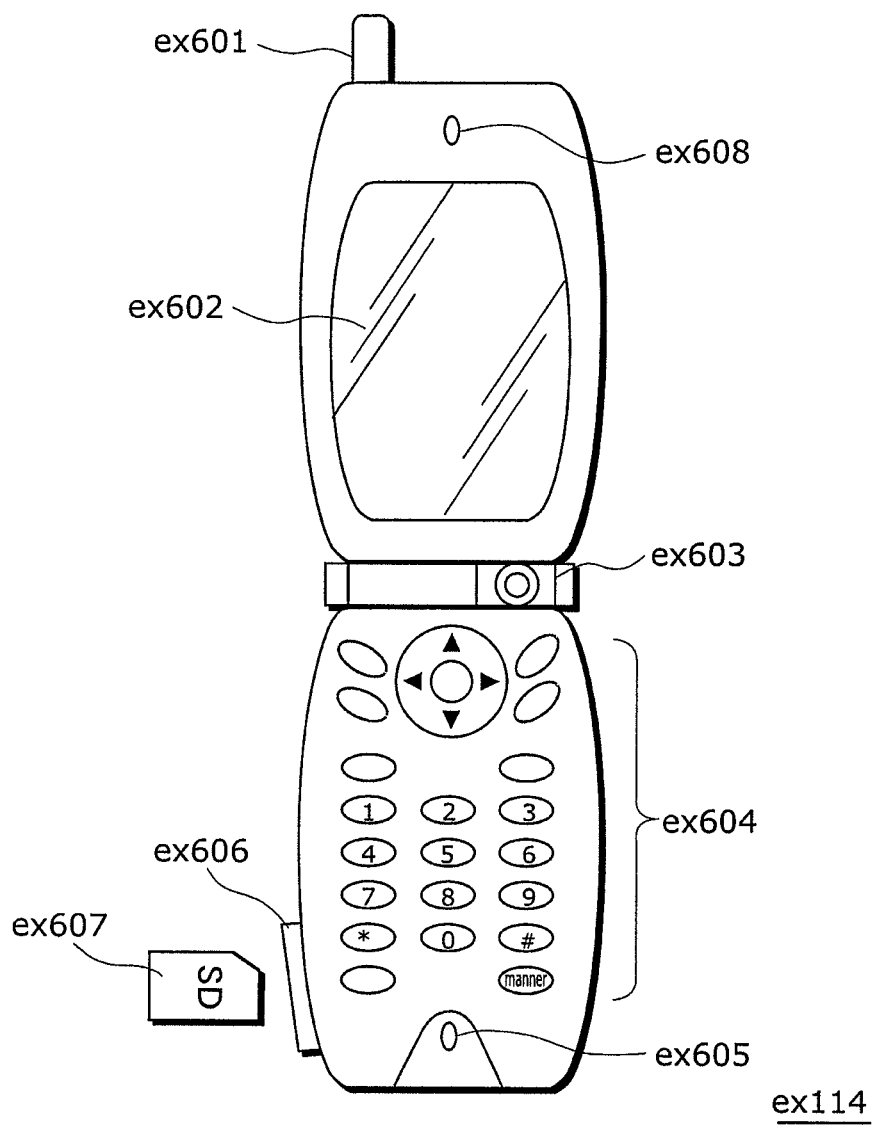
FIG. 33 illustrates an external view of a cellular phone.

FIG. 33 illustrates the cellular phone ex114 that uses the image coding method and the image decoding method described in Embodiment 1. The cellular phone ex114 includes: an antenna ex601 for transmitting and receiving radio waves through the base station ex110; a camera unit ex603 such as a CCD camera capable of capturing moving and still images; a display unit ex602 such as a liquid crystal display for displaying the data such as decoded video captured by the camera unit ex603 or received by the antenna ex601; a main body unit including a set of operation keys ex604; an audio output unit ex608 such as a speaker for output of audio; an audio input unit ex605 such as a microphone for input of audio; a recording medium ex607 for recording coded or decoded data including data of captured moving or still images, data of received e-mails, and data of moving or still images; and a slot unit ex606 for enabling the cellular phone ex114 to attach the recording medium ex607. The recording medium ex607 is a medium that stores a flash memory device within a plastic case, for example, an SD Card. The flash memory device is one type of Electrically Erasable and Programmable Read-Only Memory (EE-PROM) which is a non-volatile memory that is electrically rewritable and erasable.

Figure 34:
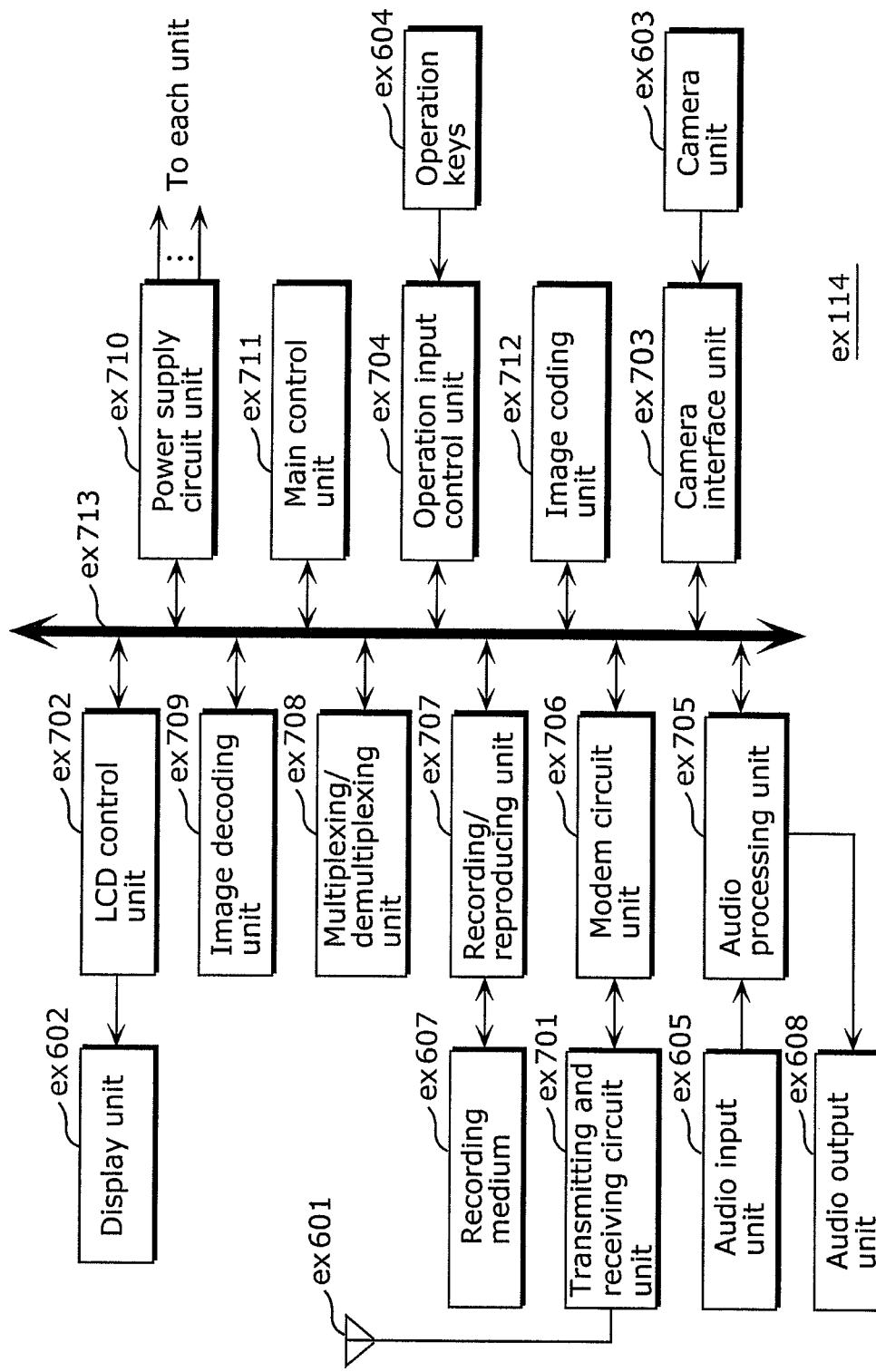
FIG. 34 is a block diagram illustrating an example of a configuration of a cellular phone.

Next, the cellular phone ex114 will be described with reference to FIG. 34. In the cellular phone ex114, a main control unit ex711 designed to control overall each unit of the main body including the display unit ex602 as well as the operation keys ex604 is connected mutually, via a synchronous bus ex713, to a power supply circuit unit ex710, an operation input control unit ex704, an image coding unit ex712, a camera interface unit ex703, a liquid crystal display (LCD) control unit ex702, an image decoding unit ex709, a multiplexing/demultiplexing unit ex708, a recording/reproducing unit ex707, a modem circuit unit ex706, and an audio processing unit ex705.

When a call-end key and a power key are turned ON by a user's operation, the power supply circuit unit ex710 supplies the respective units with power from a battery pack so as to activate the cell phone ex114 that is digital and is equipped with the camera.

In the cellular phone ex114, the audio processing unit ex705 converts the audio signals collected by the audio input unit ex605 in voice conversation mode into digital audio data under the control of the main control unit ex711 including a CPU, ROM, and RAM. Then, the modem circuit unit ex706 performs spread spectrum processing on the digital audio data, and the transmitting and receiving circuit unit ex701 performs digital-to-analog conversion and frequency conversion on the data, so as to transmit the resulting data via the antenna ex601. Also, in the cellular phone ex114, the transmitting and receiving circuit unit ex701 amplifies the data received by the antenna ex601 in voice conversation mode and performs frequency conversion and the analog-to-digital conversion on the data. Then, the modem circuit unit ex706 performs inverse spread spectrum processing on the data, and the audio processing unit ex705 converts it into analog audio data, so as to output it via the audio output unit ex608.

Furthermore, when an e-mail in data communication mode is transmitted, text data of the e-mail inputted by operating the operation keys ex604 of the main body is sent out to the main control unit ex711 via the operation input control unit ex704. The main control unit ex711 causes the modem circuit unit ex706 to perform spread spectrum processing on the text data, and the transmitting and receiving circuit unit ex701 performs the digital-to-analog conversion and the frequency conversion on the resulting data to transmit the data to the base station ex110 via the antenna ex601.

When image data is transmitted in data communication mode, the image data captured by the camera unit ex603 is supplied to the picture coding unit ex712 via the camera interface unit ex703. Furthermore, when the image data is not transmitted, the image data captured by the camera unit ex603 can be displayed directly on the display unit ex602 via the camera interface unit ex703 and the LCD control unit ex702.

The image coding unit ex712 including the image coding apparatus as described for the present invention compresses-codes the image data supplied from the camera unit ex603 using the coding method employed by the image coding apparatus as shown in Embodiment 1 so as to transform the data into coded image data, and sends the data out to the multiplexing/demultiplexing unit ex708. Furthermore, the cellular phone ex114 simultaneously sends out, as digital audio data, the audio collected by the audio input unit ex605 during the capturing with the camera unit ex603 to the multiplexing/demultiplexing unit ex708 via the audio processing unit ex705.

The multiplexing/demultiplexing unit ex708 multiplexes the coded image data supplied from the image coding unit ex712 and the audio data supplied from the audio processing unit ex705, using a predetermined method. Then, the modem circuit unit ex706 performs spread spectrum processing on the multiplexed data obtained by the multiplexing/demultiplexing unit ex708. The transmitting and receiving circuit unit ex701 performs the digital-to-analog conversion and the frequency conversion on the resulting data to transmit the data via the antenna ex601.

When receiving data of a video file which is linked to a Web page and others in data communication mode, the modem circuit unit ex706 performs inverse spread spectrum processing on the data received from the base station ex110 via the antenna ex601, and sends out the multiplexed data obtained as a result of the inverse spread spectrum processing to the multiplexing/demultiplexing unit ex708.

In order to decode the multiplexed data received via the antenna ex601, the multiplexing/demultiplexing unit ex708 demultiplexes the multiplexed data into a bit stream of image data and that of audio data, and supplies the coded image data to the image decoding unit ex709 and the audio data to the audio processing unit ex705, respectively via the synchronous bus ex713.

Next, the image decoding unit ex709 including the image decoding apparatus as described for the present invention decodes the bit stream of the image data using the decoding method corresponding to the coding method as shown in Embodiment 1 so as to generate reproduced video data, and supplies this data to the display unit ex602 via the LCD control unit ex702. Thus, the video data included in the video file linked to the Web page, for instance, is displayed. Simultaneously, the audio processing unit ex705 converts the audio data into analog audio data, and supplies the data to the audio output unit ex608. Thus, the audio data included in the video file linked to the Web page, for instance, is reproduced.

Figure 35:
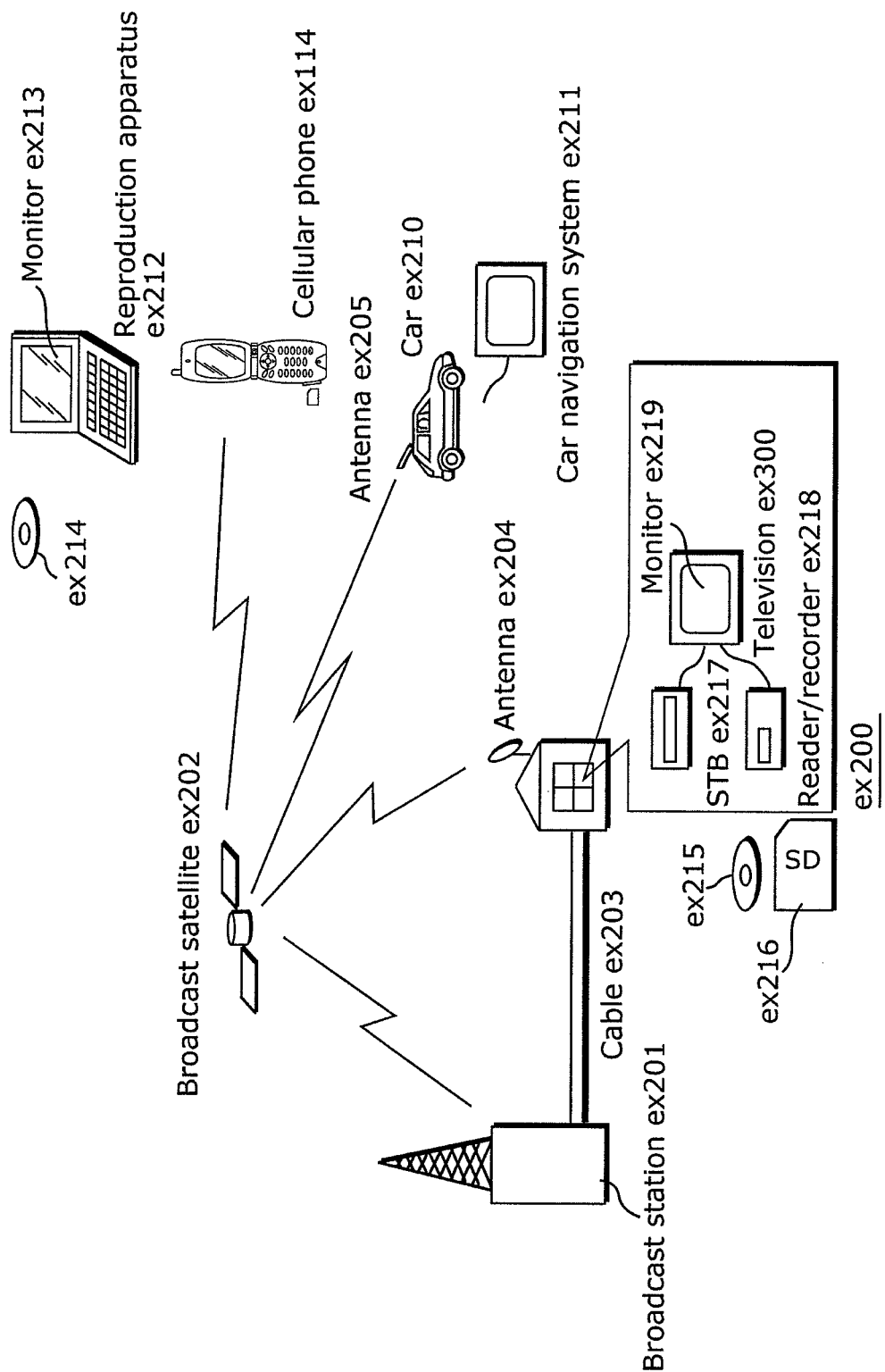
FIG. 35 schematically illustrates an example of an overall configuration of a digital broadcasting system.

The present invention is not limited to the above-mentioned system because terrestrial or satellite digital broadcasting has been in the news lately, and at least either the image coding apparatus or the image decoding apparatus described in Embodiment 1 can be incorporated into a digital broadcasting system as shown in FIG. 35. More specifically, a broadcast station ex201 communicates or transmits, via radio waves to a broadcast satellite ex202, audio data, video data, or a bit stream obtained by multiplexing the audio data and the video data. Upon receipt of the bit stream, the broadcast satellite ex202 transmits radio waves for broadcasting. Then, a home-use antenna ex204 with a satellite broadcast reception function receives the radio waves, and a device, such as a television (receiver) ex300 and a set top box (STB) ex217, decodes a coded bit stream and reproduces the decoded bit stream. Furthermore, a reader/recorder ex218 that reads and decodes such a bit stream obtained by multiplexing image data and audio data that are recorded on recording media ex215 and 216, such as a CD and a DVD, may include the image decoding apparatus as shown in Embodiment 1. In this case, the reproduced video signals are displayed on the monitor ex219. It is also possible to implement the image decoding apparatus in the set top box ex217 connected to a cable ex203 for a cable television or an antenna ex204 for satellite and/or terrestrial broadcasting, so as to reproduce the video signals on the monitor ex219 of the television ex300. The image decoding apparatus may be included not in the set top box but in the television ex300. Also, a car ex210 having an antenna ex205 can receive signals from the satellite ex202 or the base stations for reproducing video on a display device such as a car navigation system ex211 set in the car ex210.

Furthermore, the image decoding apparatus or the image coding apparatus as shown in Embodiment 1 can be implemented in the reader/recorder ex218 (i) for reading and decoding the video data, the audio data, or the coded bit stream obtained by multiplexing the video data and the audio data, or (ii) for coding the video data, the audio data, or the coded bit stream obtained by multiplexing the video data and the audio data and recording the resulting data as the multiplexed data on the recording medium ex215. Here, the video data and the audio data are recorded on the recording medium ex215, such as a BD and a DVD. In this case, the reproduced video signals are displayed on the monitor ex219. Furthermore, the reproduced video signals can be reproduced by another device or system, using the recording medium ex215 on which the coded bit stream is recorded. For example, another reproduction apparatus ex212 can reproduce the video signals on a monitor ex213, using a recording medium ex214 on which the coded bit stream is copied.

Furthermore, it is also possible to implement the image decoding apparatus in the set top box ex217 connected to the cable ex203 for a cable television or the antenna ex204 for satellite and/or terrestrial broadcasting, so as to display the video signals on the monitor ex219 of the television ex300. The image decoding apparatus may be included not in the set top box but in the television ex300.

Figure 36:
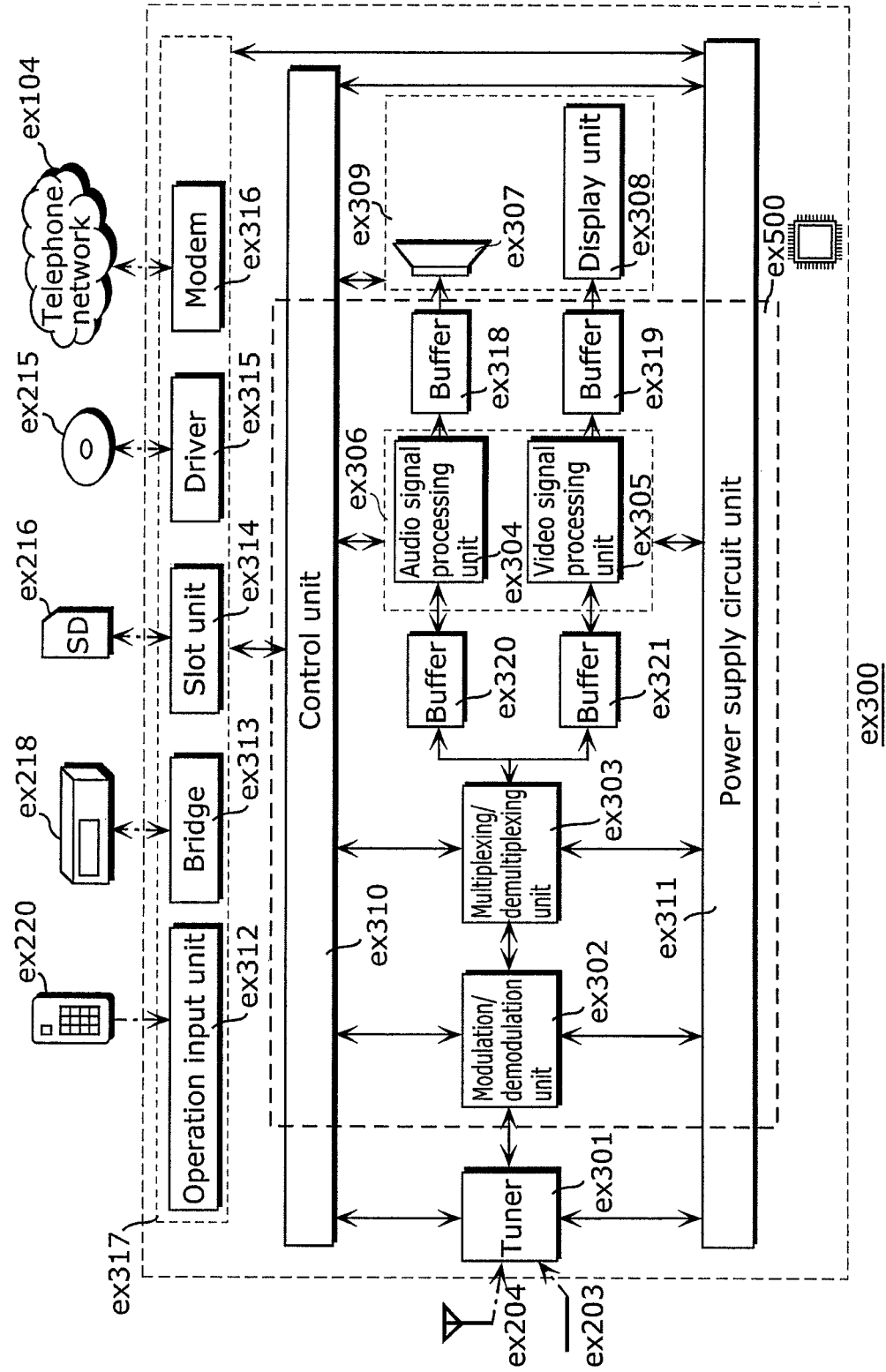
FIG. 36 is a block diagram illustrating an example of a configuration of a television.

FIG. 36 illustrates the cellular phone ex304 that uses the image coding method and the image decoding method described in Embodiment 1. The television ex300 includes: a tuner ex301 that obtains or provides a bit stream of video information from and through the antenna ex204 or the cable ex203, etc. that receives a broadcast; a modulation/demodulation unit ex302 that demodulates the received coded data or modulates data into coded data to be supplied outside; and a multiplexing/demultiplexing unit ex303 that demultiplexes the modulated data into video data and audio data, or multiplexes the coded video data and audio data into data. Furthermore, the television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes data obtained from outside through the antenna ex204 and others and reproduces the decoded data will be described. In the television ex300, upon receipt of a user operation from a remote controller ex220 and others, the multiplexing/demultiplexing unit ex303 demultiplexes the video data and audio data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in Embodiment 1, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read a coded bitstream not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the image coding method as described in Embodiment 1. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes a coded bit stream from or in a recording medium, one of the television ex300 and the reader/recorder ex218 may decode or code the coded bit stream, and the television ex300 and the reader/recorder ex218 may share the decoding or coding.

Figure 37:
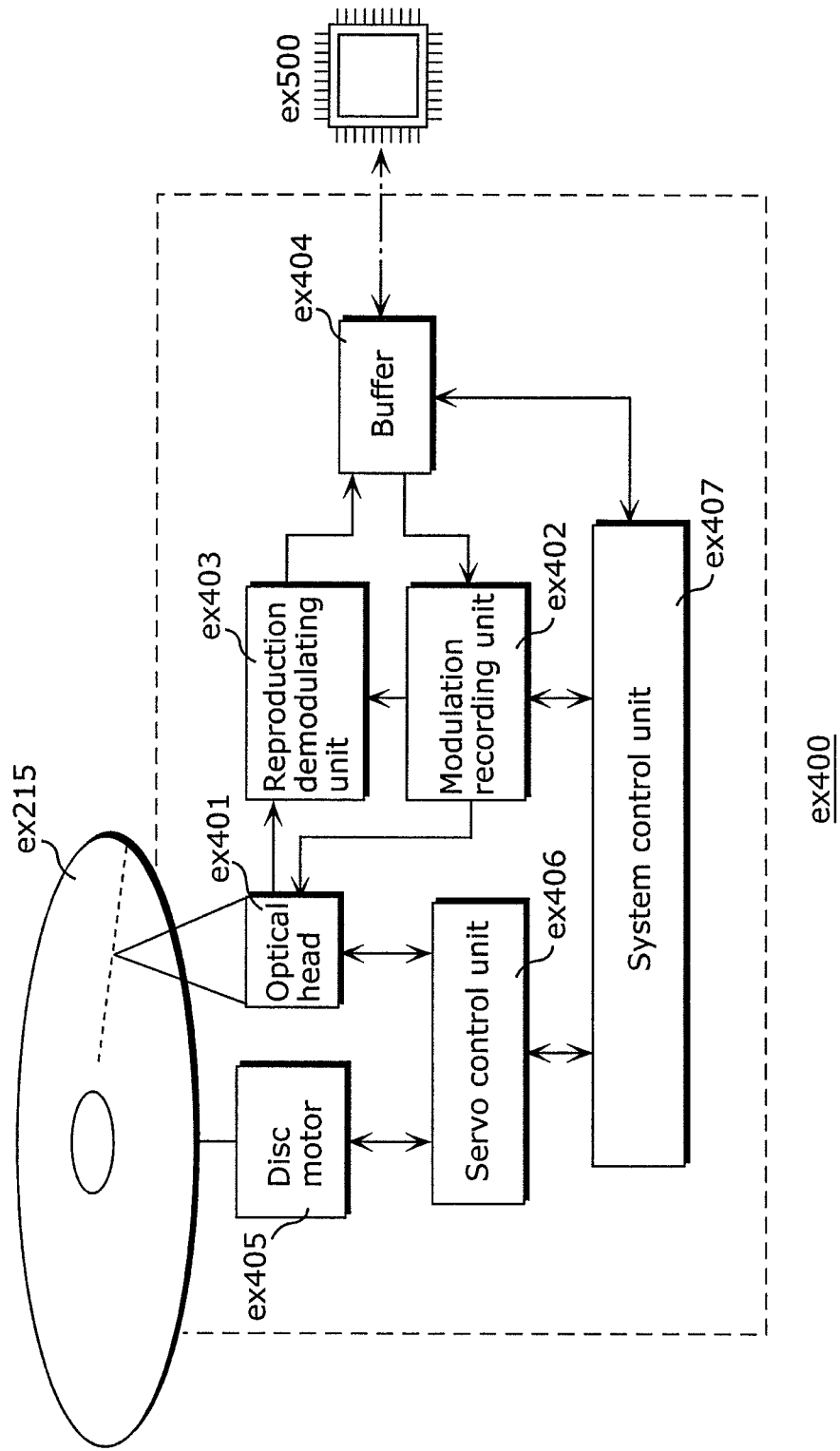
FIG. 37 is a block diagram illustrating an example of a configuration of an information reproducing/recording unit that reads and writes information from or on a recording medium that is an optical disc.

As an example, FIG. 37 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 38:
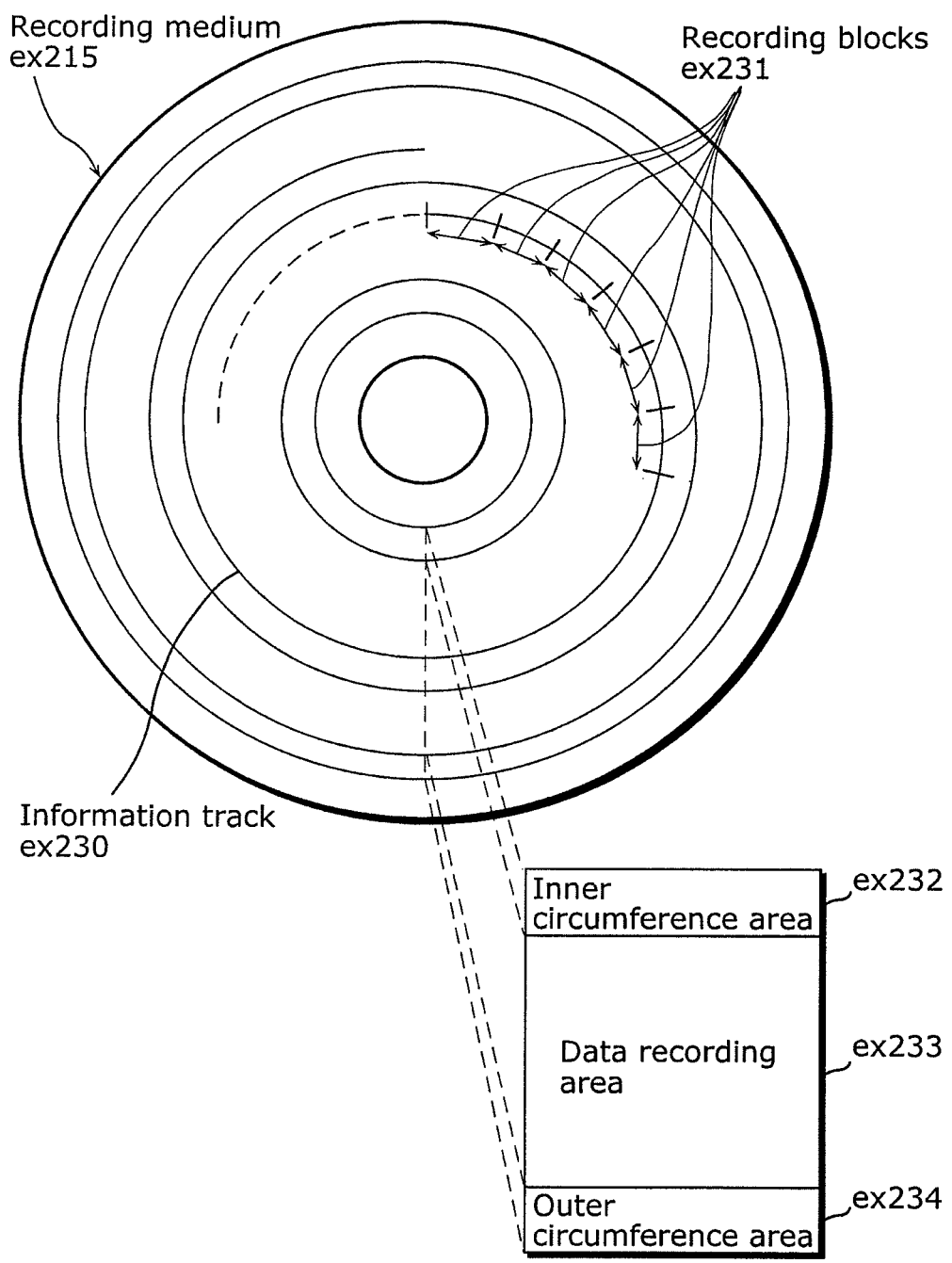
FIG. 38 illustrates an example of a configuration of a recording medium that is an optical disc.

FIG. 38 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or coded data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be the one for example, including a GPS receiving unit in the configuration illustrated in FIG. 34. The same will be true for the configuration of the computer ex111, the cellular phone ex114, and others. Furthermore, similarly to the television ex300, a terminal such as the cellular phone ex114 may have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus.

As such, the image coding method and the image decoding method in Embodiment 1 can be used in any of the devices and systems described. Thus, the advantages described therein can be obtained.

Furthermore, the present invention is not limited to Embodiment 1, and various modifications and revisions are possible without departing from the scope of the present invention.

Embodiment 3

Figure 39:
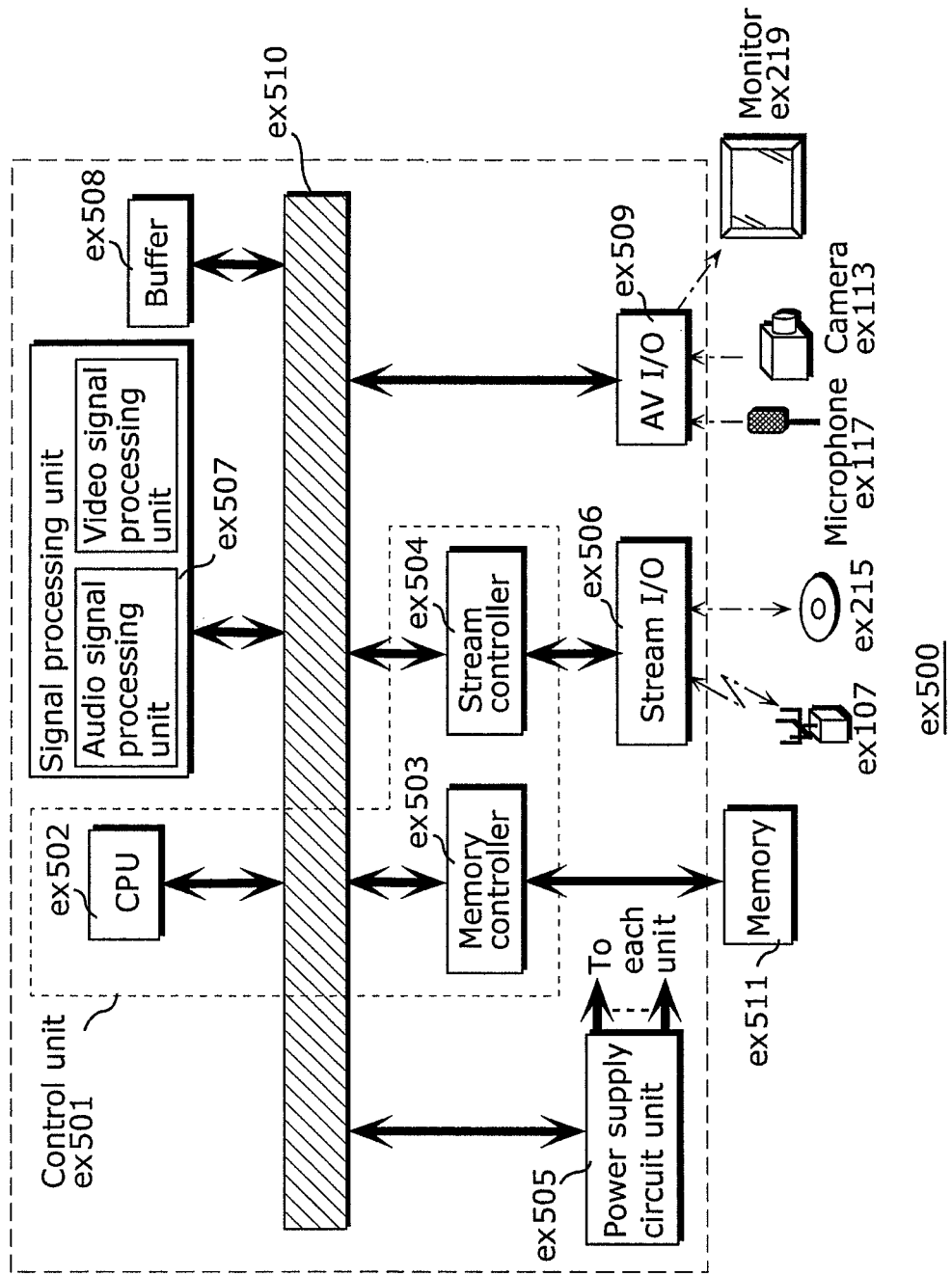
FIG. 39 is a block diagram illustrating an example of a configuration of an integrated circuit for implementing the image coding method and the image decoding method according to each of Embodiments.

Each of the image coding method, the image coding apparatus, the image decoding method, and the image decoding apparatus in each of Embodiments is typically achieved in the form of an integrated circuit or a Large Scale Integrated (LSI) circuit. As an example, FIG. 39 illustrates a configuration of an LSI ex500 that is made into one chip. The LSI ex500 includes elements ex501 to ex509 to be described below, and the elements are connected to each other through a bus ex510. The power supply circuit unit ex505 is activated by supplying each of the elements with power when power is on.

For example, when coding is performed, the LSI ex500 receives an AV signal from a microphone ex117, a camera ex113, and others through an AV IO ex509 under control of a control unit ex501 including a CPU ex502, a memory controller ex503, and a stream controller ex504. The received AV signal is temporarily stored in a memory ex511 outside the LSI ex500, such as an SDRAM. Under control of the control unit ex501, the stored data is subdivided into data portions according to the computing amount and speed as necessary. Then, the data portions are transmitted to a signal processing unit ex507. The signal processing unit ex507 codes an audio signal and/or a video signal. Here, the coding of the video signal is the coding described in Embodiments. Furthermore, the signal processing unit ex507 sometimes multiplexes the coded audio data and the coded video data, and a stream I/O ex506 provides the multiplexed data outside. The provided bit stream is transmitted to a base station ex107, or written into the recording medium ex215. When data sets are multiplexed, the data sets should be temporarily stored in the buffer ex508 so that the data sets are synchronized with each other.

For example, when coded data is decoded, the LSI ex500 temporarily stores, in the memory ex511, the coded data obtained from the base station ex107 through the stream I/O ex506 or read from the recording medium ex215 under control of the control unit ex501. Under control of the control unit ex501, the stored data is subdivided into data portions according to the computing amount and speed as necessary. Then, the data portions are transmitted to a signal processing unit ex507. The signal processing unit ex507 decodes audio data and/or video data. Here, the decoding of the video signal is the decoding described in Embodiments. Furthermore, a decoded audio signal and a decoded video signal may be temporarily stored in the buffer ex508 and others so that the signals can be reproduced in synchronization with each other. Each of the output units, such as the cellular phone ex114, the game machine ex115, and the television ex300 provides the decoded output signal through, for example, the memory 511 as necessary.

Although the memory ex511 is an element outside the LSI ex500 in the description, it may be included in the LSI ex500. The buffer ex508 is not limited to one buffer, but may be composed of buffers. Furthermore, the LSI ex500 may be made into one chip or a plurality of chips.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. One such possibility is that the present invention is applied to biotechnology.

Although the image coding method, the image coding apparatus, the image decoding method, and the image decoding apparatus according to the present invention are described based on Embodiments, the present invention is not limited to these Embodiments. Those skilled in the art will readily appreciate that many modifications are possible in the exemplary Embodiments without materially departing from the novel teachings and advantages of the present invention. Accordingly, all such modifications and other embodiments conceivable by arbitrarily combining the structural elements and/or steps of different embodiments are intended to be included within the scope of the present invention.

The outline of most of the examples is described above with regard to an image coding system based on the H.264/AVC. The terms herein mainly relate to the terms of the H.264/AVC. The terms and description of various embodiments for coding based on the H.264/AVC are not intended to limit the principle and the ideas of the present invention to the system described herein. The detailed description of the coding and decoding in accordance with the H.264/AVC standard is intended to promote the understanding of the exemplified embodiments herein. Thus, the processes and functions of the image coding should not be regarded as limiting the present invention to the described embodiments. The proposed improvements herein will be easily applicable to the image coding. Furthermore, the concept of the present invention will be easily available in the enhancements of H.264/AVC coding currently discussed by the JVT.

INDUSTRIAL APPLICABILITY

The image coding method and the image decoding method according to the present invention have advantages of improving the quality of video filtering as well as suppressing increase in the transmission bandwidth. For example, the methods are applicable to video cameras, mobile phones, and personal computers.

REFERENCE SIGNS LIST

10 Image coding apparatus
11 Filter data selecting unit
12 Index obtaining unit
13 Coding unit
14 Index adding unit
15 Filter data identifying unit
16 Index assigning unit
17 Storage processing unit
18 Filter data adding unit
20 Image decoding apparatus
21 Index extracting unit
22 Filter data obtaining unit
23 Decoding unit
24 Filter data extracting unit
25 Index assigning unit
26 Storage processing unit
105 Subtractor
110 Transform quantization unit
120 Inverse quantization/inverse transformation unit
125 Adder
130 Deblocking filter unit
140 Memory
160 Motion compensated prediction unit
165 Motion estimation unit
170 Intra prediction unit
175 Intra/inter switch
180 Post filter design unit
220 Inverse quantization/inverse transformation unit
225 Adder
230 Deblocking filter unit
240 Memory
260 Motion compensated prediction unit
270 Intra prediction unit
275 Intra/inter switch
280 Post filter unit
1100 Image coding apparatus
1110 Filter design unit
1150 Interpolation filter unit
1190 Entropy coding unit
1200 Image decoding apparatus
1210 Filter design unit
1250 Interpolation filter unit
1290 Entropy decoding unit
1310 Filter calculating unit
1320 Index generating unit
1330 Filter memory
1350 Filter selecting unit
1420 Index generating unit
1430 Filter memory
1450 Filter selecting unit
1460 Filter setting unit

The invention claimed is:

1. An image coding method of coding a video signal to generate a coded video signal that is a bitstream, said method comprising:
selecting, from at least one filter data element stored in a memory, respective filter data elements of one-dimensional component filters of two types that compose a two-dimensional separable filter as two application filter data elements, the one-dimensional component filters being to be applied to a filter-application image area indicated by the video signal;
obtaining an index stored in the memory in association with a corresponding one of the selected two application filter data elements, as an application index, for each of the one-dimensional component filters;
coding the filter-application image area by applying, to the filter-application image area, the one-dimensional component filters of two types using the two application filter data elements selected in said selecting;

adding the two application indexes obtained in said obtaining to the coded filter-application image area in the coded video signal;

identifying filter data elements of the one-dimensional component filters as two designed filter data elements, based on a filter-design image area including the filter-application image area and indicated by the video signal;

assigning an index for identifying a corresponding one of the designed filter data elements to the corresponding one of the designed filter data elements as a designed index for each of the one-dimensional component filters;

storing, in the memory, the designed filter data element and the designed index in association with each other, for each of the one-dimensional component filters, the designed index being assigned to the designed filter data element; and adding the two designed filter data elements identified in said identifying of filter data elements, to the coded filter-design image area in the coded video signal.

2. The image coding method according to claim 1, wherein in said selecting, after the two designed filter data elements are stored in the memory in said storing, the two application filter data elements are selected from among the filter data elements including the two designed filter data elements.

3. The image coding method according to claim 1, wherein in said selecting, before the two designed filter data elements are stored in the memory in said storing, the two application filter data elements are selected from the at least one filter data element excluding the two designed filter data elements.

4. The image coding method according to claim 1, further comprising identifying other two filter data elements of the one-dimensional component filters of two types, based on an other filter-design image area that precedes the filter-design image area in coding order, the other filter-design image area being indicated by the video signal, wherein in said selecting, the two application filter data elements are selected from among the filter data elements including the two filter data elements identified in said identifying of other two filter data elements.

5. The image coding method according to claim 1, further comprising predicting one of the two application indexes of the one-dimensional component filters of two types, wherein when a prediction index obtained in said predicting is identical to the one of the two application indexes, in said adding of the two application indexes, prediction information indicating that the one of the two application indexes is identical to an index indicating a result of the prediction is added to the coded video signal, instead of the one of the two application indexes.

6. The image coding method according to claim 5, wherein in said predicting, the one of the two application indexes is predicted by selecting any one of indexes of the one-dimensional component filters of two types as the prediction index, the indexes including two indexes obtained from each of surrounding filter-application image areas that surround the filter-application image area and that are included in the filter-design image area.

7. The image coding method according to claim 6, further comprising estimating a motion vector for each of the filter-application image area and the surrounding filter-application image areas, wherein in said predicting, a surrounding filter-application image area from which a motion vector most similar to the motion vector estimated for the filter-application image area is estimated is identified from among the surrounding filter-application image areas, and one of the two indexes of the one-dimensional component filters of two types is selected as the prediction index, the one of the two application indexes being obtained for the identified surrounding filter-application image area.

8. The image coding method according to claim 7, wherein in said predicting, an index of a one-dimensional component filter of a type identical to a type of the one of the two application indexes for the one-dimensional component filters is selected as the prediction index from among the two indexes of the one-dimensional component filters of two types.

9. The image coding method according to claim 5, wherein in said predicting, the one of the two application indexes is predicted using the other of the two application indexes of the one-dimensional component filters of two types, the other of the two application indexes being obtained for the filter-application image area.

10. The image coding method according to claim 1, wherein when the video signal indicates filter-design image areas including the filter-design image area, said identifying of filter data elements, said assigning, and said storing are repeated for each of the filter-design image areas, and in said assigning, the two designed indexes are assigned to each of the filter-design image areas so that values indicated by the two designed indexes for each of the filter-design image areas monotonically increase or decrease, according to an order of storing the two designed indexes for each of the filter-design image areas in the memory in said storing or an order of displaying the filter-design image areas.

11. The image coding method according to claim 1, wherein the filter-design image area is a slice, and the filter-application image area is a block, and in said adding of the two designed filter data elements, the two designed filter data elements are added to a header of the coded slice.

12. The image coding method according to claim 1, wherein the one-dimensional component filters of two types are vertical and horizontal component filters, and in said identifying of filter data elements, the two designed filter data elements are identified so that an information amount of the designed filter data element of the horizontal component filter is larger than an information amount of the designed filter data element of the vertical component filter.

13. An image decoding method of decoding a coded video signal that is a bitstream, said method comprising:

extracting two indexes of one-dimensional component filters of two types that compose a two-dimensional separable filter from a filter-application image area indicated by the coded video signal, as two application indexes;

obtaining respective filter data elements of the one-dimensional component filters of two types from at least one filter data element stored in a memory as two application filter data elements, the respective filter data elements being stored in association with the two application indexes extracted in said extracting of two indexes;

decoding the filter-application image area by applying, to the filter-application image area, the one-dimensional component filters of two types using the two application filter data elements obtained in said obtaining;

extracting filter data elements of the one-dimensional component filters as designed filter data elements, from a filter-design image area including the filter-application image area and indicated by the video signal;

assigning an index for identifying a corresponding one of the designed filter data elements to the corresponding one of the designed filter data elements as a designed index, for each of the one-dimensional component filters; and storing the designed filter data element and the designed index in association with each other, in the memory for each of the one-dimensional component filters, the designed index being assigned to the designed filter data element.

14. The image decoding method according to claim 13, wherein when prediction information is extracted in said extracting of two indexes, instead of one of the two application indexes of the one-dimensional component filters of two types:

said method further comprises predicting the one of the two application indexes; and in said obtaining, a prediction index obtained in said predicting is used as the one of the two application indexes.

15. The image decoding method according to claim 14, wherein in said predicting, the one of the two application indexes is predicted by selecting any one of indexes of the one-dimensional component filters of two types as the prediction index, the indexes including two indexes extracted from each of surrounding filter-application image areas that surround the filter-application image area and that are included in the filter-design image area.

16. The image decoding method according to claim 15, further comprising extracting, from the coded video signal, a motion vector for each of the filter-application image area and the surrounding filter-application image areas, wherein in said predicting, a surrounding filter-application image area from which a motion vector most similar to the motion vector extracted for the filter-application image area is extracted is identified from among the surrounding filter-application image areas, and the one of the two indexes of the one-dimensional component filters of two types is selected as the prediction index, the one of the two application indexes being extracted from the identified surrounding filter-application image area.

17. An image coding method of coding a video signal to generate a coded video signal that is a bitstream, said method comprising:

selecting, from at least one filter data element stored in a memory, respective filter data elements of one-dimensional component filters of two types that compose a two-dimensional separable filter as two application filter data elements, the one-dimensional component filters being to be applied to a filter-application image area indicated by the video signal;

obtaining an index stored in the memory in association with a corresponding one of the selected two application filter data elements, as an application index, for each of the one-dimensional component filters;

coding the filter-application image area by applying, to the filter-application image area, the one-dimensional component filters of two types using the two application filter data elements selected in said selecting; and adding the two application indexes obtained in said obtaining to the coded filter-application image area in the coded video signal.

18. An image decoding method of decoding a coded video signal that is a bitstream, said method comprising:

extracting two indexes of one-dimensional component filters of two types that compose a two-dimensional separable filter from a filter-application image area indicated by the coded video signal, as two application indexes;

obtaining respective filter data elements of the one-dimensional component filters of two types from at least one filter data element stored in a memory as two application filter data elements, the respective filter data elements being stored in association with the two application indexes extracted in said extracting of two indexes; and decoding the filter-application image area by applying, to the filter-application image area, the one-dimensional component filters of two types using the two application filter data elements obtained in said obtaining.

19. An image coding apparatus that codes a video signal to generate a coded video signal that is a bitstream, said apparatus comprising:

a filter data selecting unit configured to select, from at least one filter data element stored in a memory, respective filter data elements of one-dimensional component filters of two types that compose a two-dimensional separable filter as two application filter data elements, the one-dimensional component filters being to be applied to a filter-application image area indicated by the video signal;

an index obtaining unit configured to obtain an index stored in the memory in association with a corresponding one of the selected two application filter data elements, as an application index, for each of the one-dimensional component filters;

a coding unit configured to code the filter-application image area by applying, to the filter-application image area, the one-dimensional component filters of two types using the two application filter data elements selected by said filter data selecting unit;

an index adding unit configured to add the two application indexes obtained by said index obtaining unit to the coded filter-application image area in the coded video signal;

a filter data identifying unit configured to identify filter data elements of the one-dimensional component filters as two designed filter data elements, based on a filter-design image area including the filter-application image area and indicated by the video signal;

an index assigning unit configured to assign an index for identifying a corresponding one of the designed filter data elements to the corresponding one of the designed filter data elements as a designed index for each of the one-dimensional component filters;

a storage processing unit configured to store, in the memory, the designed filter data element and the designed index in association with each other, for each of the one-dimensional component filters, the designed index being assigned to the designed filter data element; and a filter data adding unit configured to add the two designed filter data elements identified by said filter data identifying unit, to the coded filter-design image area in the coded video signal.

20. An image decoding apparatus that decodes a coded video signal that is a bitstream, said apparatus comprising:

an index extracting unit configured to extract two indexes of one-dimensional component filters of two types that compose a two-dimensional separable filter from a filter-application image area indicated by the coded video signal, as two application indexes;

a filter data obtaining unit configured to obtain respective filter data elements of the one-dimensional component filters of two types from at least one filter data element stored in a memory as two application filter data elements, the respective filter data elements being stored in association with the two application indexes extracted by said index extracting unit;

a decoding unit configured to decode the filter-application image area by applying, to the filter-application image area, the one-dimensional component filters of two types using the two application filter data elements obtained by said filter data obtaining unit;

a filter data extracting unit configured to extract filter data elements of the one-dimensional component filters as designed filter data elements, from a filter-design image area including the filter-application image area and indicated by the video signal;

an index assigning unit configured to assign an index for identifying a corresponding one of the designed filter data elements to the corresponding one of the designed filter data elements as a designed index, for each of the one-dimensional component filters; and a storage processing unit configured to store the designed filter data element and the designed index in association with each other, in the memory for each of the one-dimensional component filters, the designed index being assigned to the designed filter data element.

\* \* \* \* \*